United States Patent
Taniuchi

(10) Patent No.: US 8,619,042 B2
(45) Date of Patent: Dec. 31, 2013

(54) DISPLAY APPARATUS WITH COORDINATE INPUT UNIT

(75) Inventor: Toshiyuki Taniuchi, Yamatokoriyama (JP)

(73) Assignee: Sharp Kabushiki Kaisha, Osaka (JP)

(*) Notice: Subject to any disclaimer, the term of this patent is extended or adjusted under 35 U.S.C. 154(b) by 1422 days.

(21) Appl. No.: 12/268,232

(22) Filed: Nov. 10, 2008

(65) Prior Publication Data

US 2009/0135149 A1    May 28, 2009

(30) Foreign Application Priority Data

Nov. 22, 2007 (JP) ................. 2007-303099

(51) Int. Cl.
*G06F 3/041* (2006.01)
*G06F 3/042* (2006.01)
*G06F 3/033* (2013.01)

(52) U.S. Cl.
USPC ........ 345/173; 345/176; 345/179; 178/18.03; 178/19.01; 178/19.03; 178/19.04

(58) Field of Classification Search
USPC .......................................... 345/173
See application file for complete search history.

(56) References Cited

U.S. PATENT DOCUMENTS

| 4,831,568 A | 5/1989 | Ito |
| 6,361,232 B1 * | 3/2002 | Nagaoka et al. ............... 401/37 |
| 2001/0028345 A1 | 10/2001 | Natsuyama et al. |
| 2002/0021290 A1 | 2/2002 | Mitsuya |
| 2005/0122319 A1 * | 6/2005 | Sakurai et al. ............... 345/179 |
| 2006/0132457 A1 * | 6/2006 | Rimas-Ribikauskas et al. ............... 345/173 |
| 2007/0280772 A1 * | 12/2007 | Mika ............... 401/33 |

FOREIGN PATENT DOCUMENTS

| CN | 87 1 03231 A | 11/1987 |
| CN | 1808362 A | 7/2006 |
| CN | 2857096 Y | 1/2007 |
| JP | 61-246828 A | 11/1986 |
| JP | 10-133807 A | 5/1998 |
| JP | 2002-62976 A | 2/2002 |
| JP | 2004-220506 A | 8/2004 |
| JP | 2004220506 * | 8/2004 |

* cited by examiner

*Primary Examiner* — Sumati Lefkowitz
*Assistant Examiner* — Andrew Yeretsky
(74) *Attorney, Agent, or Firm* — Birch, Stewart, Kolasch & Birch, LLP

(57) ABSTRACT

A display apparatus includes a touch panel provided overlapped on a display screen, a touch pen allowing switching of degree of smoothness of a pen tip portion in a plurality of levels and a controller causing, when the tip end of the touch pen touches the touch panel, a prescribed object image to be displayed on a position corresponding to the touched position. The controller includes a display manner selecting unit for selecting a manner of displaying the object image in accordance with the degree of smoothness of the tip end portion of the touch pen, and a display controller for displaying the object in the display manner selected by the display manner selecting unit at the position corresponding to the touched position.

12 Claims, 54 Drawing Sheets

600A

600B

600C

600D

600E

600F

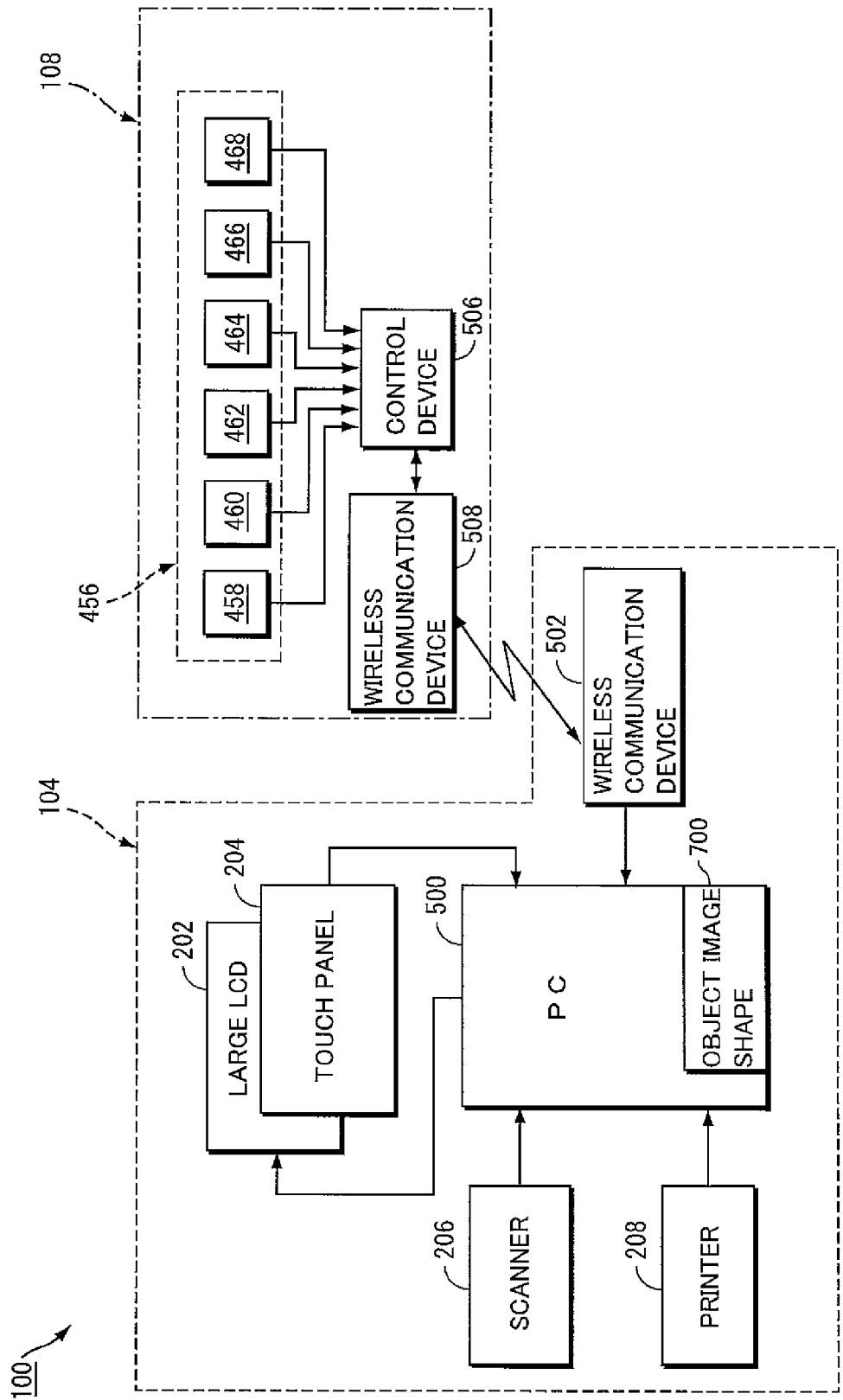

600G

600H

600I

600J

600K

600L

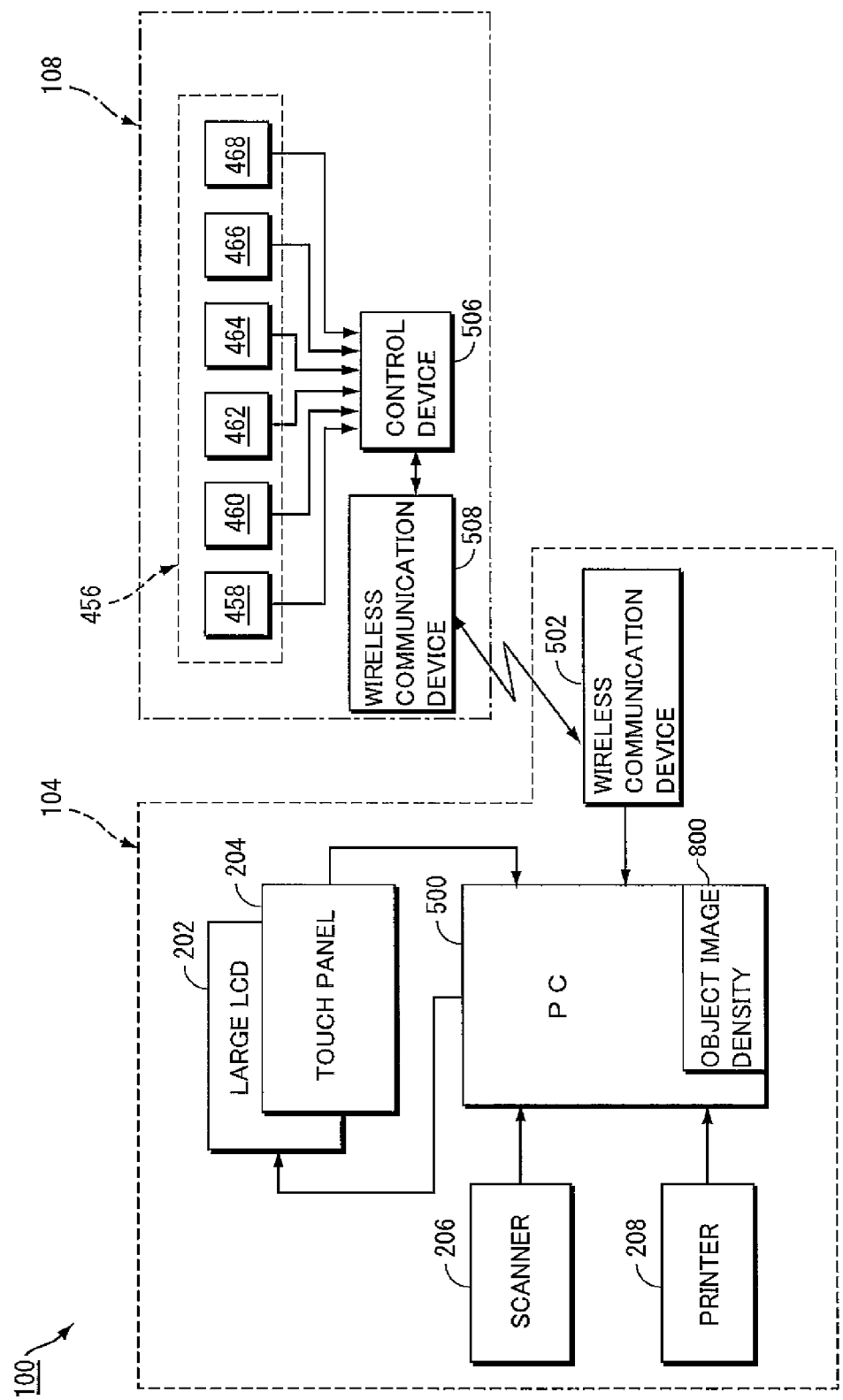

D0
600M

D1
600N

BRIGHT
↑

D2
600O

DISPLAY DENSITY

D3
600P

D4
600Q

↓
DARK

D5
600R

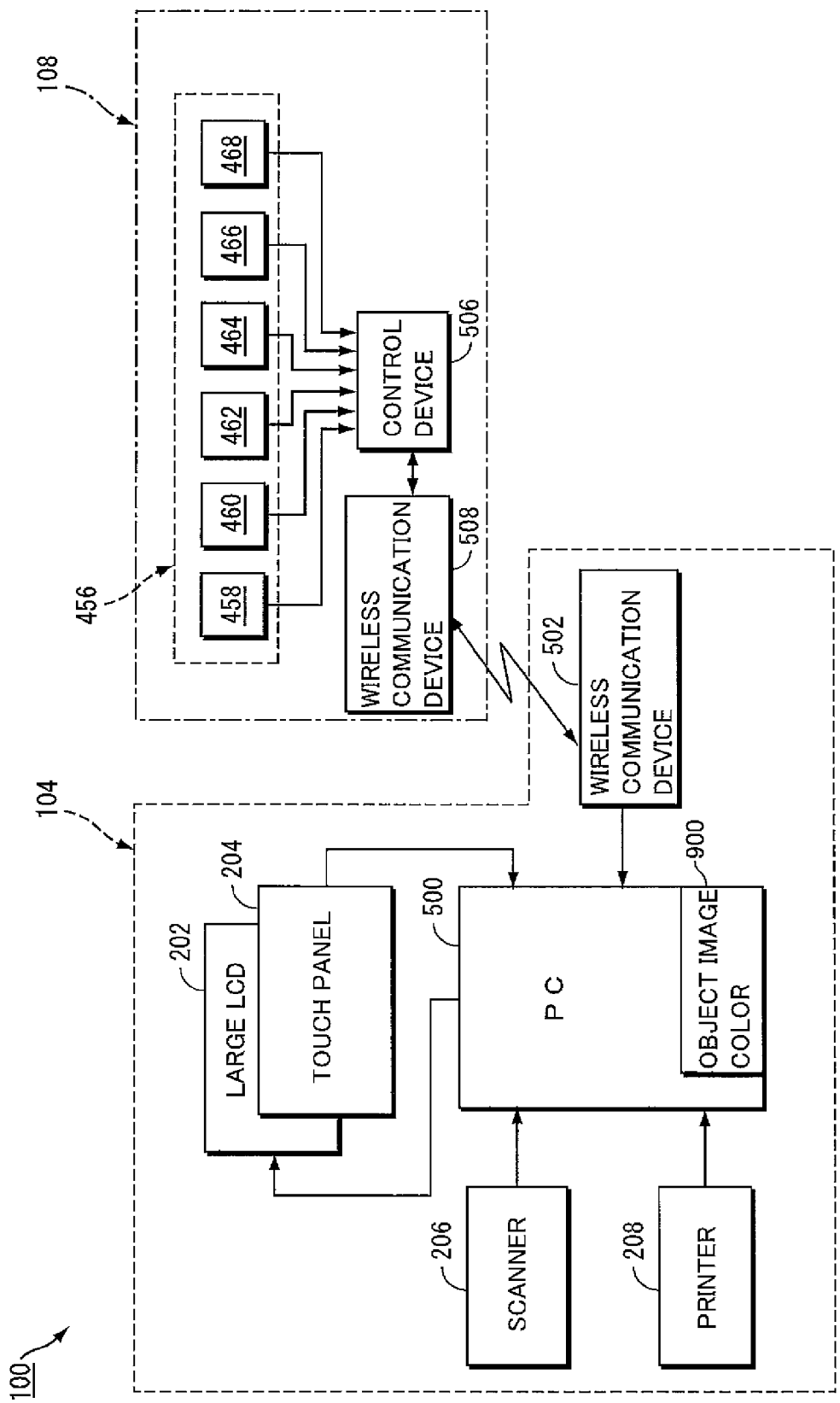

BLACK
600S

RED
600T

BLUE
600U

WHITE
600V

YELLOW
600W

GREEN
600X

FIG. 52A
FIG. 52B
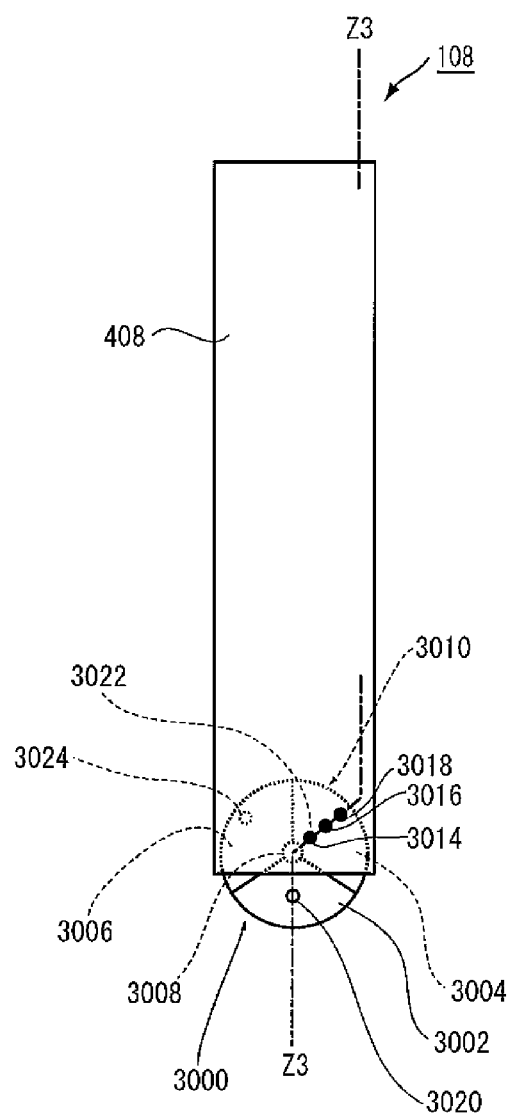
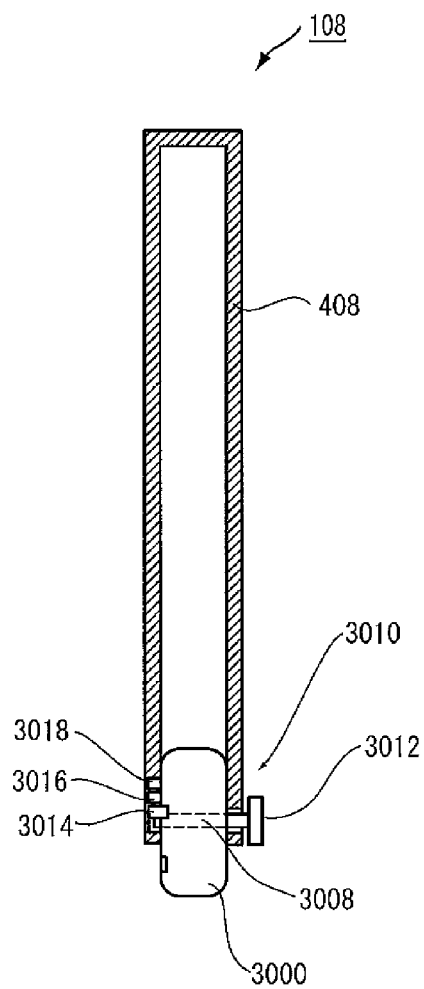

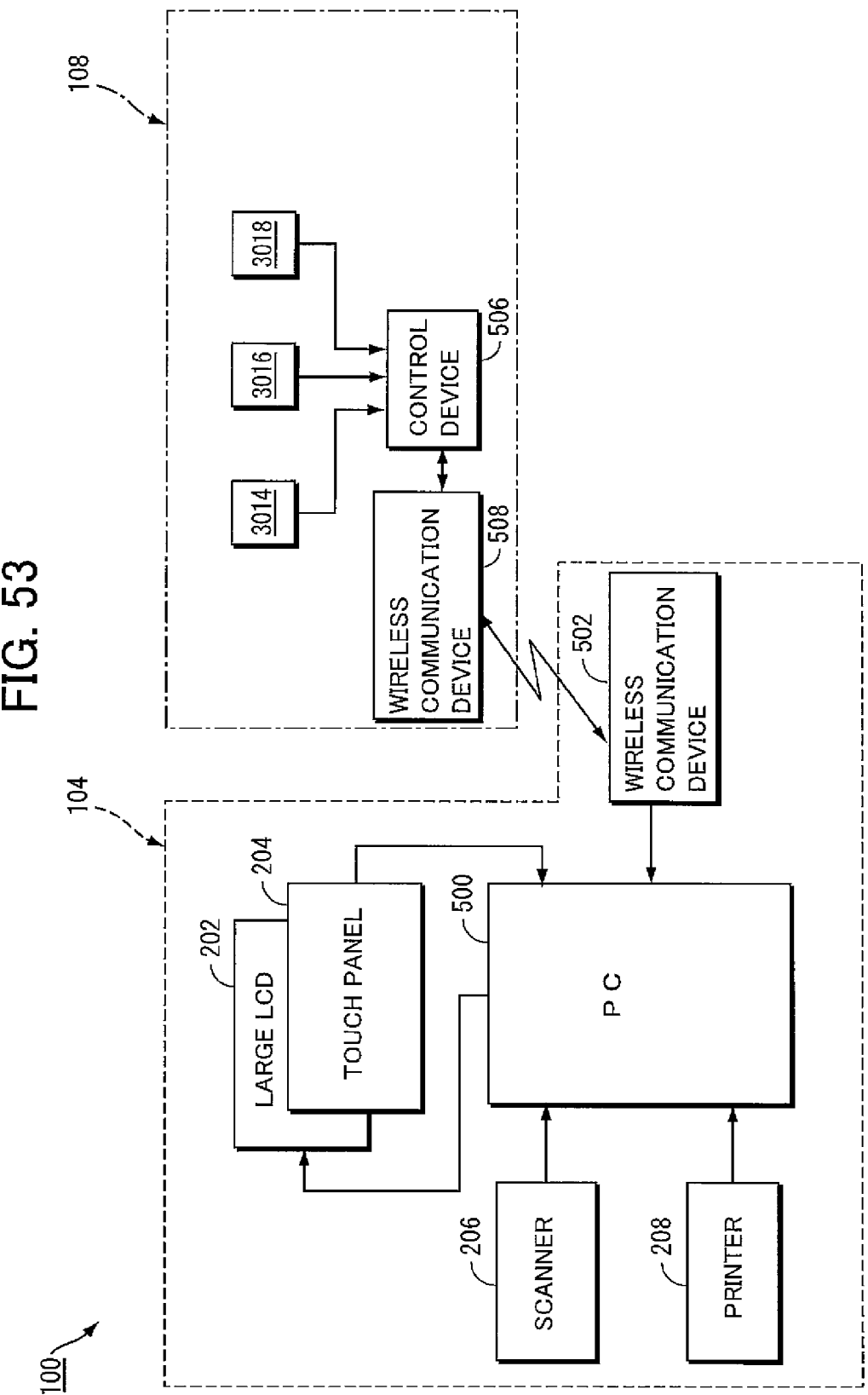

DISPLAY APPARATUS WITH COORDINATE INPUT UNIT

CROSS-REFERENCE TO RELATED APPLICATION

This nonprovisional application claims priority under 35 U.S.C. §119(a) on Patent Application No. 2007-303099 filed in Japan on Nov. 22, 2007, the entire contents of which are hereby incorporated by reference.

BACKGROUND OF THE INVENTION

1. Field of the Invention

The present invention relates to a display apparatus displaying, when an operator performs a coordinate input operation using a touch pen, a prescribed object image at the input coordinate position.

2. Description of the Background Art

As is well known, a display apparatus used as an electronic blackboard has been popular in the market. When a user inputs coordinates on a touch panel using a touch pen, a track of the input coordinates is displayed on a display screen of the electronic blackboard.

In such a display apparatus, the touch panel is fabricated using a smooth member such as glass as a material. A combination of the touch panel as such and the touch pen is easier to slip as compared with a combination of a generally used electronic blackboard and a felt pen. Therefore, it is sometimes difficult to input coordinates continuously (hard to write), tracing the touch panel with the touch pen.

A display apparatus as a solution to such a problem has been disclosed in Japanese Patent Laying-Open No. 2004-220506 (hereinafter referred to as "'506 application"). The display apparatus has two-dimensional coordinate input mechanisms provided on front and rear main surfaces of the touch panel. Pressure sensitive input parts have mutually different stiffness, surface roughness and the like. Alternatively, a touch pen having a pen holder, to which a plurality of pen tip portions having different surface roughness can be detachably attached, may be used. According to this technique, the degree of smoothness when the touch pen moves over the touch panel can be adjusted.

SUMMARY OF THE INVENTION

The display apparatus, however, has the following problems.

(1) It is very difficult using the apparatus of '506 application to provide good feeling of writing satisfactory to many operators, and necessary cost would be considerable, because the degree of smoothness of pen tip of the touch pen that feels well differs operator by operator. Operators have various and many requests and demands to the good writing feeling. In order to process the surface of pressure-sensitive input part to meet such demands, elaborate and numerous sampling researches are necessary. Surface processing of the pressure sensitive input part based on such researches is impractical both from technical and economical view points.

(2) Similar difficulties would be encountered if the feeling of writing of the touch pen is adjusted as disclosed in the apparatus of '506 application. Specifically, in order to provide good feeling of writing satisfactory to many operators, it is necessary to prepare a large number of pen tip portions having different surface roughness. Therefore, similar to (1) above, such an approach is impractical both from technical and economical view points.

Therefore, an object of the present invention is to provide a display apparatus that can improve an operational feeling when an operator performs the coordinate input operation using a touch pen, without necessitating surface processing of the operating surface of the touch panel or exchanging a pen tip portion of the touch-panel.

According to a first aspect, the present invention provides a display apparatus, including: a display screen; a coordinate input unit having an operating surface, through which information displayed on the display screen can be seen through, provided overlapped on the display screen; a touch pen for performing coordinate input to the operating surface, allowing switching of degree of smoothness of a pen tip portion on the operating surface among a plurality of levels; and a controller causing, when the pen tip portion of the touch pen touches the operating surface of the coordinate input unit, a prescribed object image to be displayed at a position corresponding to the touched position. The controller includes a display manner selecting unit selecting a manner of displaying the object image on the display screen in accordance with the degree of smoothness of the pen tip portion of the touch pen, and a display controller displaying the object image, when the pen tip portion of the touch pen touches the operating surface of the coordinate input unit, in a display manner selected by the display manner selecting unit, at a position corresponding to the touched position on the display screen.

By this arrangement, the touch pen allows switching, in a plurality of levels, the degree of smoothness of a pen tip portion on the operating surface of the coordinate input unit. The operator can switch the degree of smoothness of the pen tip portion as preferred, and set the degree of smoothness so that the pen writes well. When the coordinate input operation of bringing the pen tip portion of the touch pen into contact with the operating surface of the coordinate input unit is performed, the controller displays, in a display area of the display apparatus, an object image at the position corresponding to the input coordinate position. When the degree of smoothness of the pen tip portion of the touch pen is switched, the switched degree of smoothness of the pen tip portion of the touch pen is notified to the controller through the notifying unit, when the coordinate input operation is performed. On the side of the controller, a display manner selecting unit changes the manner of displaying the object image, in accordance with the notified degree of smoothness of the pen tip portion of the touch pen. As the degree of smoothness of the pen tip portion of the touch pen and the manner of display of the object image, which is displayed with the coordinate input operation using the touch pen as a trigger, are linked as described above, the operator can enjoy the touch pen operation feeling that matches the object image displayed in response to the input of coordinates.

Preferably, the touch pen includes a pen holder, a rolling tip having a spherical shape, a tip holding member provided at one end of the pen holder, forming a spherical pair with the rolling tip and receiving and allowing rolling of the rolling tip, and a pushing mechanism pushing, from inside of the tip holding member, the rolling tip with switchable pushing force.

More preferably, a through hole is formed from one end to the other end in the axial direction in the pen holder. The pushing mechanism includes: a pushing member fit to the through hole of the pen holder on the one end side, and pushing the rolling tip with the tip holding member interposed; a sliding member inserted slidably along the axial direction of the pen holder, from the other end side of the pen holder into the through hole of the pen holder; a first urging unit inserted between the pushing member and the sliding member, for urging the sliding member to the other end side; and a locking unit for holding the sliding member to be locked at any of a plurality of arbitrary positions inside the pen holder.

The touch pen is provided with a pushing mechanism that pushes the rolling tip with switchable pushing force. When the sliding member is pushed against the urging force of the first urging unit and locked at a desired position, the pushing force by the pushing mechanism changes dependent on how much the sliding member is pushed. The degree of rolling of the rolling tip over the operating surface of the coordinate input unit changes in accordance with the change in pushing force provided by the pushing mechanism. In this manner, switching of the degree of smoothness of the pen tip portion of the touch pen is realized by a simple operation of pushing the sliding member in the pen holder.

More preferably, the pen holder has an opening reaching the through hole, formed at a portion of an outer circumference. A plurality of slots are formed at positions that can face the opening, on an outer circumference of the sliding member. The locking unit includes an operation lever having a proximal portion supported on the pen holder, allowing turning about a tangential axial line of the outer circumference of the pen holder, and a distal portion having an engaging piece to be received and engaged with any one of the plurality of slots of the sliding member, and a second urging unit provided on the pen holder, urging the operation lever such that the engaging piece is urged toward the sliding member.

A plurality of slots are formed on the sliding member of the touch pen. The operator pushes the sliding member while turning the operation lever of the holder about the axial line, that is, away from or closer to the axis, and brings the engaging piece engaged to the receiving slot on the sliding member. At this time, the operation lever is urged toward the sliding member by means of the second urging unit and, therefore, the engaging piece can be firmly engaged with the receiving slot.

Preferably, the touch pen further includes a releasing unit attached to the locking unit for releasing locking of the sliding member by the locking unit.

More preferably, the releasing unit includes an operating piece formed at the distal portion of the operation lever, opposite to the engaging piece. When the operating piece is operated to turn the operation lever about the axial line against urging force of the second urging member, the engaging piece is separated from the receiving slot, so that the sliding member is unlocked from the locking member.

By the arrangement described above, when the operating piece of the operation lever is moved by one's finger and turned about the axis in a direction against the urging force of the second urging unit, the engaging piece is separated from the receiving slot, and the pushing force on the sliding member is released. When the operating piece is let off after the pushing force of the sliding member is released, the operation lever automatically turns about the axis toward the sliding member because of the urging force of the second urging unit, and the lever returns to a prescribed position. In this manner, the locking of sliding member can be released by a simple operation.

Preferably, on a region not overlapped with the region where the receiving slots are formed on the circumferential surface of the sliding member, indexes indicating amount of pushing of the sliding member, same in number as the receiving slots, are formed spaced from each other by a distance corresponding to the distance between the receiving slots. A viewing window is formed on the pen holder at a position allowing, when the engaging piece is inserted to any of the plurality of slots on the sliding member and the sliding member is locked by the locking unit, visual confirmation of the index corresponding to the slot engaged with the engaging piece.

By this arrangement, when the amount of pushing of the sliding member is changed, an index corresponding to the switched amount of pushing can be seen through a view window on the pen holder. As a result, the amount of pushing of the sliding member can easily be recognized.

Preferably, the display manner selecting unit selects display size of the object image, in a manner linked with switching of the degree of smoothness of the pen tip portion of the touch pen.

Preferably, the display manner selecting unit selects display shape of the object image, in a manner linked with switching of the degree of smoothness of the pen tip portion of the touch pen.

Preferably, the display manner selecting unit selects display density of the object image, in a manner linked with switching of the degree of smoothness of the pen tip portion of the touch pen.

Preferably, the display manner selecting unit selects display color of the object image, in a manner linked with switching of the degree of smoothness of the pen tip portion of the touch pen.

More preferably, the display color of the object image selected by the display manner selecting unit includes the same color as a background color of display of the display screen.

By way of example, if the color of display of the object image is set to be the same color as the background and a coordinate input operation is performed on a portion on which coordinate input has been done in a color different from the background color, the object image that has been displayed is overwritten by the same color as the background. Overwriting in the background color makes the previous input invisible, and hence, such a function can be utilized as an eraser function.

Preferably, the touch pen includes a plurality of pen tip portions having mutually different degrees of smoothness. The switching mechanism includes a selecting unit for selecting any one of the plurality of pen tip portions for performing coordinate input to the operating surface of the coordinate input unit.

By this arrangement, when a thin object image is to be drawn, for example, the pen tip portion is switched to one that is hard and smooth like a ball-point pen, and when a thick object image is to be drawn, the pen tip is switched to one that is slightly softer and less smooth like a felt pen. Further, when the object image is to be erased, the pen tip is switched to a soft and even less smooth tip, like an eraser. As the pen tip portion is switched dependent on the usage, even better matching is realized between the displayed object image and the operation feeling of the touch pen.

Preferably, the pen tip portion has a wheel shape having a plurality of pen tip sections of mutually different degrees of smoothness. The switching mechanism includes a selecting unit for selecting any one of the plurality of pen tip sections for performing coordinate input to the operating surface of the coordinate input unit.

By this arrangement, a plurality of pen tip sections of different degrees of smoothness are formed at a single pen tip portion, and the pen tip section to be used for coordinate input can be arbitrarily selected from among the pen tip sections. Thus, it becomes unnecessary to provide a plurality of pen tip members of different degrees of smoothness for the touch pen. As a result, the switching mechanism for switching the degree of smoothness of the pen tip portion can be made smaller.

More preferably, the touch pen further includes a transmitter provided in the pen holder, for transmitting, by wireless communication, pushing force of the pushing mechanism to the controller. The controller further includes a receiver receiving the pushing force of the pushing mechanism from the transmitter, and notifying it to the display manner selecting unit.

Wireless communication between the touch pen and the controller eliminates the problematic communication cable between the touch pen and the controller. Thus, operability of the touch pen is improved.

According to a second aspect, the present invention provides a touch pen, including: a pen holder having a through hole formed from one end to the other end along an axial direction; a rolling tip having a spherical shape; a tip holding member provided at one end of the pen holder, forming a spherical pair with the rolling tip and receiving and allowing rolling of the rolling tip; and a pushing mechanism pushing, from inside of the tip holding member, the rolling tip with switchable pushing force. The pushing mechanism includes a pushing member fit to the through hole of the pen holder on the one end side, and pushing the rolling tip with the tip holding member interposed, a sliding member inserted slidably along the axial direction of the pen holder, from the other end side of the pen holder into the through hole of the pen holder, an urging unit inserted between the pushing member and the sliding member, for urging the sliding member to the other end side, and a locking unit for holding the sliding member to be locked at any of a plurality of arbitrary positions inside the pen holder.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a block diagram showing a hardware configuration of the display apparatus in accordance with the second embodiment.

FIG. 18 is a block diagram showing a hardware configuration of the display apparatus in accordance with the third embodiment.

FIG. 23 is a block diagram showing a hardware configuration of the display apparatus in accordance with the fourth embodiment.

FIG. 52A is a side view of the touch pen used for the display apparatus in accordance the eighth embodiment.

FIG. 52B is a cross sectional view taken along the line Z3-Z3 of FIG. 52A.

FIG. 53 is a block diagrams showing a hardware configuration of the display apparatus in accordance with the eighth embodiment.

DESCRIPTION OF THE PREFERRED EMBODIMENTS

Figure 1:
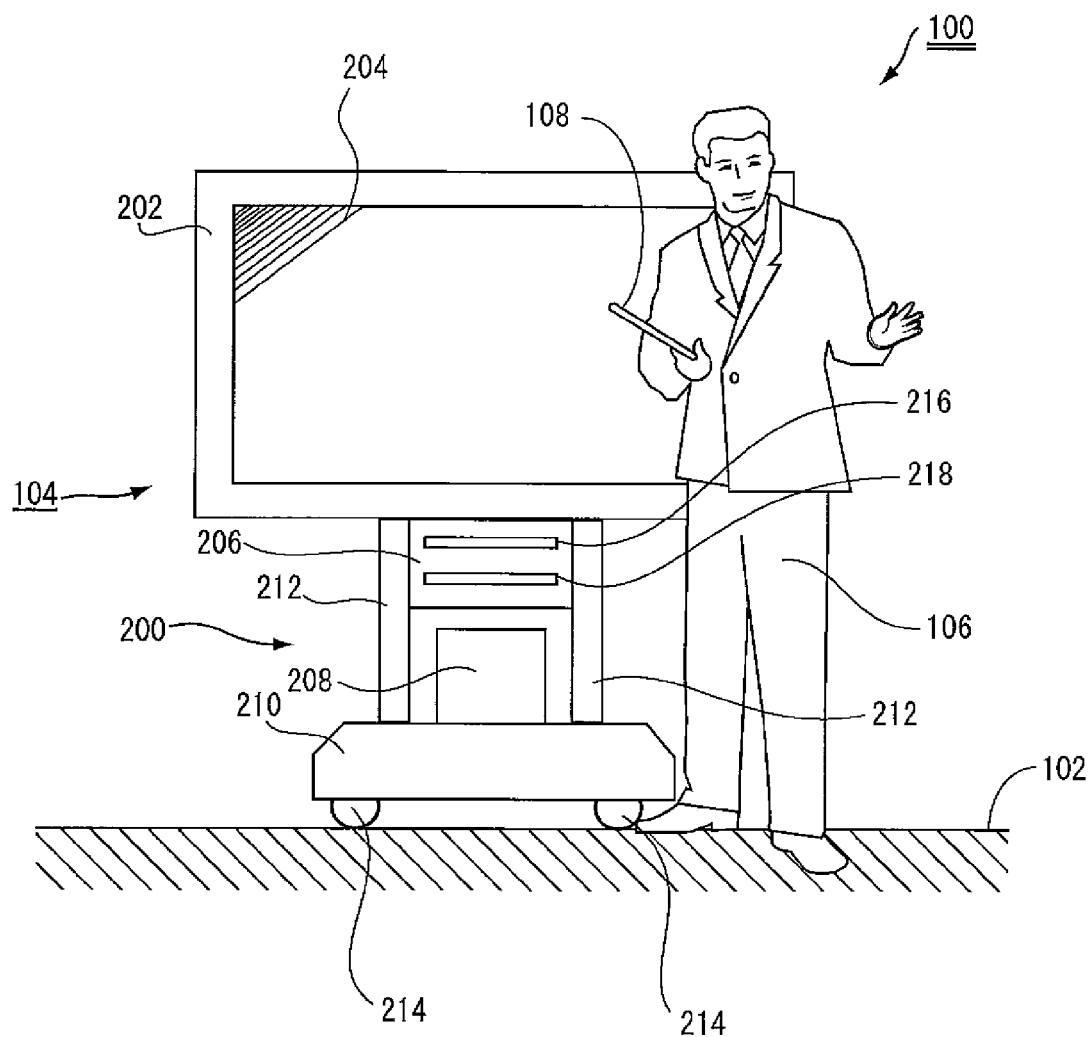
FIG. 1 is a front view showing an overall configuration of the display apparatus in accordance with the first embodiment of the present invention.

In the following description and the drawings attached to the specification, components of the same function are denoted by the same reference characters. Their names and functions are also the same. Therefore, detailed description thereof will not be repeated.

First Embodiment

<Overall Configuration>

Referring to FIG. 1, a display apparatus 100 in accordance with the present embodiment is a large-sized white board system used for presentation. Display apparatus 100 includes an apparatus body 104 placed on a floor 102 of the presentation site and a touch pen 108 used by a presenter 106.

<Configuration of Apparatus Body 104>

Figure 2:
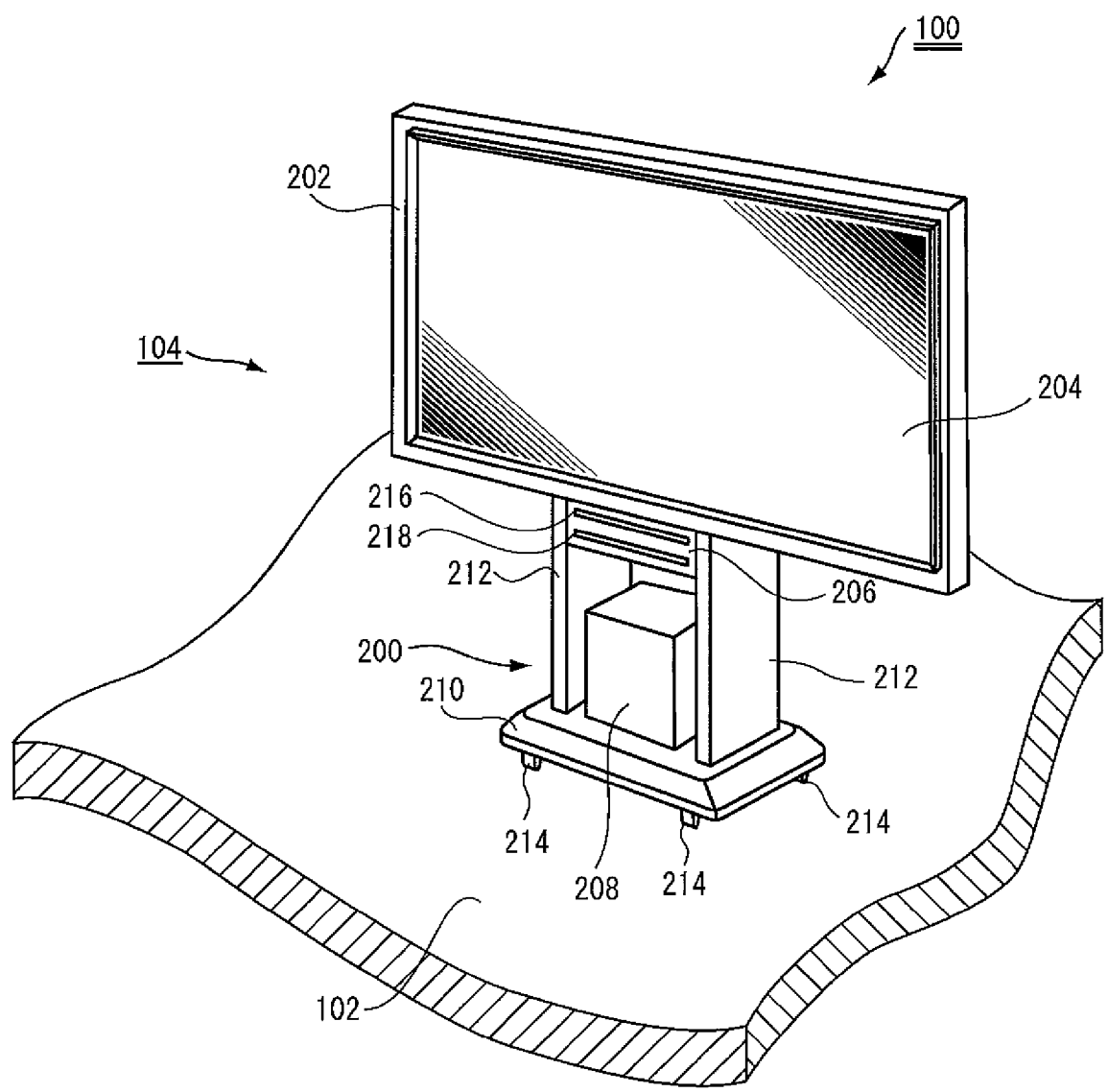
FIG. 2 is a perspective view of the display apparatus shown in FIG. 1.

Referring to FIG. 2, apparatus body 104 includes a stand 200, a large LCD (Liquid Crystal Display) 202, a transparent touch panel 204, a scanner 206 and a printer 208.

Stand 200 includes a base 210 in contact with floor 102, and a pair of left and right legs 212 coupling the base 210 with large LCD 202. At the bottom of base 210, four casters 214 are rotatably provided for moving apparatus body 104. Each leg 212 is a wide, thin, plate-shaped member, and the legs are erected on an upper surface of base 210, spaced by a prescribed distance from each other.

Large LCD 202 has a rectangular shape long in the widthwise direction, and has a display area formed on a front surface, for displaying information on the screen. The display area of LCD 202 has a contour similar to that of LCD 202, and the area on which it is formed occupies most part of the front surface of LCD 202.

Transparent touch panel 204 has a rectangular shape long in the widthwise direction, similar to large LCD 202. Transparent touch panel 204 is provided integrally and overlapped on the display area of LCD 202 (that is, the front surface of LCD 202). Therefore, in the display apparatus 100, information and the like displayed on the display area of LCD 202 is displayed through touch panel 204. The display area of LCD 202 is integrated with the touch panel and, therefore, touch panel 204 functions as the operating surface. It is possible to see the information displayed on the display area of LCD 202 through the operating surface. When touch pen 108 is brought into contact with touch panel 204, coordinates corresponding to the position of contact are output from touch panel 204.

Scanner 206 reads presentation document or the like. On a front surface of scanner 206, a pair of openings 216 and 218 are formed aligned in the vertical direction. Scanner 206 takes in a document through upper opening 216 and discharges it from the lower opening 218. Printer 208 prints information displayed on display apparatus 100 in response to a print instruction by the operator.

Scanner 206 and printer 208 are provided in a space defined by base 210, the pair of left and light legs 212 and large LCD 202, spaced by a prescribed distance from each other. Specifically, scanner 206 is installed in contact with a lower surface of LCD 202, bridging the pair of left and right legs 212. Printer 208 is placed on an upper surface of base 210, spaced from the pair of left and right legs 212.

<Configuration of Transparent Touch Panel 204>

Figure 3:
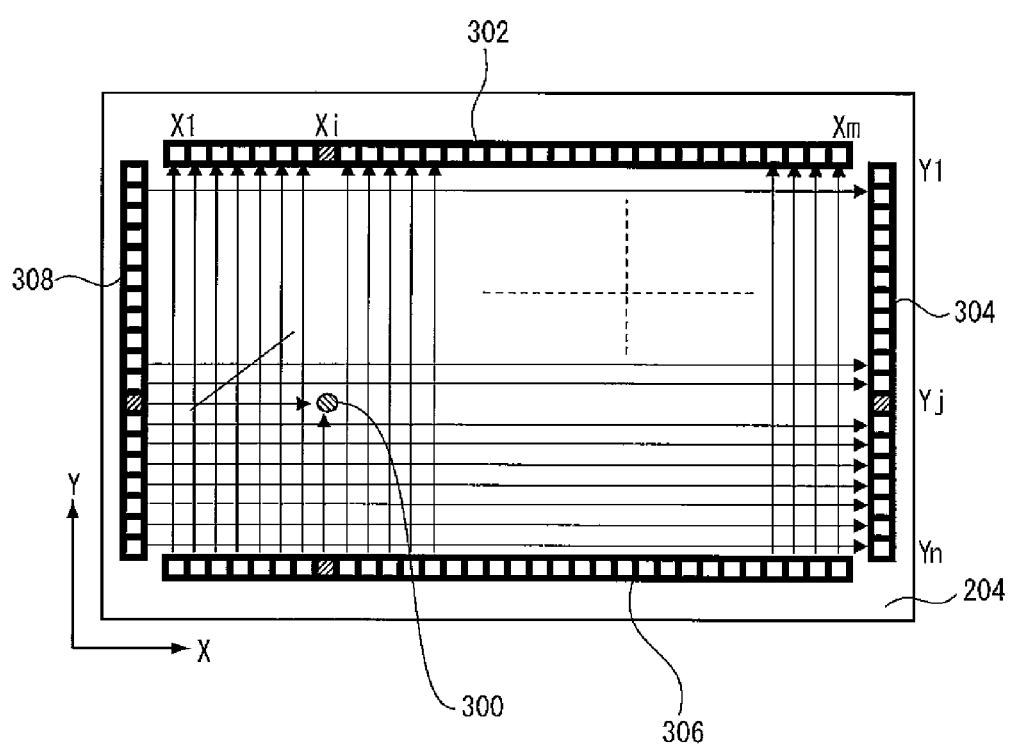
FIG. 3 is a schematic front view showing a configuration of a transparent touch panel used in the display apparatus shown in FIG. 1.

In FIG. 3, a direction along the longer side of transparent touch panel 204 (widthwise direction) is regarded as the X-axis direction, and the direction along the shorter side (lengthwise direction) is regarded as the Y-axis direction.

Referring to FIG. 3, as touch panel 204 in accordance with the present embodiment, a touch panel that optically detects a position is used. Touch panel 204 includes photo transistor arrays 302 and 304 and LED (Light Emitting Diode) arrays 306 and 308, provided corresponding to four sides of the transparent member as the operating surface, respectively, for detecting a touch position 300 touched by the touch pen 108.

Specifically, at an inner edge portion of the upper longer side (that is, the upper side) of the operating surface of touch panel 204, X-direction photo transistor array 302 is arranged. At the inner edge of the lower longer side (that is, the lower side), X-direction LED array 306 is arranged. The photo transistors of array 302 and LEDs of array 306 are opposed to each other. As a result, between the photo transistor of array 302 and the LED of array 306, an optical axis along the X-axis direction is formed. At the inner edge portion of the right, shorter side (that is, the right side) of the operating surface of touch panel 204, Y-direction photo transistor array 304 is arranged. At an inner edge portion of the left, shorter side (that is, the left side), Y-direction LED array 308 is arranged. The photo transistors of array 304 and LEDs of array 308 are opposed to each other. As a result, between the photo transistors of array 304 and the LEDs of array 308, optical axes along the Y-axis direction are formed.

Photo transistor array 302 and LED array 306 in the X-direction have m photo transistors and m LEDs on the substrate, respectively. Photo transistor array 304 and LED array 308 in the Y-direction have n photo transistors and n LEDs on the substrate, respectively. Therefore, on the operating surface, m×n intersections of optical axes result.

When a presenter 106 brings touch pen 108 into contact with the transparent member (operating surface) of the transparent touch panel 204 having such a configuration as described above, the light emitted from LEDs of LED arrays 306 and 308 of X- and Y-directions passing through the touched position 300 is interrupted by touch pen 108, and hence, the light does not reach the photo transistors of photo transistor arrays 302 and 304 of the X- and Y-directions opposite to the LEDs. A combination of coordinates of photo transistors at which the light emitted from the LEDs did not arrive is output as the input coordinate position, to a personal computer (PC) 500 shown in FIG. 7. In the example shown in FIG. 3, a coordinate position (Xi, Yj) corresponds to the position touched by touch pen 108 (pen touch position) 300.

<Structure of Touch Pen 108>

Figure 4:
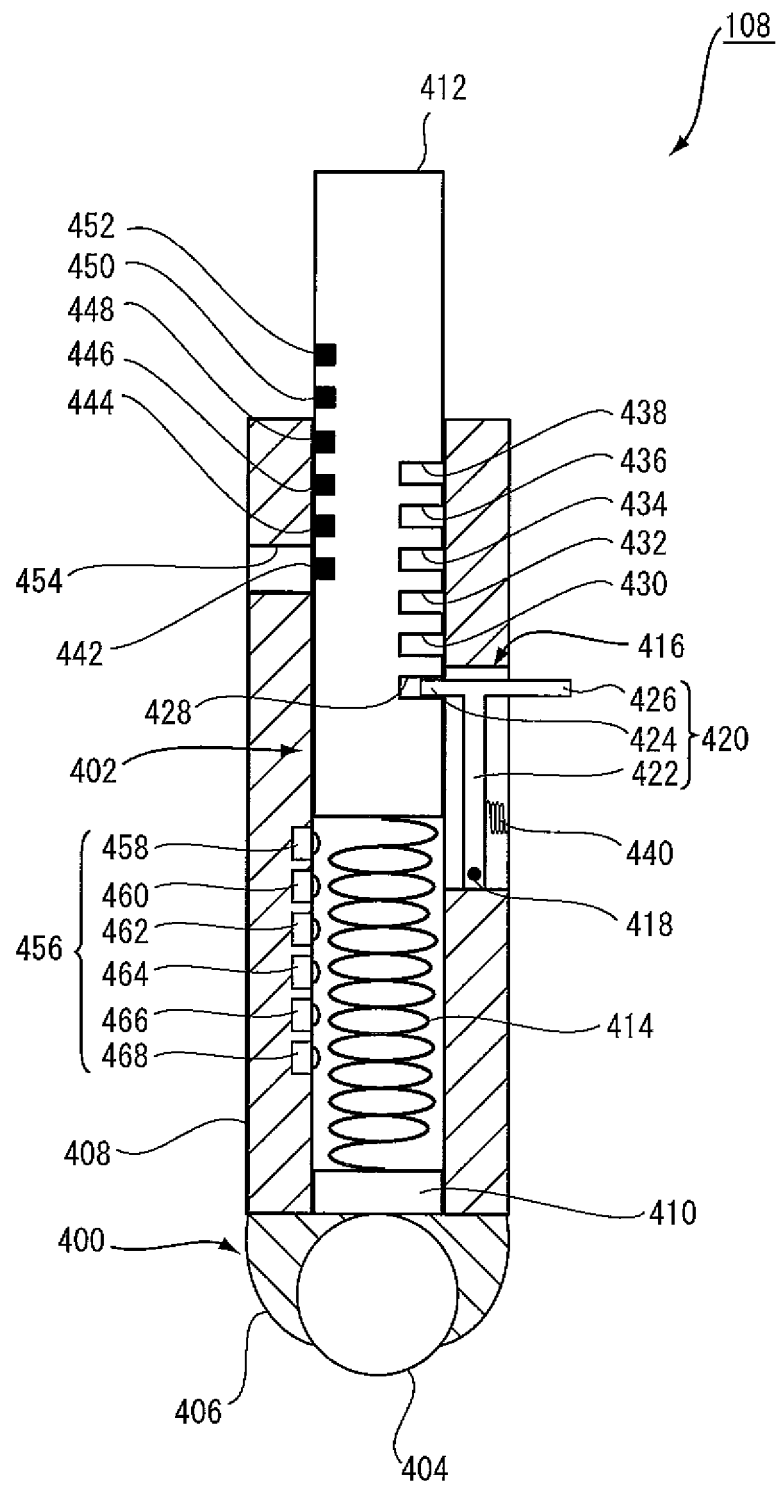
FIG. 4 is a cross-sectional view showing the touch pen in an initial state.
Figure 5:
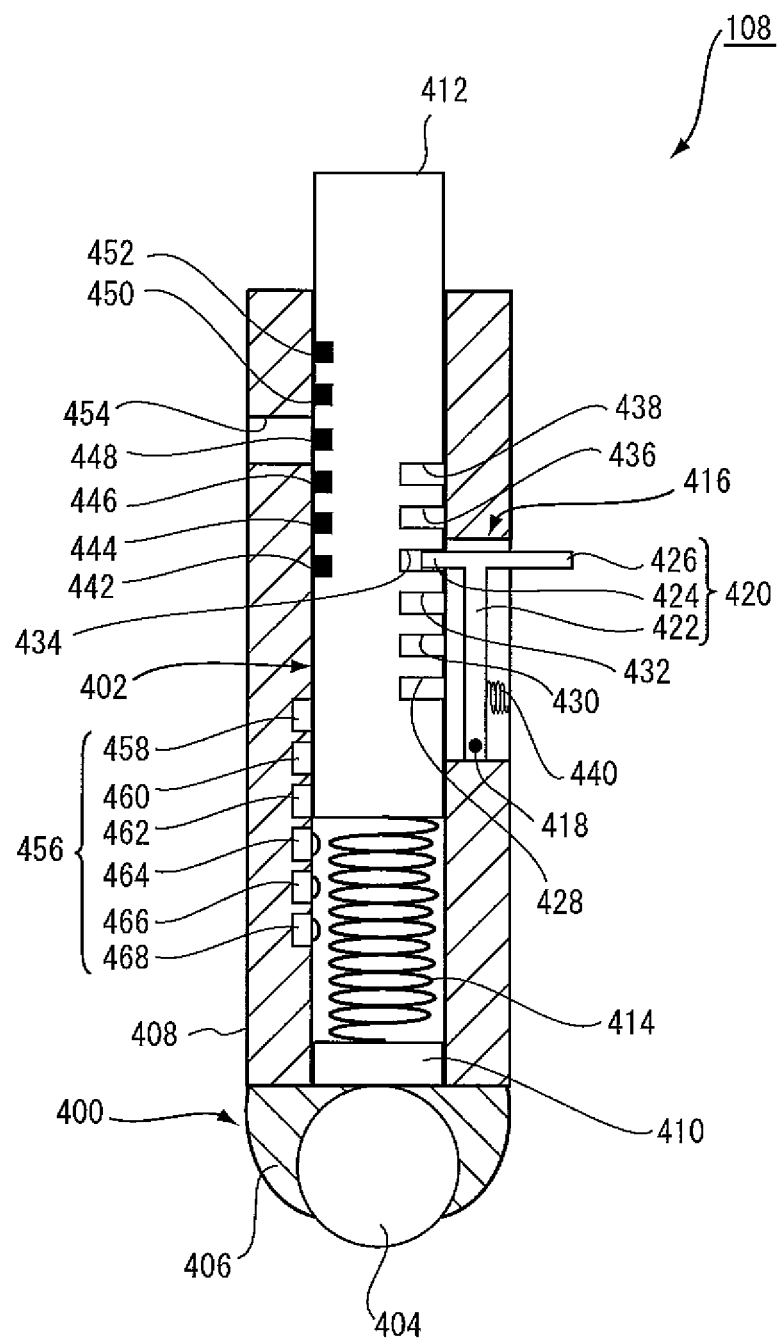
FIG. 5 is a cross-sectional view showing the touch pen in a pushed state.
Figure 6:
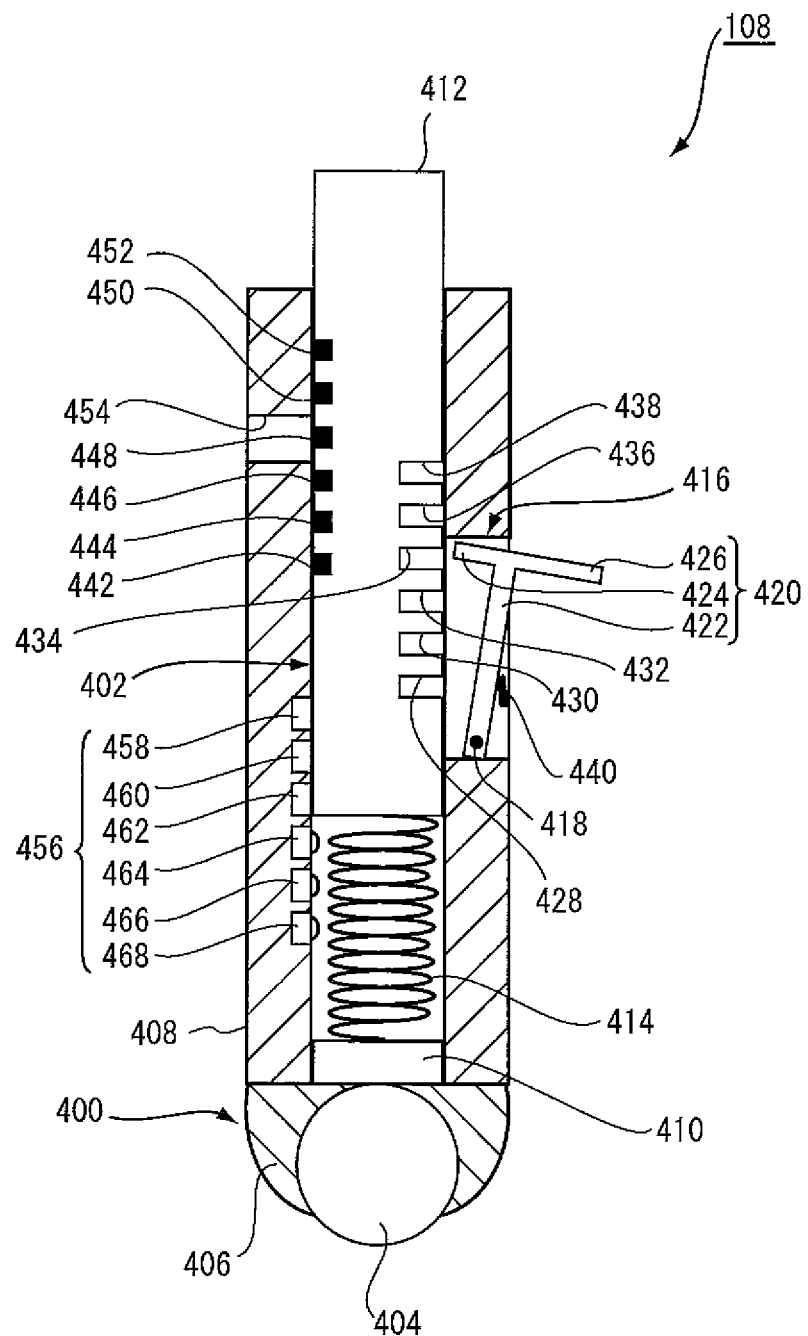
FIG. 6 is a cross-sectional view showing the touch pen when the pushing is released.

Referring to FIGS. 4 to 6, touch pen 108 is to perform the coordinate input operation to the operating surface of transparent touch panel 204, as described above. Touch pen 108 has a switching mechanism 402 for switching the degree of smoothness of a pen tip portion 400 on the operating surface of touch panel 204.

Pen tip portion 400 has a rolling tip 404 having a spherical shape, and a tip holding member 406 forming a spherical pair with rolling tip 404, receiving and allowing rolling of the rolling tip 404. Tip holding member 406 is attached to a tip end surface of a pen holder 408. Pen holder 408 is a longitudinal member long in the axial direction, and has a hollow cylindrical shape with a through hole formed in the axial direction.

Switching mechanism 402 includes: a tip pushing member 410 fit into a front end portion of pen holder 408 and pushing rolling tip 404 with tip holding member 406 interposed; a pushing member 412 inserted to the through hole of pen holder 408 from a rear end of pen holder 408 in a manner slidable in the axial direction, for performing a pushing operation in the pen holder 408; a first spring 414 inserted between the tip pushing member 410 and pushing member 412, urging the pushing member 412 to a direction opposite to the pushing direction; and a push amount locking member 416 for switching and locking the amount of pushing of pushing member 412 in pen holder 408 in a plurality of levels (in the present embodiment, in six levels). The pushing force of tip pushing member 410 pushing the rolling tip 404 varies depending on the amount of pushing of pushing member 412. Accordingly, the degree of rolling of rolling tip 404 on the operating surface of transparent touch panel 204 varies.

The push amount locking member 416 includes an operation lever 420 having a proximal end supported to allow tuning about lateral axis 418 with respect to pen holder 408, that is, toward and away from the pen holder. Operation lever 420 has a T-shape consisting of a base portion 422, an engaging piece 424 protruding from a tip end of base portion 422 to the side of pushing member 412, and an operating piece 426 protruding from the tip end of base portion 422 to the side opposite to the engaging piece 424. Engaging piece 424 and operating piece 426 are formed integrally at the tip end of base portion 422. In the present embodiment, the size of protrusion of operating piece 426 is longer than that of engaging piece 424. As a result, operating piece 420 can easily be operated by one's finger.

Push amount locking member 416 includes six receiving slots 428, 430, 432, 434, 436 and 438 formed spaced by an equal distance from each other on a circumferential surface of pushing member 412 and with which engaging piece 424 of operation lever 420 engages. Push amount locking member 416 further includes a second spring 440 urging operation lever 420 toward pushing member 412.

When operating piece 426 of touch pen 108 is operated such that operation lever 420 is turned about lateral axis 418 against the urging force of the second spring 440, engaging piece 424 is separated from any of receiving slots 428, 430, 432, 434, 436 and 438, so that pushing force of pushing member 412 is released. After the pushing force of pushing member 412 is released, when operating piece 426 is let loose, operation lever 420 automatically turns about lateral axis 418 toward pushing member 412, because of the urging force of the second spring 440. As a result, engaging piece 424 is engaged with any of the receiving slots 428, 430, 432, 434, 436 and 438, so that the pushing amount of pushing member 412 is switched and locked. Therefore, in the present embodiment, operating piece 426 of operation lever 420 functions as a member for releasing the pushing force of pushing member 412.

When pushing member 412 is pushed against the urging force of the first spring 414 in touch pen 108, the amount of pushing of pushing member 412 is switched to a desired level and locked. As a result, the pushing force applied by tip pushing member 410 to rolling tip 404 changes depending on the amount of pushing of pushing member 412. As the pushing force changes, the degree of rolling of rolling tip 404 on the operating surface of transparent touch panel 204 changes.

Specifically, in the initial state, engaging piece 424 of operation lever 420 shown in FIG. 4 is engaged with the first receiving slot 428 at the lowermost step of pushing member 412. This initial state will be referred to as the first level of pushing amount of pushing member 412. When pushing member 412 is pushed deeper than the afore-mentioned first level against the urging force of the first spring 414, engaging piece 424 of operation lever 420 is engaged with the second receiving slot 430 immediately above the first receiving slot 428. In this state, the pushing amount of pushing member 412 is at the second level. With the pushing force at the second level, the degree of rolling of rolling tip 404 becomes lower than when it is at the first level.

When pushing member 412 is pushed deeper than the second level against the urging force of the first spring 414, engaging piece 424 of operation lever 420 is engaged with the third receiving slot 432 immediately above the second receiving slot 430. In this state, the pushing amount of pushing member 412 is set to the third level. With the pushing force at the third level, the degree of rolling of rolling tip 404 becomes lower than when it is at the second level.

When pushing member 412 is pushed deeper than the third level against the urging force of the first spring 414, engaging piece 424 of operation lever 420 is engaged with the fourth receiving slot 434 immediately above the third receiving slot 432. In this state, the pushing amount of pushing member 412 is set to the fourth level. With the pushing force at the fourth level, the degree of rolling of rolling tip 404 becomes lower than when it is at the third level.

When pushing member 412 is pushed deeper than the fourth level against the urging force of the first spring 414, engaging piece 424 of operation lever 420 is engaged with the fifth receiving slot 436 immediately above the fourth receiving slot 434. In this state, the pushing amount of pushing member 412 is set to the fifth level. With the pushing force at the fifth level, the degree of rolling of rolling tip 404 becomes lower than when it is at the fourth level.

When pushing member 412 is pushed deeper than the fifth level against the urging force of the first spring 414, engaging piece 424 of operation lever 420 is engaged with the sixth receiving slot 438 as the highest level. In this state, the pushing amount of pushing member 412 is set to the sixth level. With the pushing force at the sixth level, the degree of rolling of rolling tip 404 becomes lower than when it is at the fifth level.

Specifically, in the present touch pen 108, as the level of pushing amount of pushing member 412 becomes deeper, the degree of rolling of rolling tip 404 (degree of smoothness of pen tip portion 400) decreases stepwise.

On the circumferential surface of pushing member 412, at an area opposite to the area where receiving slots 428, 430, 432, 434, 436 and 438 are formed, index strips 442, 444, 446, 448, 450 and 452 are attached, indicating the amount of pushing of pushing member 412. Indexes 442, 444, 446, 448, 450 and 452 are same in number as receiving slots 428, 430, 432, 434, 436 and 438 (that is, six), and formed spaced apart from each other by the same distance as between each of the receiving slots 428, 430, 432, 434, 436 and 438. The first index 442 at the lowermost level is arranged between the third and fourth receiving slots 432 and 434. At a portion of pen holder 408 where the first index 442 is positioned when the state of pushing of pushing member 412 is at the initial state, a window 454 is formed. It is possible for the operator to visually confirm one of the indexes 442, 444, 446, 448, 450 and 452, which corresponds to the level of pushing amount of pushing member 412 through window 454.

Specifically, when the amount of pushing of pushing member 412 is set to the first, second, third, fourth, fifth or sixth level, the operator can visually recognize index 442, 444, 446, 448, 450 or 452, respectively, through window 454.

Touch pen 108 further includes a pushing amount detecting mechanism 456 for detecting the level of pushing amount of pushing member 412. Pushing amount detecting mechanism 456 includes six micro-switches 458, 460, 462, 464, 466 and 468. These micro-switches 458, 460, 462, 464, 466 and 468 are embedded in an inner wall of pen holder 408 at a region where the first spring 414 is inserted, opposite to the operating region of operation lever 420. Each of the micro-switches 458, 460, 462, 464, 466 and 468 turns ON if it comes into contact with a circumferential surface of pushing member 412, and turns OFF when it is out of contact.

When the amount of pushing of pushing member 412 is set to the first level, the circumferential surface of pushing member 412 is not in contact with any of the micro-switches 458, 460, 462, 464, 466 and 468. Micro-switches 458, 460, 462, 464, 466 and 468 are all OFF.

When the amount of pushing of pushing member 412 is set to the second level, the circumferential surface of pushing member 412 comes into contact with the uppermost, first micro-switch 458. Micro-switch 458 is turned ON. The second to sixth micro-switches 460, 462, 464, 466 and 468 are kept OFF.

When the amount of pushing of pushing member 412 is set to the third level, the circumferential surface of pushing member 412 comes into contact with the first and second micro-switches 458 and 460. Micro-switches 458 and 460 are turned ON. The third to sixth micro-switches 462, 464, 466 and 468 are kept OFF.

When the amount of pushing of pushing member 412 is set to the fourth level, the circumferential surface of pushing member 412 comes into contact with the first to third micro-switches 458, 460 and 462. Micro-switches 458, 460 and 462 are turned ON. The fourth to sixth micro-switches 464, 466 and 468 are kept OFF.

When the amount of pushing of pushing member 412 is set to the fifth level, the circumferential surface of pushing member 412 comes into contact with the first to fourth micro-switches 458, 460, 462 and 464. Micro-switches 458, 460, 462 and 464 are turned ON. The fifth and sixth micro-switches 466 and 468 are kept OFF.

When the amount of pushing of pushing member 412 is set to the sixth level, the circumferential surface of pushing member 412 comes into contact with the first to fifth micro-switches 458, 460, 462, 464 and 466. Micro-switches 458, 460, 462, 464 and 466 are turned ON. Only the sixth micro-switch 468 is kept OFF.

Pushing amount detecting mechanism 456 detects the amount of pushing based on a combination of the number of micro-switches that are ON and the number of micro-switches that are OFF. A control device 506 shown in FIG. 7 detects and receives the states of these micro-switches 458, 460, 462, 464, 466 and 468, and determines the level of pushing of pushing member 412.

<Hardware Configuration>

Figure 7:
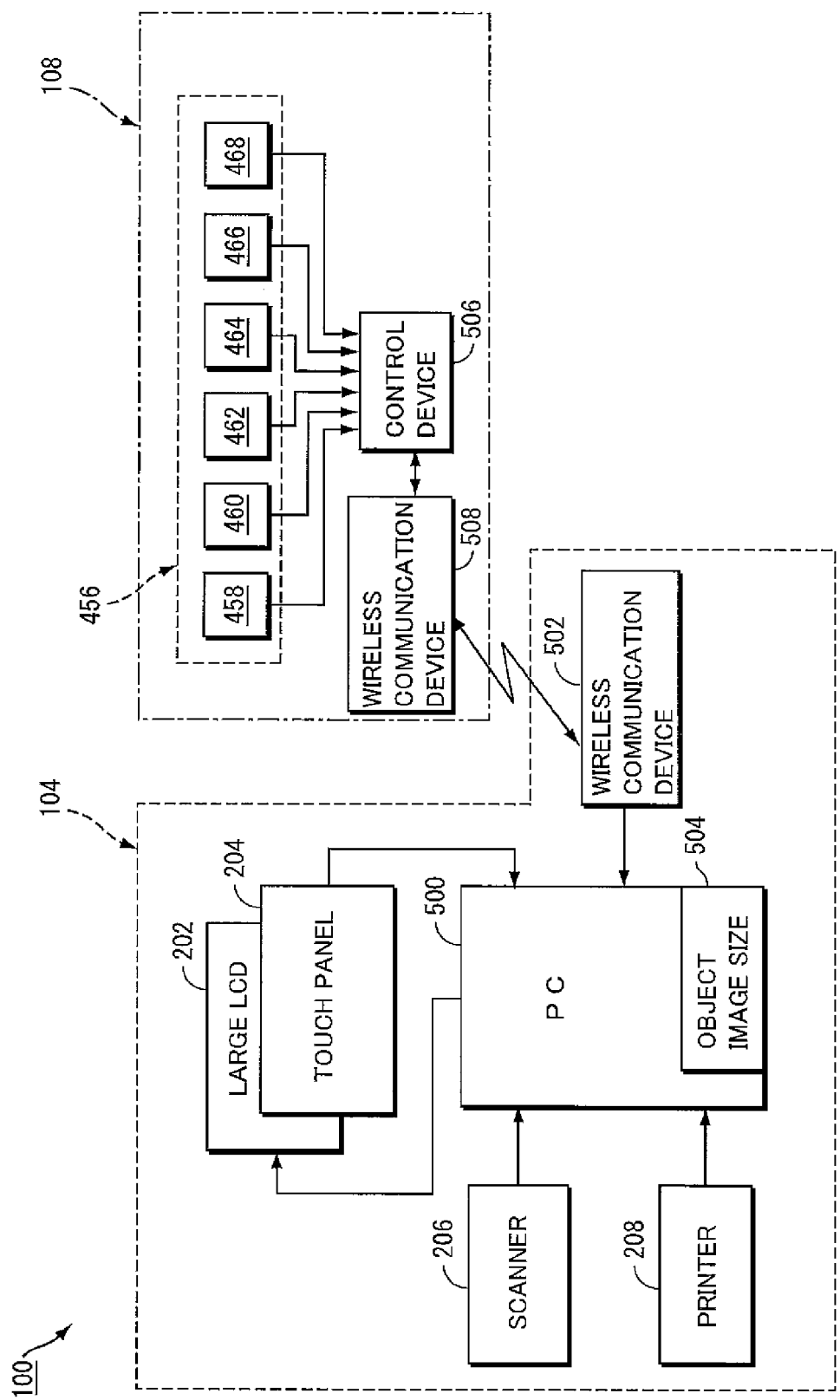
FIG. 7 is a block diagram showing a hardware configuration of the display apparatus in accordance with the first embodiment.

Referring to FIG. 7, a main body 104 of display apparatus 100 includes, in addition to large LCD 202, transparent touch panel 204, scanner 206 and printer 208, a PC 500 and a wireless communication device 502.

PC 500 is for overall control of display apparatus 100. PC 500 includes a CPU (Central Processing Unit) (not shown), an ROM (Read Only Memory) (not shown), and an RAM (Random Access Memory) (not shown). PC 500 is connected to large LCD 202, transparent touch panel 204, scanner 206, printer 207 and wireless communication device 502. When a coordinate input signal generated by touch pen 108 is applied from touch panel 204, PC 500 causes display of a prescribed object image on a position corresponding to the coordinates input by touch pen 108, on the display area of LCD 202.

Here, the "object image" (hereinafter referred to as "object image 600") may include, for example, point images 600A to 600F shown in FIGS. 12A to 12F, respectively. Presenter 106 traces the surface (operating surface) of the transparent member of transparent touch panel 204 with touch pen 108. Coordinate values of the touched position of touch pen 108 are repeatedly applied to PC 500 at a constant time interval. PC 500 causes display of point images at the coordinates. As a result, object image 600 is displayed as a collection of these point images. Thus, it is possible for presenter 106 to draw a desired shape or letter on large LCD 202. Other object image 600 may include predetermined template figures such as a line, circle, triangle and rectangle. Such template figures may be formed by inputting one or a plurality of representative points and input of 0 or 1 or more dimensions, through common figure drawing process, rather than by continuously inputting coordinate values as described above.

As described above, object image 600 is displayed, using the coordinate input operation by touch pen 108 to transparent touch panel 204 as a trigger. Therefore, PC 500 is provided with an object image size storage area 504. In area 504, data for displaying object image 600 with thickness of drawing line changed in accordance with the level of pushing amount of pushing member 412 of touch pen 108 (hereinafter the data will be simply referred as "object image size changing data") are stored.

Touch pen 108 includes, in addition to six micro-switches 458, 460, 462, 464, 466 and 468, a control device 506 and a wireless communication device 508.

Control device 506 is the main controller of touch pen 108. Control device 506 is implemented by a computer including a CPU (not shown), an ROM (not shown), an RAM (not shown) and the like. To control device 506, micro-switches 458, 460, 462, 464, 466 and 468 and wireless communication device 508 are connected.

As the wireless communication device 502 for the main body 104 of the apparatus and the wireless communication device 508 on the side of touch pen 108, Bluetooth (registered trademark) modules are used.

Control device 506 has a function of determining the level of pushing of pushing member 412 of touch pen 108, based on a combination of the number of micro-switches that are ON and the number of micro-switches that are OFF. The data representing the level of pushing amount determined by control device 506 is transmitted from wireless communication device 508 on the side of touch pen 108 to wireless communication device 502 on the side of main body 104, and further applied from wireless communication device 502 to PC 500.

<Software Configuration>

Display apparatus 100 in accordance with the present embodiment is programmed such that line thickness for drawing object image 600 is changed in a manner linked with the change of degree of smoothness of pen tip portion 400 of touch pen 108. The program is a part of software resources for realizing various functions of display apparatus 100 as will be described in the following, and the program is partially stored in the ROM of PC 500 on the side of main body 104 of the apparatus and partially stored in the ROM of control device 506 on the side of touch pen 108. These functions are carried out by PC 500 on the side of main body 104 and control device 506 on the side of touch pen 108 executing the program.

Figure 8:
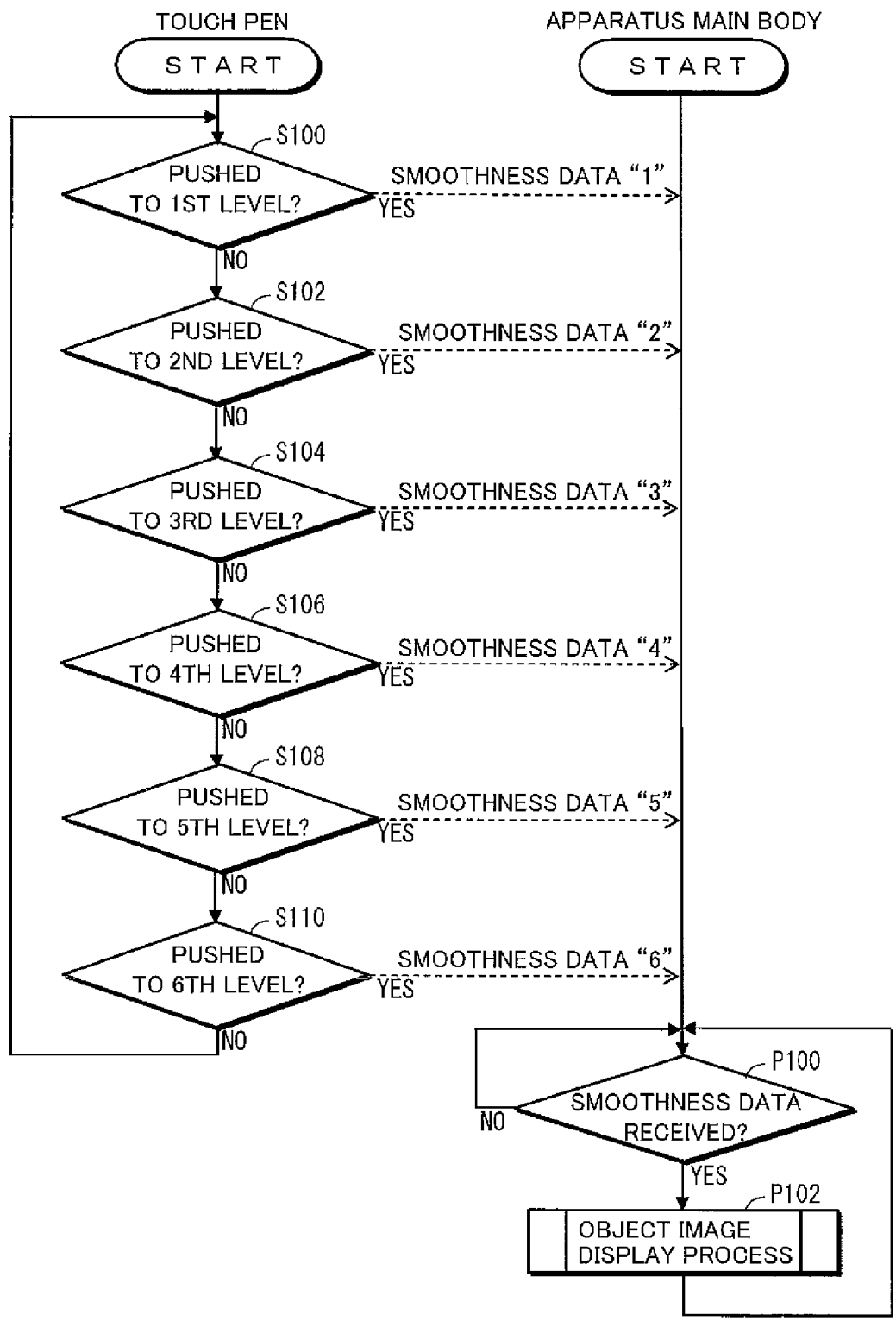
FIG. 8 shows, in a flowchart, a program structure of a main routine of the display apparatus in accordance with the first embodiment.

Referring to FIG. 8, in the display apparatus 100, first, control device 506 on the side of touch pen 108 determines the level of pushing of pushing member 412 of touch pen 108 (steps S100, S102, S104, S106, S108 and S110).

When the number of micro-switches that are OFF among switches 458, 460, 462, 464, 466 and 468 is 6 (all), 5, 4, 3, 2 or 1, control device 506 determines that the amount of pushing of pushing member 412 is set to the first, second, third, fourth, fifth or sixth level, respectively (YES at step S100, 102, 104, 106, 108 or 110), and transmits the data of degree of smoothness "1", "2", "3", "4", "5", or "6" to PC 500 on the side of main body 104 of the apparatus through wireless communication between wireless communication devices 508 and 502. The data of degree of smoothness refers to the data that indicates the degree of smoothness of pen tip portion 400.

PC 500 on the side of main body 104 waits for reception of the data of degree of smoothness (step P100). Receiving the data of degree of smoothness, PC 500 executes an object image display process (step P102) in accordance with the level of pushing amount of pushing member 412 of touch pen 108 (that is, the degree of smoothness of pen tip portion 400).

In the present embodiment, the set level of smoothness of pen tip portion 400 of touch pen 108 is constantly monitored on the side of main body 104 of the apparatus. PC 500 continuously executes the object image display process in accordance with the degree of smoothness until the degree of smoothness is switched. When the degree of smoothness is switched, PC 500 resets the object image display process that has been executed by that time, and newly executes an object image display process in accordance with the switched degree of smoothness.

(Object Image Display Process)

Figure 9:
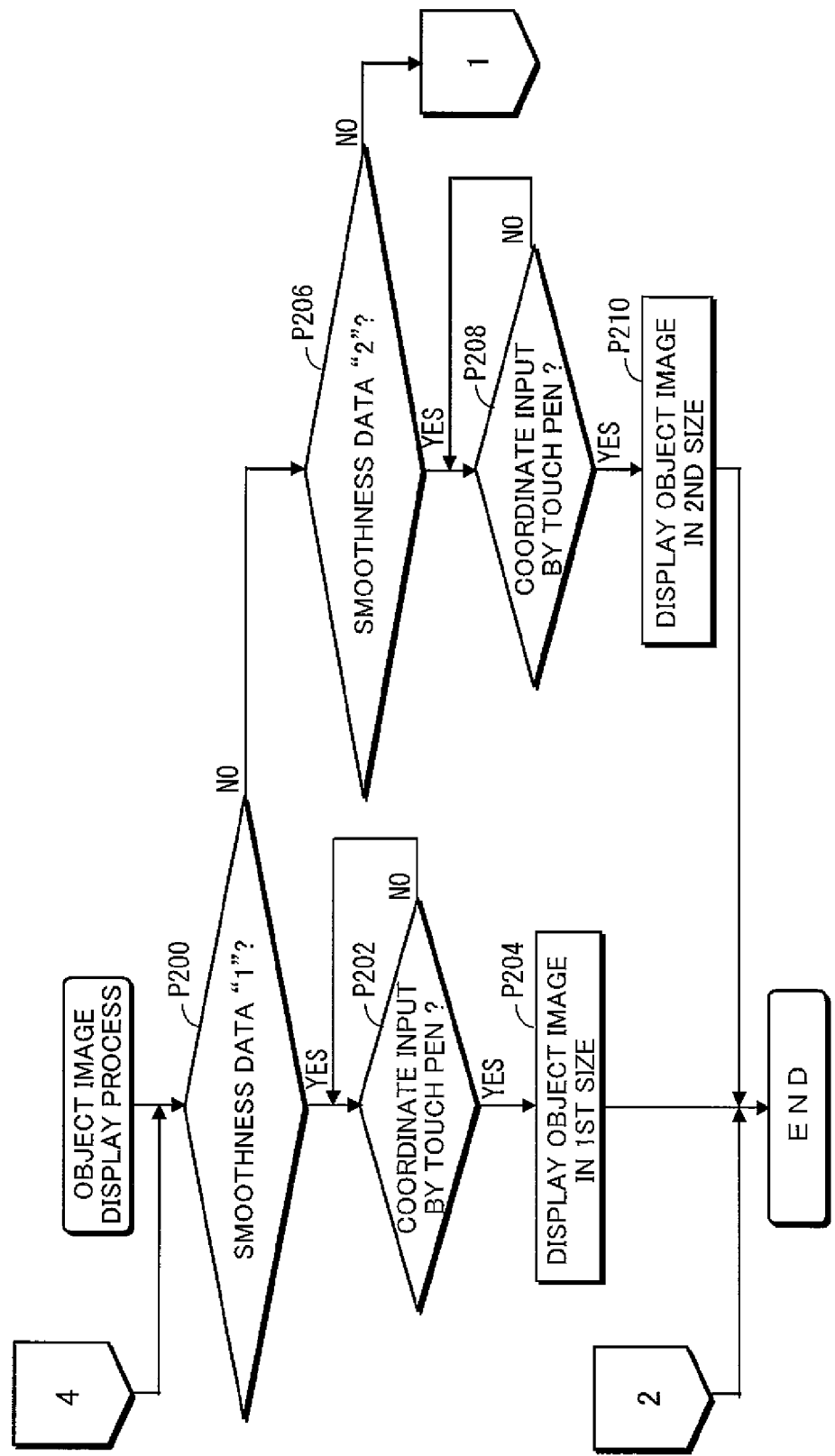
FIGS. 9 to 11 show, in flowcharts, a program structure for realizing the object image display process by the display apparatus in accordance with the first embodiment.

Referring to FIG. 9, in the object image display process executed by PC 500, whether or not the received data of degree of smoothness is "1" is determined (step P200). If the received data of degree of smoothness is "1", PC 500 waits for the coordinate input operation by touch pen 108 to the operating surface of transparent touch panel 204 (step P202). If the coordinate input operation is done, PC 500 displays object image 600 at a position corresponding to the coordinates input by touch pen 108, on the display area of large LCD 202. At this time, PC 500 refers to the object image size changing data stored in object image size storage area 504 using the data of degree of smoothness "1" as a parameter, and obtains the first size as the thickness of drawing line. The first size is the smallest size. Based on the reference, PC 500 displays object image 600A of the first size shown in FIG. 12A (step P204). Then, the object image display process ends. If the received data of degree of smoothness is not "1", the control proceeds to step P206.

Figure 12A:
FIGS. 12A to 12F show the manner how the display size of the object image changes.
Figure 12B:

At step P206, whether or not the received data of degree of smoothness is "2" is determined. If the received data of degree of smoothness is "2", PC 500 waits for the coordinate input operation by touch pen 108 to the operating surface of transparent touch panel 204 (step P208). If the coordinate input operation is done, PC 500 refers to the object image size changing data stored in object image size storage area 504 using the data of degree of smoothness "2" as a parameter, and obtains the second size as the drawing size. The second size is larger than the first size. Based on the reference, PC 500 displays object image 600B of the second size as shown in FIG. 12B, at a position corresponding to the coordinates input by touch pen 108, on the display area of large LCD 202 (step P210). Then, the object image display process ends. If the received data of degree of smoothness is not "2", the control proceeds to step P212 shown in FIG. 10.

Figure 10:
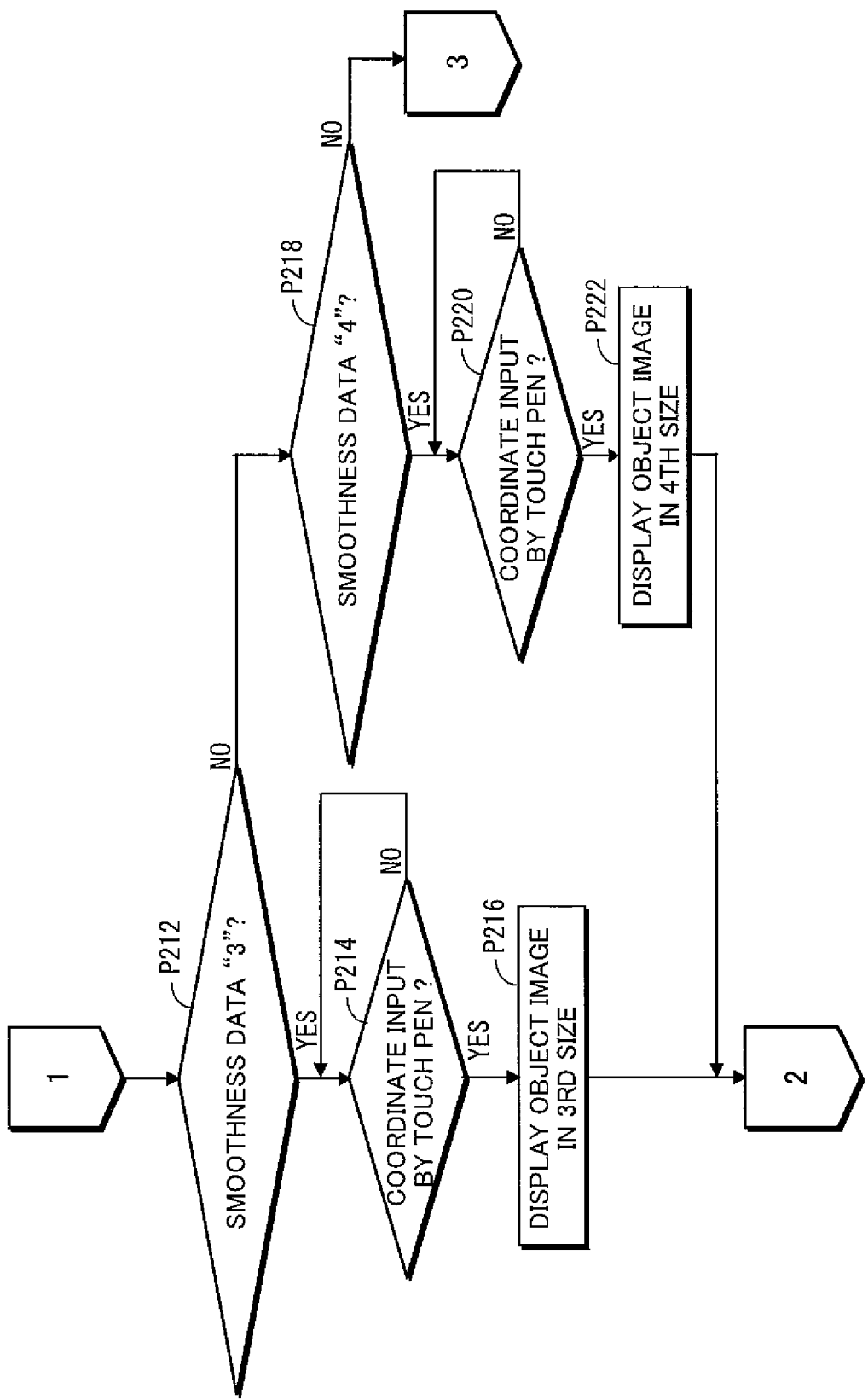
Figure 12C:
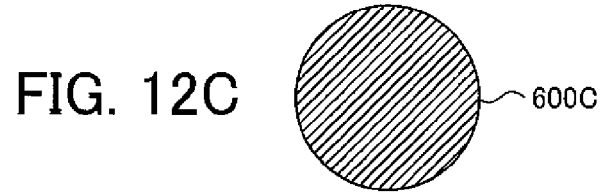

Referring to FIG. 10, at step P212, whether or not the received data of degree of smoothness is "3" is determined. If the received data of degree of smoothness is "3", PC 500 waits for the coordinate input operation by touch pen 108 to the operating surface of transparent touch panel 204 (step P214). If the coordinate input operation by touch pen 108 to transparent touch panel 204 is done, PC 500 refers to the object image size changing data stored in object image size storage area 504 using the data of degree of smoothness "3" as a parameter, and obtains the third size as the size of drawing the object. The third size is larger than the second size. Based on the reference, PC 500 displays object image 600C of the third size as shown in FIG. 12C, at a position corresponding to the coordinates input by touch pen 108, on the display area of large LCD 202 (step P216). Then, the object image display process ends. If the received data of degree of smoothness is not "3", the control proceeds to step P218.

At step P218, whether or not the received data of degree of smoothness is "4" is determined. If the received data of degree of smoothness is "4", PC 500 waits for the coordinate input operation by touch pen 108 to the operating surface of transparent touch panel 204 (step P220). If the coordinate input operation is done, PC 500 refers to the object image size changing data stored in object image size storage area 504 using the data of degree of smoothness "4" as a parameter, and obtains the fourth size as the drawing size. The fourth size is larger than the third size. Based on the reference, PC 500 displays object image 600D of the fourth size as shown in FIG. 12D, at a position corresponding to the coordinates input by touch pen 108, on the display area of large LCD 202 (step P222). Then, the object image display process ends. If the received data of degree of smoothness is not "4", the control proceeds to step P224 shown in FIG. 11.

Figure 11:
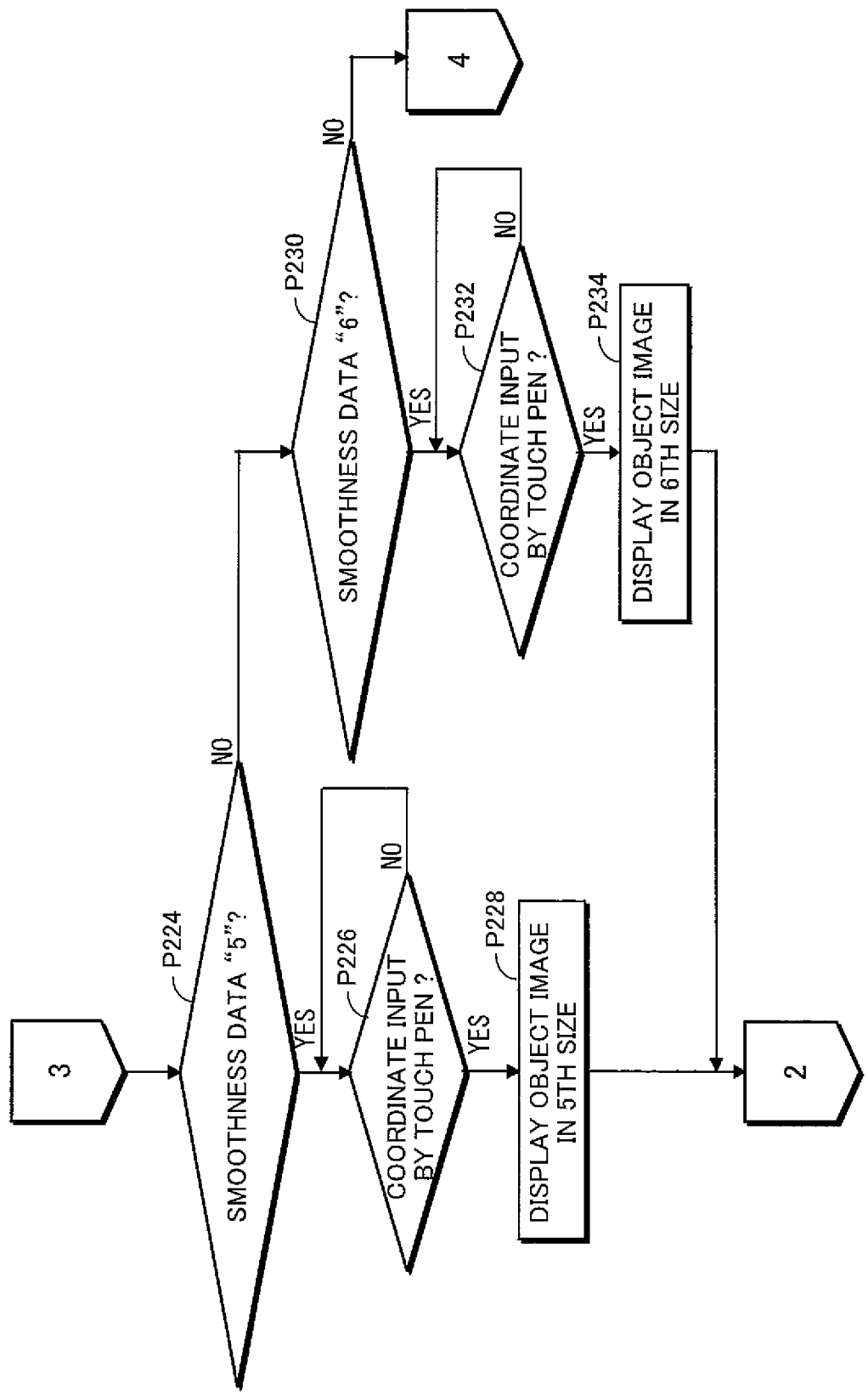
Figure 12D:
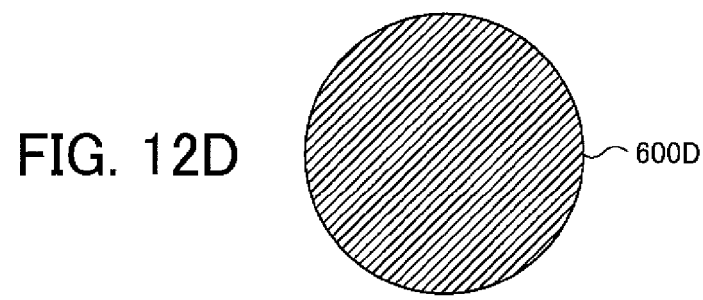
Figure 12E:
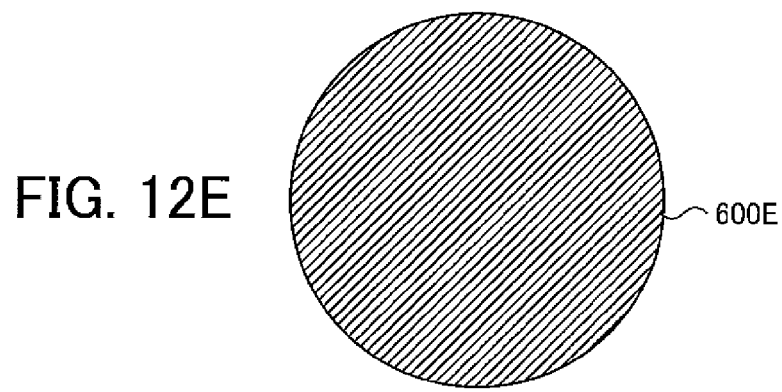

Referring to FIG. 11, at step P224, whether or not the received data of degree of smoothness is "5" is determined. If the received data of degree of smoothness is "5", PC 500 waits for the coordinate input operation by touch pen 108 to the operating surface of transparent touch panel 204 (step P226). If the coordinate input operation is done, PC 500 refers to the object image size changing data stored in object image size storage area 504 using the data of degree of smoothness "5" as a parameter, and obtains the fifth size as the drawing size. The fifth size is larger than the fourth size. Based on the reference, PC 500 displays object image 600E of the fifth size as shown in FIG. 12E, at a position corresponding to the coordinates input by touch pen 108, on the display area of large LCD 202 (step P228). Then, the object image display process ends. If the received data of degree of smoothness is not "5", the control proceeds to step P230.

Figure 12F:
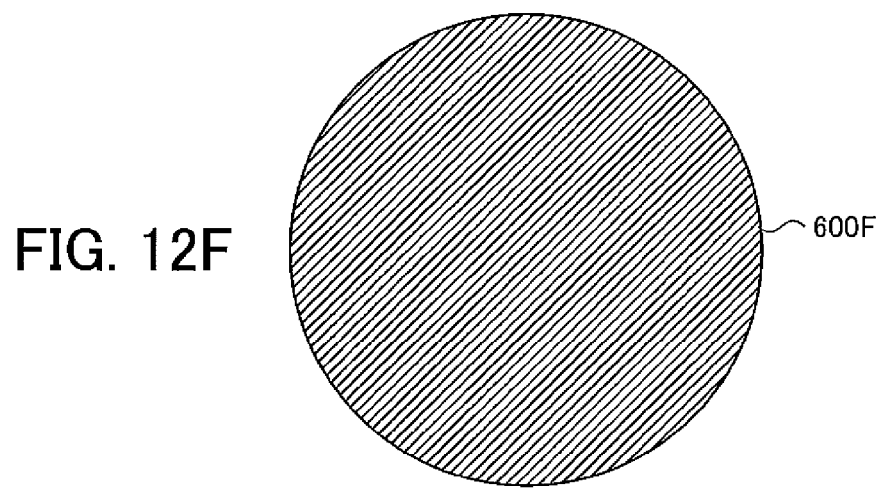

At step P230, whether or not the received data of degree of smoothness is "6" is determined. If the received data of degree of smoothness is "6", PC 500 waits for the coordinate input operation by touch pen 108 to the operating surface of transparent touch panel 204 (step P232). If the coordinate input operation is done, PC 500 refers to the object image size changing data stored in object image size storage area 504 using the data of degree of smoothness "6" as a parameter, and obtains the sixth size as the drawing size, which is larger than the fifth size. Based on the reference, PC 500 displays object image GOOF of the sixth size as shown in FIG. 12F, at a position corresponding to the coordinates input by touch pen 108, on the display area of large LCD 202 (step P234). Then, the object image display process ends.

If the received data of degree of smoothness is none of "1" to "6", the control again returns to step P200 shown in FIG. 9.

<Operation>

In the present embodiment, as the coordinate input operation, the operator brings pen tip portion 400 of touch pen 108 into contact with the operating surface of transparent touch panel 204. In response to the operation, object image 600 is displayed at a position corresponding to the input coordinates in the display area of large LCD 202. As the level of pushing amount of pushing member 412 becomes deeper (in other words, as the amount of pushing increases), the degree of smoothness of pen tip portion 400 of touch pen 108 decreases. The degree of smoothness of pen tip portion 400 is notified to PC 500 on the side of main body 104 of the apparatus. In response to the notification, PC 500 displays object image 600 with the size (thickness) changed, on the display area of LCD 202, in accordance with the notified degree of smoothness.

<Functions/Effects>

The present embodiment attains the following functions/effects.

(1) Touch pen 108 has switching mechanism 402 and, therefore, it is possible to change the degree of smoothness of the pen tip portion of touch pen 108 as preferred by the presenter 106. As a result, it is possible to set the degree of smoothness of pen tip portion to the degree that is satisfactory to the presenter 106 to write well. When pen tip portion 400 of touch pen 108 is brought into contact with the operating surface of touch panel 204, object image 600 is displayed at the position corresponding to the position of input coordinates in the display area of large LCD 202. At this time, the degree of smoothness of pen tip portion 400 of touch pen 108 is notified to the main body 104 of the apparatus. In accordance with the notified degree of smoothness, main body 104 of the apparatus displays the object image 600 with the size changed. As the degree of smoothness of pen tip portion 400 is linked to the display size of object image 600 displayed using the coordinate input operation as a trigger, it becomes possible to realize the operation feeling of presenter 106 operating the touch pen 108 that matches the display size of the object. Particularly, the present embodiment is adapted such that, when the degree of smoothness of pen tip portion 400 is decreased, a thick object image is input. Presenter 106 feels as if he/she uses a pen with thick pen nib, while a thick object image 600 is drawn. The operational feeling of presenter 106 at the time of coordinate input operation using touch pen 108 can be improved, without necessitating any processing of the operating surface of touch panel 204 or exchanging the pen tip portion 400 of touch pen 108.

(2) When presenter 106 switches the amount of pushing of pushing member 412 of touch pen 108 to a desired level, the pushing force of tip pushing member 410 to rolling tip 404 changes. Accordingly, the degree of rolling of rolling tip 404 changes. Switching of the degree of smoothness of pen tip portion 400 of touch pen 108 can be attained by a simple operation of pushing the pushing member 412 into pen holder 408.

(3) When the amount of pushing is changed, the operator turns operation lever 420 about lateral axis 418 while pushing the pushing member 412, so that engaging piece 424 is engaged with receiving slot 428, 430, 432, 434, 436 or 438. By this simple operation, the amount of pushing of pushing member 412 can be locked at the desired level. As the operation lever 420 is urged toward pushing member 412 by the urging force of second spring 440, engaging piece and receiving slot 428, 430, 432, 434, 436 or 438 can firmly be engaged.

(4) When presenter 106 presses operating piece 426 by his/her finger and turns operation lever 420 about lateral axis 418 in a direction against the urging force of second spring 440, engaging piece 424 is separated from receiving slot 428, 430, 432, 434, 436 or 438. Pushing force of pushing member 412 is released. When the operating piece 426 is let loose thereafter, operation lever 420 automatically turns about lateral axis 418 toward pushing member 412 because of the urging force of second spring 440. As a result, switching of the pushing amount of pushing member 412 can be realized by a simple operation.

(5) Six indexes 442, 444, 446, 448, 450 and 452 indicating the amount of pushing of pushing member 412 are provided. When the amount of pushing is switched, one index corresponding to the pushing amount can be seen through window 454 of pen holder 408. As a result, one can easily confirm the amount of pushing of pushing member 412.

Second Embodiment

The present embodiment is characterized in that in accordance with the degree of smoothness of pen tip portion 400 of touch pen 108, the shape of displaying object image 600 is changed. Except for this point, the configuration is the same as that of the first embodiment.

<Hardware Configuration>

Referring to FIG. 13, overall control of display apparatus 100 in accordance with the present embodiment is done by PC 500 on the side of main body 104 of the apparatus. PC 500 has an object image shape storage area 700. Object image shape storage area 700 stores data for displaying object image 600 with its shape changed in accordance with the level of pushing amount of pushing member 412 of touch pen 108 (hereinafter the data will be referred to as the "object image shape changing data").

<Software Configuration>

Display apparatus 100 in accordance with the present embodiment is programmed such that the displayed shape of object image 600 is changed in a manner linked with the change of degree of smoothness of pen tip portion 400 of touch pen 108. The program is a part of software resources for realizing various functions of display apparatus 100 as will be described in the following, and the program is partially stored in the ROM of PC 500 on the side of main body 104 of the apparatus and partially stored in the ROM of control device 506 on the side of touch pen 108. These functions are carried out by PC 500 on the side of main body 104 and control device 506 on the side of touch pen 108 executing the program.

The program of the main routine of display apparatus 100 in accordance with the present embodiment is the same as that of the first embodiment and, therefore, description thereof will not be repeated here.

Figure 14:
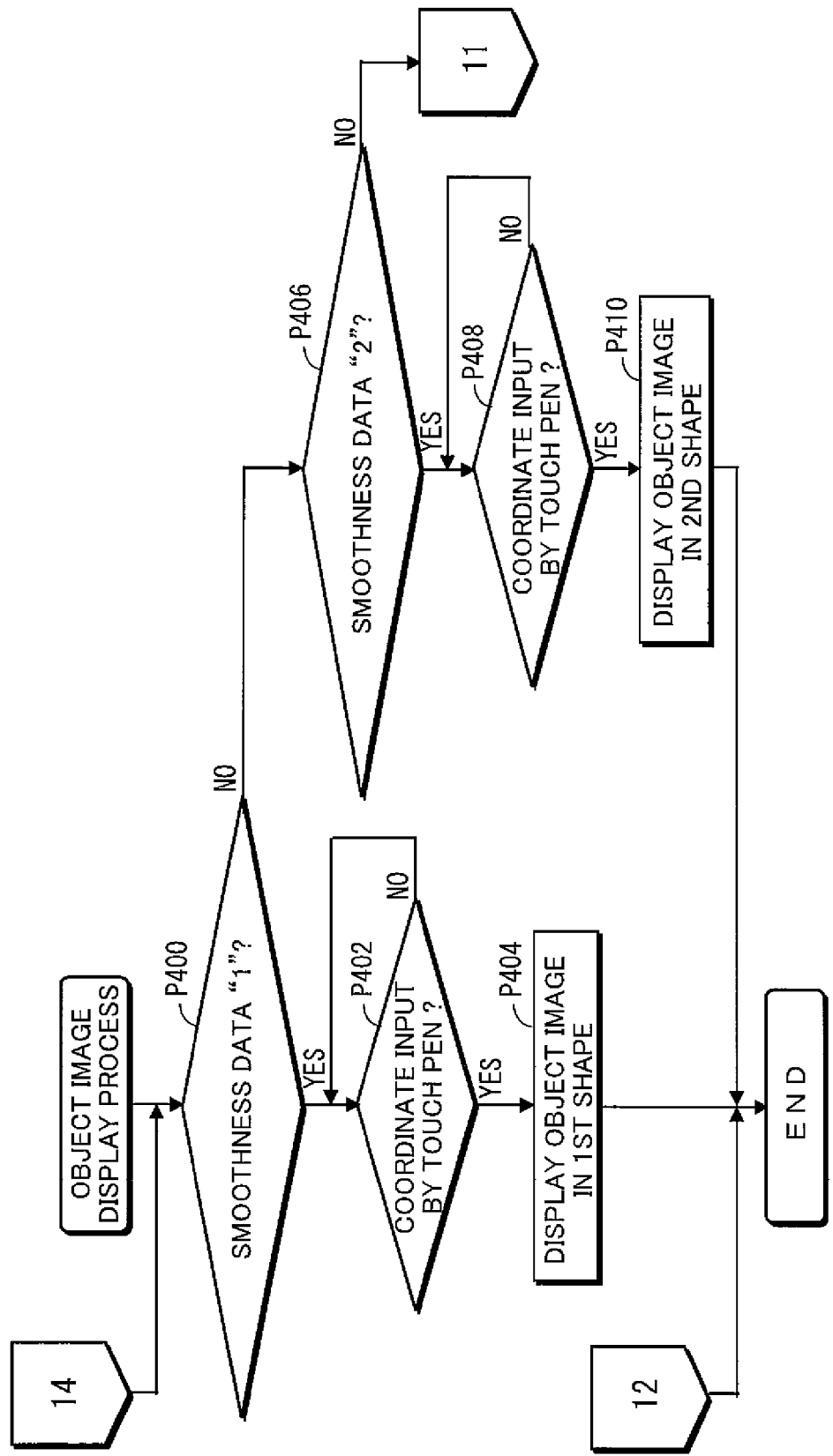
FIGS. 14 to 16 show, in flowcharts, a program structure for realizing the object image display process by the display apparatus in accordance with the second embodiment.
Figure 17A:
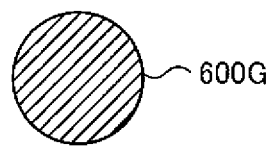
FIGS. 17A to 17F show the manner how the display shape of the object image changes.

Referring to FIG. 14, in the object image display process executed by PC 500, whether or not the received data of degree of smoothness is "1" is determined (step P400). If the received data of degree of smoothness is "1", PC 500 waits for the coordinate input operation by touch pen 108 to the operating surface of transparent touch panel 204 (step P402). If the coordinate input operation is done, PC 500 displays object image 600 at a position corresponding to the coordinates input by touch pen 108, on the display area of large LCD 202. At this time, PC 500 refers to the object image shape changing data stored in object image shape storage area 700 using the data of degree of smoothness "1" as a parameter, and obtains the first shape as the image shape of drawing. The first shape is a circle. Based on the reference, PC 500 displays object image 600G of the first shape as shown in FIG. 17A (step P404). Then, the object image display process ends. If the received data of degree of smoothness is not "1", the control proceeds to step P406.

Figure 17B:
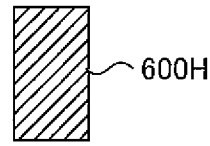

At step P406, whether or not the received data of degree of smoothness is "2" is determined. If the received data of degree of smoothness is "2", PC 500 waits for the coordinate input operation by touch pen 108 to the operating surface of transparent touch panel 204 (step P408). If the coordinate input operation is done, PC 500 refers to the object image shape changing data stored in object image shape storage area 700 using the data of degree of smoothness "2" as a parameter, and obtains the second shape as the drawing image shape. The second shape is a rectangle. Based on the reference, PC 500 displays object image 600H of the second shape as shown in FIG. 17B at a position corresponding to the coordinates input by touch pen 108, on the display area of large LCD 202 (step P410). Then, the object image display process ends. If the received data of degree of smoothness is not "2", the control proceeds to step P412 shown in FIG. 15.

Figure 15:
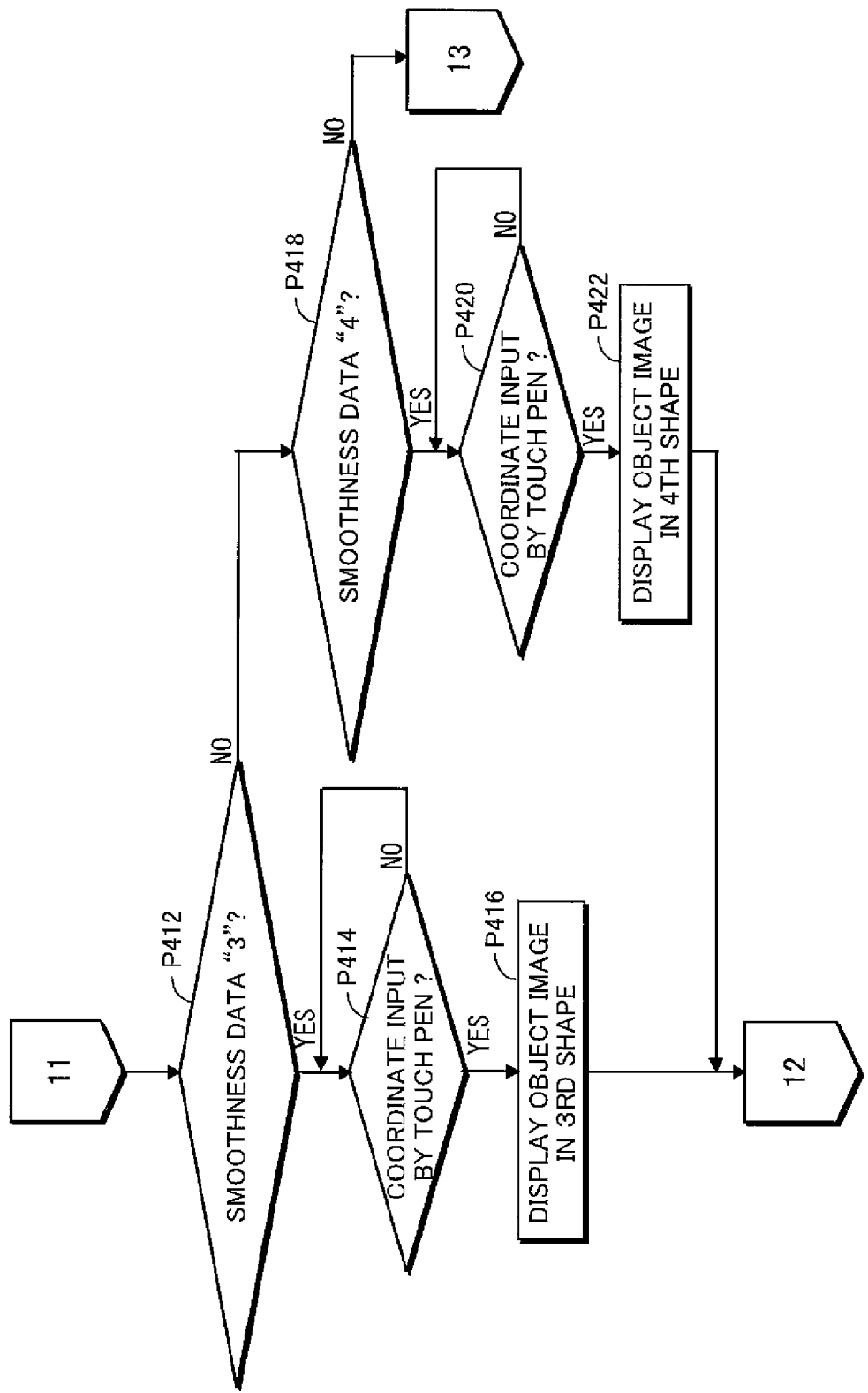
Figure 17C:
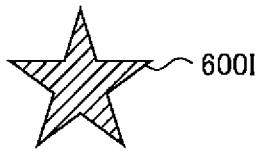

Referring to FIG. 15, at step P412, whether or not the received data of degree of smoothness is "3" is determined. If the received data of degree of smoothness is "3", PC 500 waits for the coordinate input operation by touch pen 108 to the operating surface of transparent touch panel 204 (step P414). If the coordinate input operation is done by touch pen 108 to touch panel 204, PC 500 refers to the object image shape changing data stored in object image shape storage area 700 using the data of degree of smoothness "3" as a parameter, and obtains the third shape as the drawing image shape. The third shape is a star. Based on the reference, PC 500 displays object image 600I of the third shape as shown in FIG. 17C, at a position corresponding to the coordinates input by touch pen 108, on the display area of large LCD 202 (step P416). Then, the object image display process ends. If the received data of degree of smoothness is not "3", the control proceeds to step P418.

At step P418, whether or not the received data of degree of smoothness is "4" is determined. If the received data of degree of smoothness is "4", PC 500 waits for the coordinate input operation by touch pen 108 to the operating surface of transparent touch panel 204 (step P420). If the coordinate input operation is done, PC 500 refers to the object image shape changing data stored in object image shape storage area 700 using the data of degree of smoothness "4" as a parameter, and obtains the fourth shape as the drawing image shape. The fourth shape is a square. Based on the reference, PC 500 displays object image 600J of the fourth shape as shown in FIG. 17D, at a position corresponding to the coordinates input by touch pen 108, on the display area of large LCD 202 (step P422). Then, the object image display process ends. If the received data of degree of smoothness is not "4", the control proceeds to step P424 shown in FIG. 16.

Figure 16:
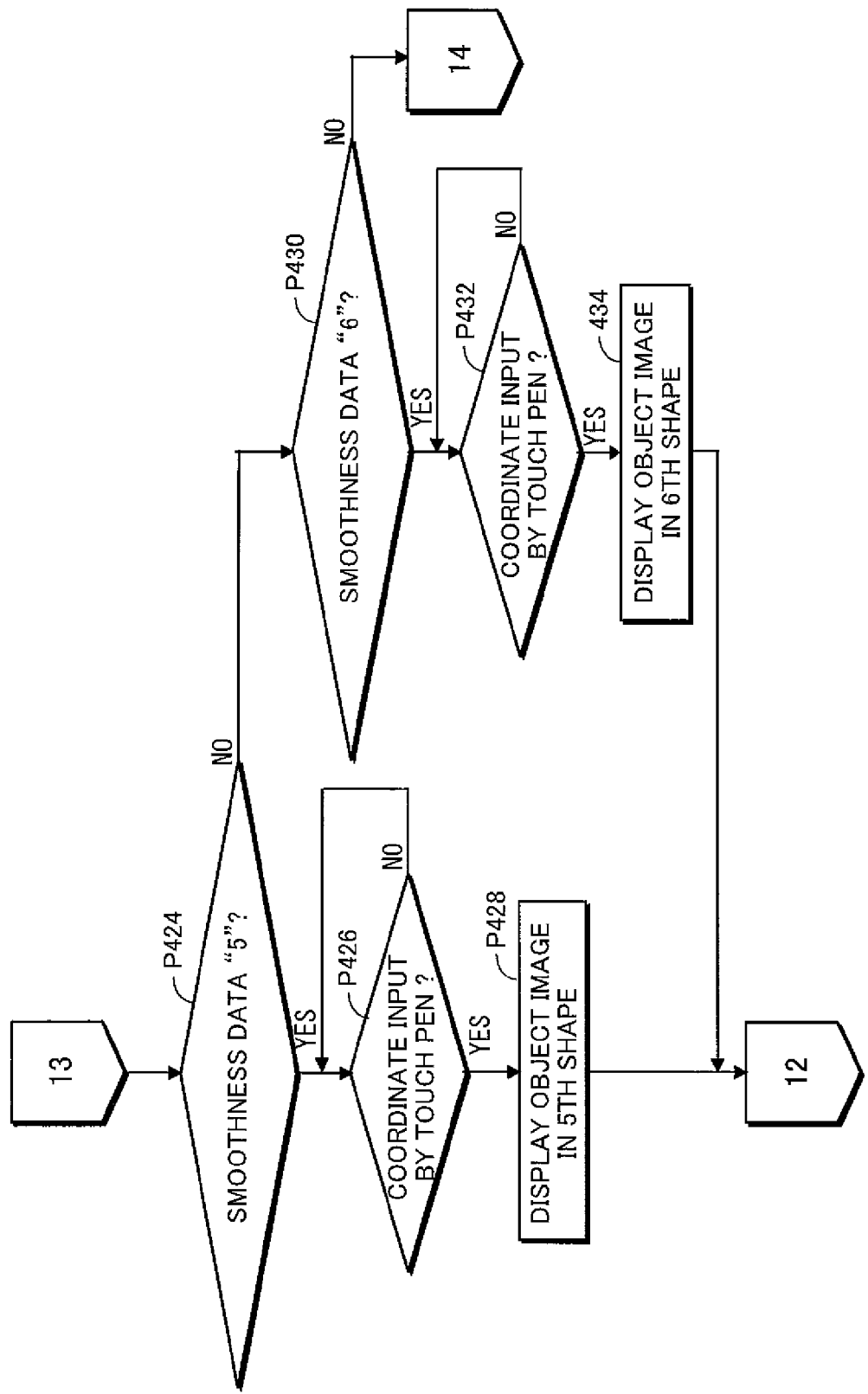
Figure 17D:
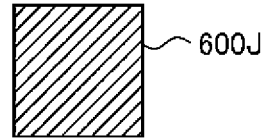
Figure 17E:

Referring to FIG. 16, at step P424, whether or not the received data of degree of smoothness is "5" is determined. If the received data of degree of smoothness is "5", PC 500 waits for the coordinate input operation by touch pen 108 to the operating surface of transparent touch panel 204 (step P426). If the coordinate input operation by touch pen 108 to the operating surface of transparent touch panel 204 is done, PC 500 refers to the object image shape changing data stored in object image shape storage area 700 using the data of degree of smoothness "5" as a parameter, and obtains the fifth shape as the drawing image shape. The fifth shape is a triangle. Based on the reference, PC 500 displays object image 600K of the fifth shape as shown in FIG. 17E, at a position corresponding to the coordinates input by touch pen 108, on the display area of large LCD 202 (step P428). Then, the object image display process ends. If the received data of degree of smoothness is not "5", the control proceeds to step P430.

Figure 17F:
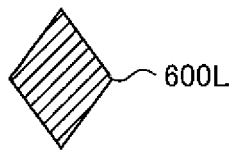

At step P430, whether or not the received data of degree of smoothness is "6" is determined. If the received data of degree of smoothness is "6", PC 500 waits for the coordinate input operation by touch pen 108 to the operating surface of transparent touch panel 204 (step P432). If the coordinate input operation is done, PC 500 refers to the object image shape changing data stored in object image shape storage area 700 using the data of degree of smoothness "6" as a parameter, and obtains the sixth shape as the drawing image shape. The sixth shape is a rhomboid. Based on the reference, PC 500 displays object image 600L of the sixth shape as shown in FIG. 17F, at a position corresponding to the coordinates input by touch pen 108, on the display area of large LCD 202 (step P434). Then, the object image display process ends. If the received data of degree of smoothness is not "6", the control proceeds to step P400 shown in FIG. 14.

<Operation>

In the present embodiment, as the coordinate input operation, the operator brings pen tip portion 400 of touch pen 108 into contact with the operating surface of transparent touch panel 204. In response to the operation, object image 600 is displayed at a position corresponding to the input coordinates of large LCD 202. As the level of pushing amount of pushing member 412 becomes deeper, the degree of smoothness of pen tip portion 400 decreases. The degree of smoothness of pen tip portion 400 is notified to PC 500 on the side of main body 104 of the apparatus. In response to the notification, PC 500 displays object image 600 with the shape changed, on the display area of LCD 202, in accordance with the notified degree of smoothness of pen tip portion 400 of touch pen 108.

<Functions/Effects>

In addition to the functions/effects (2) to (5) of the first embodiment, the present embodiment additionally attains the following functions/effects.

When pen tip portion 400 of touch pen 108 is brought into contact with the operating surface of touch panel 204, object image 600 is displayed at the position corresponding to the position of input coordinates of large LCD 202. At this time, the degree of smoothness of pen tip portion 400 of touch pen 108 is notified to the main body 104 of the apparatus. In accordance with the notified degree of smoothness, main body 104 of the apparatus displays the object image 600 with the shape changed. As the degree of smoothness of pen tip portion 400 is linked to the display shape of object image 600 displayed using the coordinate input operation as a trigger, it becomes possible to realize the operation feeling of presenter 106 operating the touch pen 108 that matches the display shape of the object. The operational feeling of presenter 106 at the time of coordinate input operation using touch pen 108 can be improved, without necessitating any processing of the operating surface of touch panel 204 or exchanging the pen tip portion 400 of touch pen 108.

Third Embodiment

The present embodiment is characterized in that in accordance with the degree of smoothness of pen tip portion 400 of touch pen 108, the density of displaying object image 600 is changed. Except for this point, the configuration is the same as that of the first embodiment.

<Hardware Configuration>

Referring to FIG. 18, overall control of display apparatus 100 in accordance with the present embodiment is done by PC 500 on the side of main body 104 of the apparatus. PC 500 has an object image density storage area 800. Object image density storage area 800 stores data for displaying object image 600 with its density changed in accordance with the level of pushing amount of pushing member 412 of touch pen 108 (hereinafter the data will be referred to as the "object image density changing data").

<Software Configuration>

Display apparatus 100 in accordance with the present embodiment is programmed such that the displayed density of object image 600 is changed in a manner linked with the change of degree of smoothness of pen tip portion 400 of touch pen 108. The program is a part of software resources for realizing various functions of display apparatus 100 as will be described in the following, and the program is partially stored in the ROM of PC 500 on the side of main body 104 of the apparatus and partially stored in the ROM of control device 506 on the side of touch pen 108. These functions are carried out by PC 500 on the side of main body 104 and control device 506 on the side of touch pen 108 executing the program.

The program of the main routine of display apparatus 100 in accordance with the present embodiment is the same as that of the first embodiment and, therefore, description thereof will not be repeated here.

Figure 19:
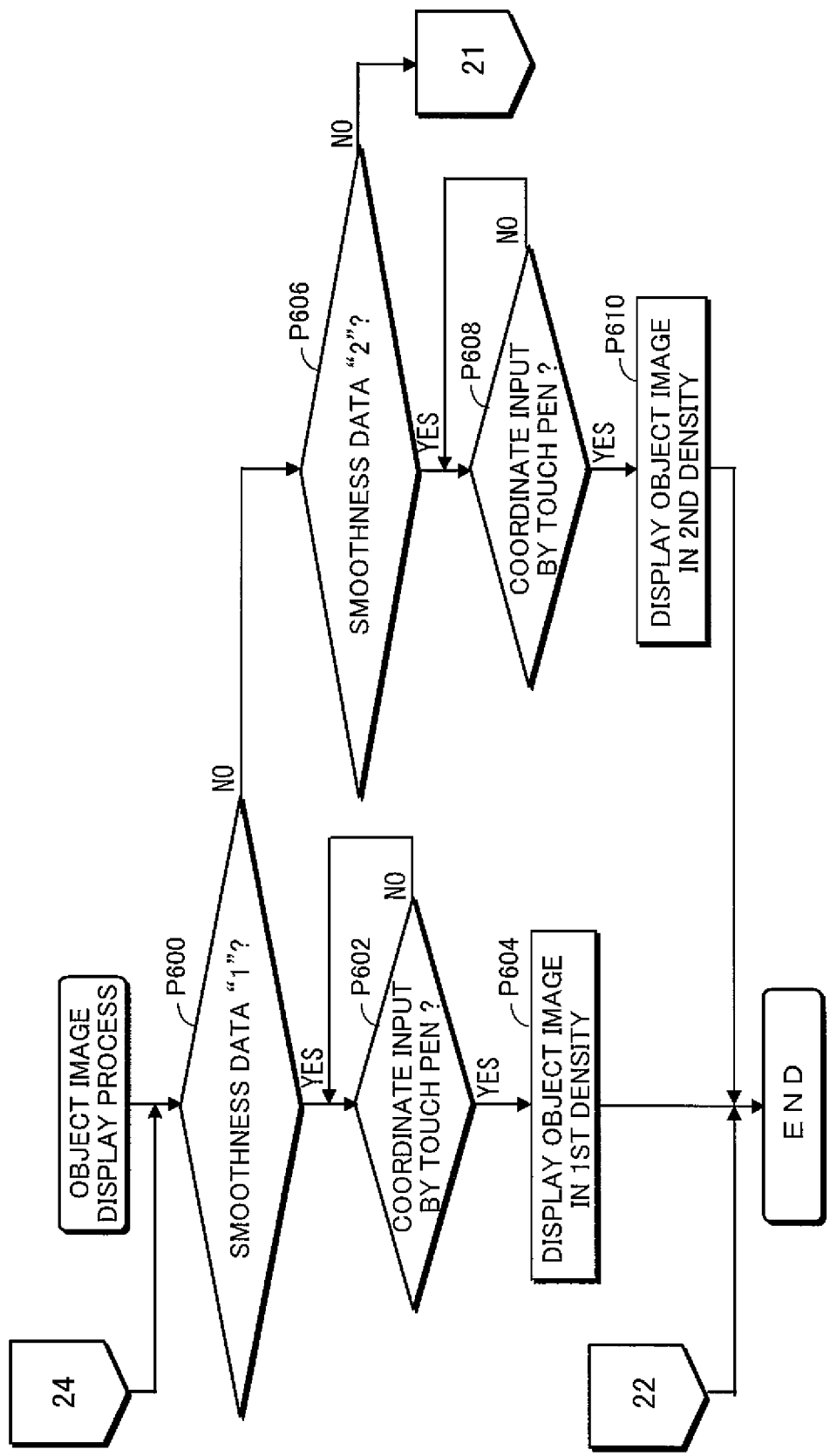
FIGS. 19 to 21 show, in flowcharts, a program structure for realizing the object image display process by the display apparatus in accordance with the third embodiment.
Figure 22A:
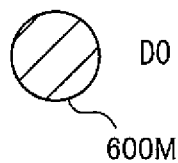
FIGS. 22A to 22F show the manner how the display density of the object image changes.

Referring to FIG. 19, in the object image display process executed by PC 500, whether or not the received data of degree of smoothness is "1" is determined (step P600). If the received data of degree of smoothness is "1", PC 500 waits for the coordinate input operation by touch pen 108 to the operating surface of transparent touch panel 204 (step P602). If the coordinate input operation is done, PC 500 displays object image 600 at a position corresponding to the coordinates input by touch pen 108, on the display area of large LCD 202. At this time, PC 500 refers to the object image density changing data stored in object image density storage area 800 using the data of degree of smoothness "1" as a parameter, and obtains the first density D0 as the display density. The first density is the brightest density. Based on the reference, PC 500 displays object image 600M of the first density as shown in FIG. 22A (step P604). Then, the object image display process ends. If the received data of degree of smoothness is not "1", the control proceeds to step P606.

Figure 22B:
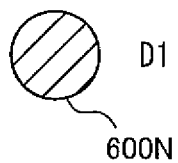

At step P606, whether or not the received data of degree of smoothness is "2" is determined. If the received data of degree of smoothness is "2", PC 500 waits for the coordinate input operation by touch pen 108 to the operating surface of transparent touch panel 204 (step P608). If the coordinate input operation is done, PC 500 displays object image 600 at a position corresponding to the coordinates input by touch pen 108, on the display area of large LCD 202. At this time, PC 500 refers to the object image density changing data stored in object image density storage area 800 using the data of degree of smoothness "2" as a parameter, and obtains the second density D1 as the display density. The second density D1 is darker than the first density D0. Based on the reference, PC 500 displays object image 600N of the second density as shown in FIG. 22B (step P610). Then, the object image display process ends. If the received data of degree of smoothness is not "2", the control proceeds to step P612 shown in FIG. 20.

Figure 20:
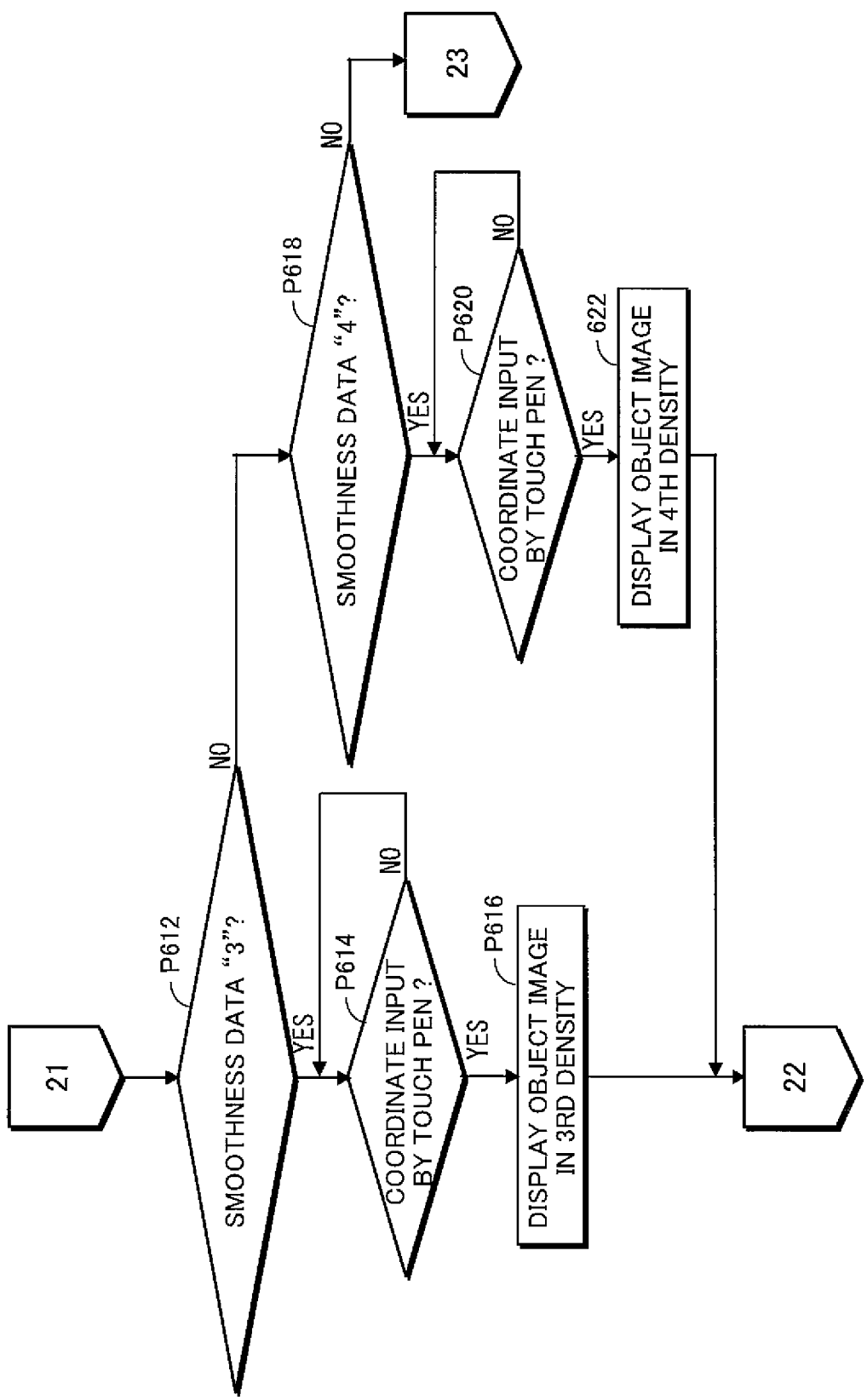
Figure 22C:
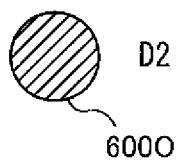

Referring to FIG. 20, at step P612, whether or not the received data of degree of smoothness is "3" is determined. If the received data of degree of smoothness is "3", PC 500 waits for the coordinate input operation by touch pen 108 to the operating surface of transparent touch panel 204 (step P614). If the coordinate input operation by touch pen 108 to the operating surface of transparent touch panel 204 is done, PC 500 refers to the object image density changing data stored in object image density storage area 800 using the data of degree of smoothness "3" as a parameter, and obtains the third density D2 as the display density. The third density D2 is darker than the second density D1. Based on the reference, PC 500 displays object image 600O of the third density as shown in FIG. 22C, at a position corresponding to the coordinates input by touch pen 108, on the display area of large LCD 202 (step P616). Then, the object image display process ends. If the received data of degree of smoothness is not "3", the control proceeds to step P618.

At step P618, whether or not the received data of degree of smoothness is "4" is determined. If the received data of degree of smoothness is "4", PC 500 waits for the coordinate input operation by touch pen 108 to the operating surface of transparent touch panel 204 (step P620). If the coordinate input operation is done, PC 500 displays object image 600 at a position corresponding to the coordinates input by touch pen 108, on the display area of large LCD 202. At this time, PC 500 refers to the object image density changing data stored in object image density storage area 800 using the data of degree of smoothness "4" as a parameter, and obtains the fourth density D3 as the display density. The fourth density D3 is darker than the third density D2. Based on the reference, PC 500 displays object image 600P of the fourth density as shown in FIG. 22D (step P622). Then, the object image display process ends. If the received data of degree of smoothness is not "4", the control proceeds to step P624 shown in FIG. 21.

Figure 21:
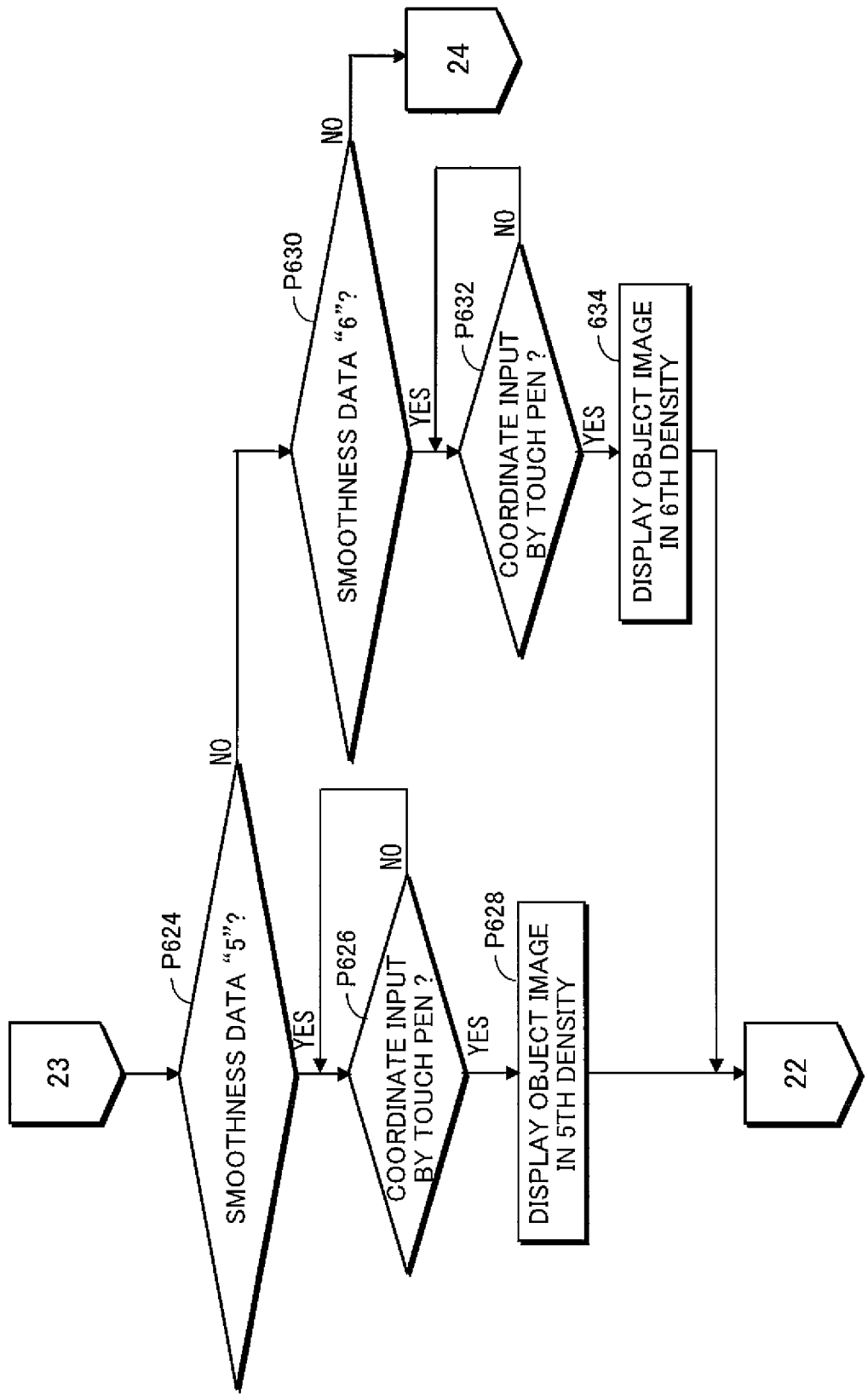
Figure 22D:
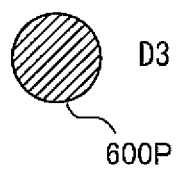
Figure 22E:

Referring to FIG. 21, at step P624, whether or not the received data of degree of smoothness is "5" is determined. If the received data of degree of smoothness is "5", PC 500 waits for the coordinate input operation by touch pen 108 to the operating surface of transparent touch panel 204 (step P626). If the coordinate input operation by touch pen 108 to the operating surface of transparent touch panel 204 is done, PC 500 refers to the object image density changing data stored in object image density storage area 800 using the data of degree of smoothness "5" as a parameter, and obtains the fifth density D4 as the display density. The fifth density D4 is darker than the fourth density D3. Based on the reference, PC 500 displays object image 600Q of the fifth density as shown in FIG. 22E, at a position corresponding to the coordinates input by touch pen 108, on the display area of large LCD 202 (step P628). Then, the object image display process ends. If the received data of degree of smoothness is not "5", the control proceeds to step P630.

Figure 22F:

At step P630, whether or not the received data of degree of smoothness is "6" is determined. If the received data of degree of smoothness is "6", PC 500 waits for the coordinate input operation by touch pen 108 to the operating surface of transparent touch panel 204 (step P632). If the coordinate input operation is done, PC 500 displays object image 600 at a position corresponding to the coordinates input by touch pen 108, on the display area of large LCD 202. At this time, PC 500 refers to the object image density changing data stored in object image density storage area 800 using the data of degree of smoothness "6" as a parameter, and obtains the sixth density D5 as the display density. The sixth density D5 is darker than the fifth density D4. Based on the reference, PC 500 displays object image 600R of the sixth density as shown in FIG. 22F (step P634). Then, the object image display process ends. If the received data of degree of smoothness is not "6", the control proceeds to step P600 shown in FIG. 19.

<Operation>

In the present embodiment, as the coordinate input operation, the operator brings pen tip portion 400 of touch pen 108 into contact with the operating surface of transparent touch panel 204. In response to the operation, object image 600 is displayed at a position corresponding to the input coordinates in the display area of large LCD 202. As the level of pushing amount of pushing member 412 becomes deeper, the degree of smoothness of pen tip portion 400 of touch pen 108 decreases. The degree of smoothness of pen tip portion 400 is notified to PC 500 on the side of main body 104 of the apparatus. In response to the notification, PC 500 displays object image 600 with the display density changed, on the display area of LCD 202, in accordance with the notified degree of smoothness of pen tip portion 400 of touch pen 108.

<Functions/Effects>

In addition to the functions/effects (2) to (5) of the first embodiment, the present embodiment additionally attains the following functions/effects.

When pen tip portion 400 of touch pen 108 is brought into contact with the operating surface of touch panel 204, object image 600 is displayed at the position corresponding to the position of input coordinates in the display area of large LCD 202. At this time, the degree of smoothness of pen tip portion 400 of touch pen 108 is notified to the main body 104 of the apparatus. In accordance with the notified degree of smoothness, main body 104 of the apparatus displays the object image 600 with the density changed. As the degree of smoothness of pen tip portion 400 is linked to the display density of object image 600 displayed using the coordinate input operation as a trigger, it becomes possible to realize the operation feeling of presenter 106 operating the touch pen 108 that matches the display density of the object. The operational feeling of presenter 106 at the time of coordinate input operation using touch pen 108 can be improved, without necessitating any processing of the operating surface of touch panel 204 or exchanging the pen tip portion 400 of touch pen 108.

Fourth Embodiment

The present embodiment is characterized in that in accordance with the degree of smoothness of pen tip portion 400 of touch pen 108, the color of displaying object image 600 is changed. Except for this point, the configuration is the same as that of the first embodiment.

<Hardware Configuration>

Referring to FIG. 23, overall control of display apparatus 100 in accordance with the present embodiment is done by PC 500 on the side of main body 104 of the apparatus. PC 500 has an object image color storage area 900. Object image color storage area 900 stores data for displaying object image 600 with its color changed in accordance with the level of pushing amount of pushing member 412 of touch pen 108 (hereinafter the data will be referred to as the "object image color changing data").

<Software Configuration>

Display apparatus 100 in accordance with the present embodiment is programmed such that the displayed color of object image 600 is changed in a manner linked with the change of degree of smoothness of pen tip portion 400 of touch pen 108. The program is a part of software resources for realizing various functions of display apparatus 100 as will be described in the following, and the program is partially stored in the ROM of PC 500 on the side of main body 104 of the apparatus and partially stored in the ROM of control device 506 on the side of touch pen 108. These functions are carried out by PC 500 on the side of main body 104 and control device 506 on the side of touch pen 108 executing the program.

The program of the main routine of display apparatus 100 in accordance with the present embodiment is the same as that of the first embodiment and, therefore, description thereof will not be repeated here.

Figure 24:
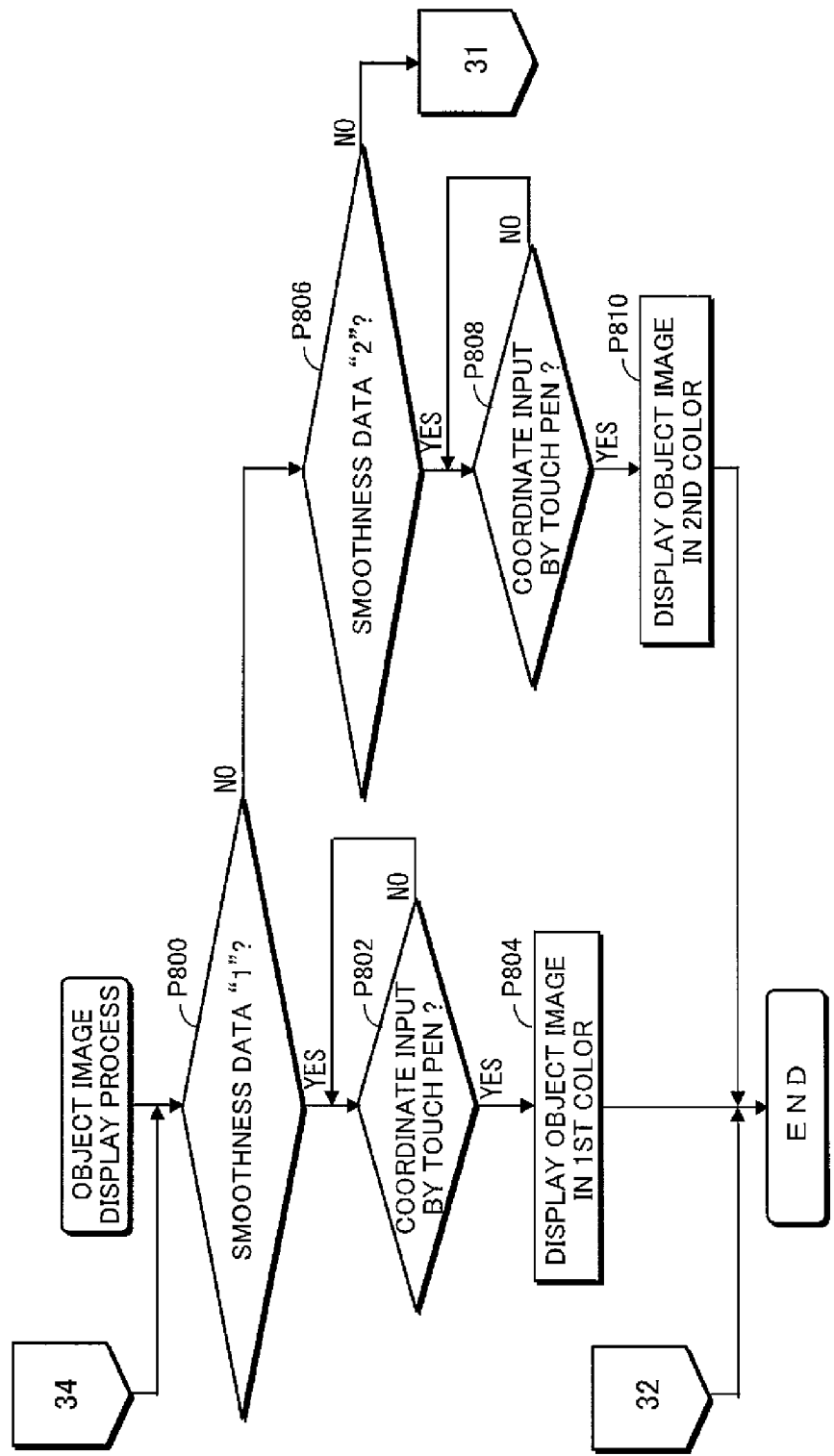
FIGS. 24 to 26 show, in flowcharts, a program structure for realizing the object image display process by the display apparatus in accordance with the fourth embodiment.
Figure 27A:
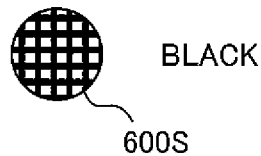
FIGS. 27A to 27F show the manner how the display color of the object image changes.

Referring to FIG. 24, in the object image display process executed by PC 500, whether or not the received data of degree of smoothness is "1" is determined (step P800). If the received data of degree of smoothness is "1", PC 500 waits for the coordinate input operation by touch pen 108 to the operating surface of transparent touch panel 204 (step P802). If the coordinate input operation is done, PC 500 displays object image 600 at a position corresponding to the coordinates input by touch pen 108, on the display area of large LCD 202. At this time, PC 500 refers to the object image color changing data stored in object image color storage area 900 using the data of degree of smoothness "1" as a parameter, and obtains black as the first color. Based on the reference, PC 500 displays object image 600S of the first color as shown in FIG. 27A (step P804). Then, the object image display process ends. If the received data of degree of smoothness is not "1", the control proceeds to step P806.

Figure 27B:
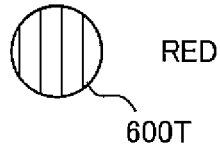

At step P806, whether or not the received data of degree of smoothness is "2" is determined. If the received data of degree of smoothness is "2", PC 500 waits for the coordinate input operation by touch pen 108 to the operating surface of transparent touch panel 204 (step P808). If the coordinate input operation is done, PC 500 displays object image 600 at a position corresponding to the coordinates input by touch pen 108, on the display area of large LCD 202. At this time, PC 500 refers to the object image color changing data stored in object image color storage area 900 using the data of degree of smoothness "2" as a parameter, and obtains red as the second color. Based on the reference, PC 500 displays object image 600T of the second color as shown in FIG. 27B (step P810). Then, the object image display process ends. If the received data of degree of smoothness is not "2", the control proceeds to step P812 shown in FIG. 25.

Figure 25:
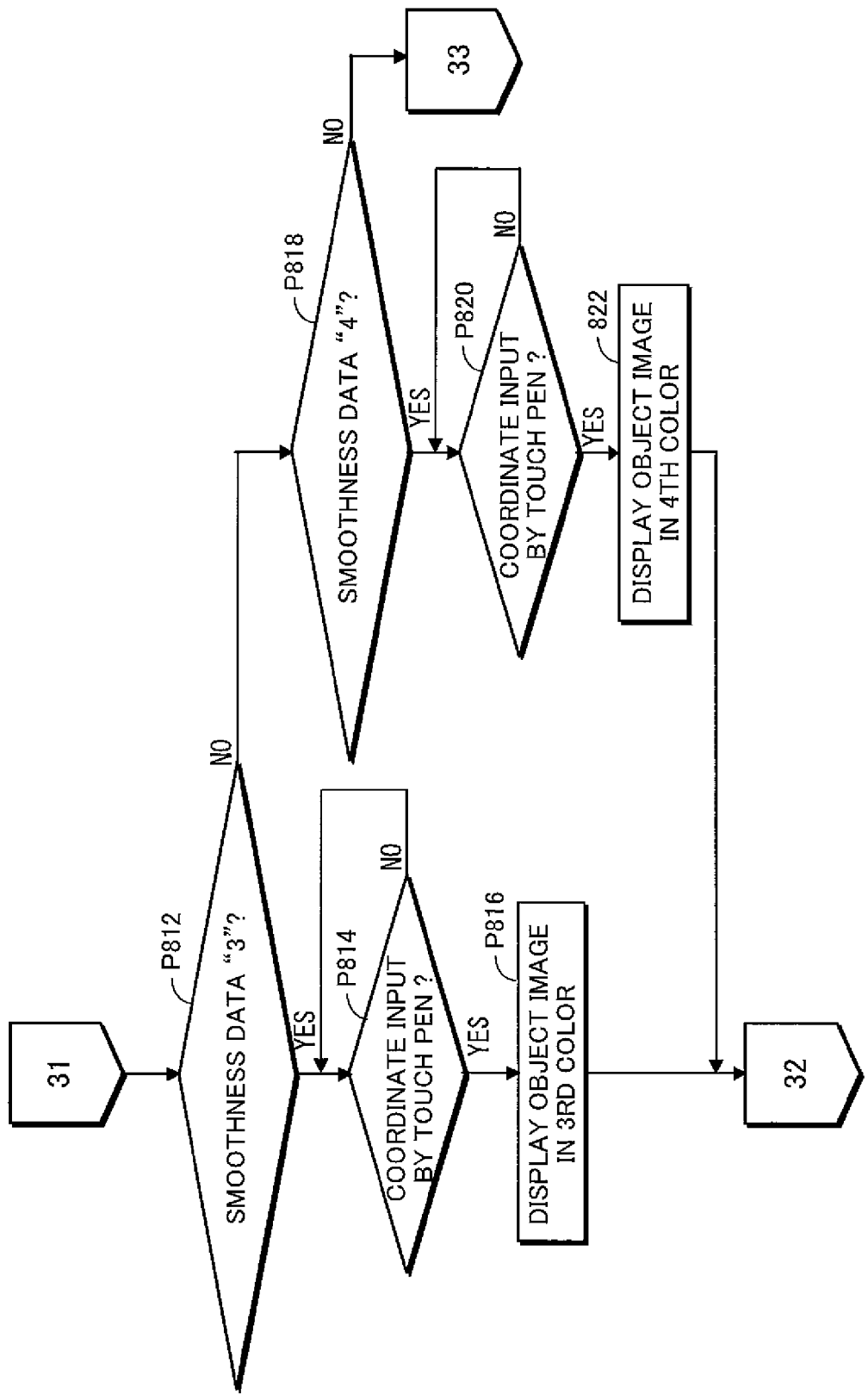
Figure 27C:
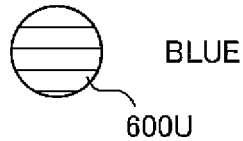

Referring to FIG. 25, at step P812, whether or not the received data of degree of smoothness is "3" is determined. If the received data of degree of smoothness is "3", PC 500 waits for the coordinate input operation by touch pen 108 to the operating surface of transparent touch panel 204 (step P814). If the coordinate input operation is done, PC 500 displays object image 600 at a position corresponding to the coordinates input by touch pen 108, on the display area of large LCD 202. At this time, PC 500 refers to the object image color changing data stored in object image color storage area 900 using the data of degree of smoothness "3" as a parameter, and obtains blue as the third color. Based on the reference, PC 500 displays object image 600U of the third color as shown in FIG. 27C (step P816). Then, the object image display process ends. If the received data of degree of smoothness is not "3", the control proceeds to step P818.

At step P818, whether or not the received data of degree of smoothness is "4" is determined. If the received data of degree of smoothness is "4", PC 500 waits for the coordinate input operation by touch pen 108 to the operating surface of transparent touch panel 204 (step P820). If the coordinate input operation is done, PC 500 displays object image 600 at a position corresponding to the coordinates input by touch pen 108, on the display area of large LCD 202. At this time, PC 500 refers to the object image color changing data stored in object image color storage area 900 using the data of degree of smoothness "4" as a parameter, and obtains white as the fourth color. White as the fourth color is the same as the background color when object image 600 is displayed on LCD 202. Based on the reference, PC 500 displays object image 600V of the fourth color as shown in FIG. 27D (step P822). Then, the object image display process ends. If the received data of degree of smoothness is not "4", the control proceeds to step P824 shown in FIG. 26.

Figure 26:
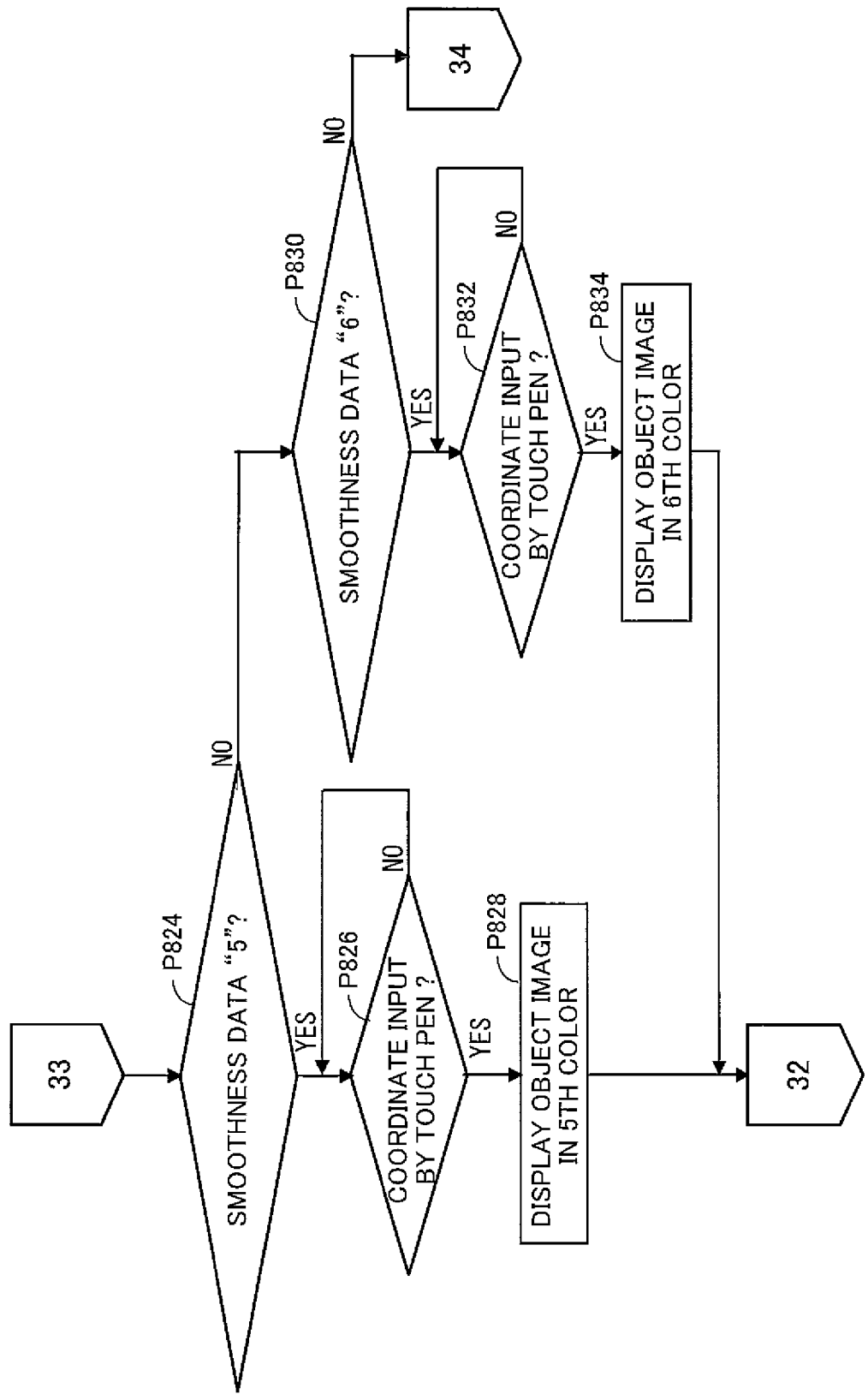
Figure 27D:
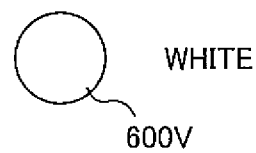
Figure 27E:
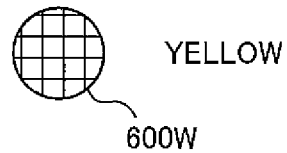

Referring to FIG. 26, at step P824, whether or not the received data of degree of smoothness is "5", is determined. If the received data of degree of smoothness is "5", PC 500 waits for the coordinate input operation by touch pen 108 to the operating surface of transparent touch panel 204 (step P826). If the coordinate input operation is done, PC 500 displays object image 600 at a position corresponding to the coordinates input by touch pen 108, on the display area of large LCD 202. At this time, PC 500 refers to the object image color changing data stored in object image color storage area 900 using the data of degree of smoothness "5" as a parameter, and obtains yellow as the fifth color. Based on the reference, PC 500 displays object image 600W of the fifth color as shown in FIG. 27E (step P828). Then, the object image display process ends. If the received data of degree of smoothness is not "5", the control proceeds to step P830.

Figure 27F:
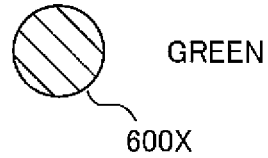
Figure 28A:
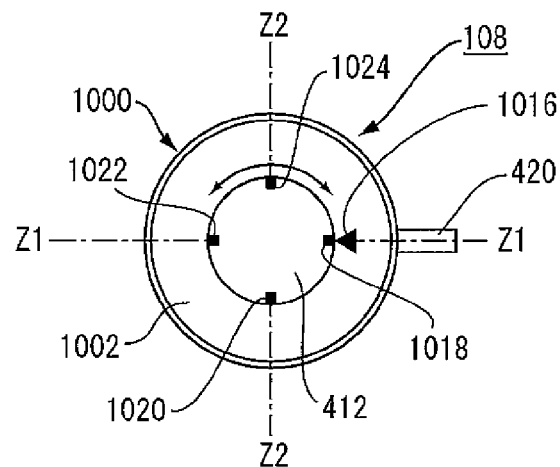
FIG. 28A is a plan view of the touch pen used for the display apparatus in accordance with the fifth embodiment of the present invention.
Figure 28B:
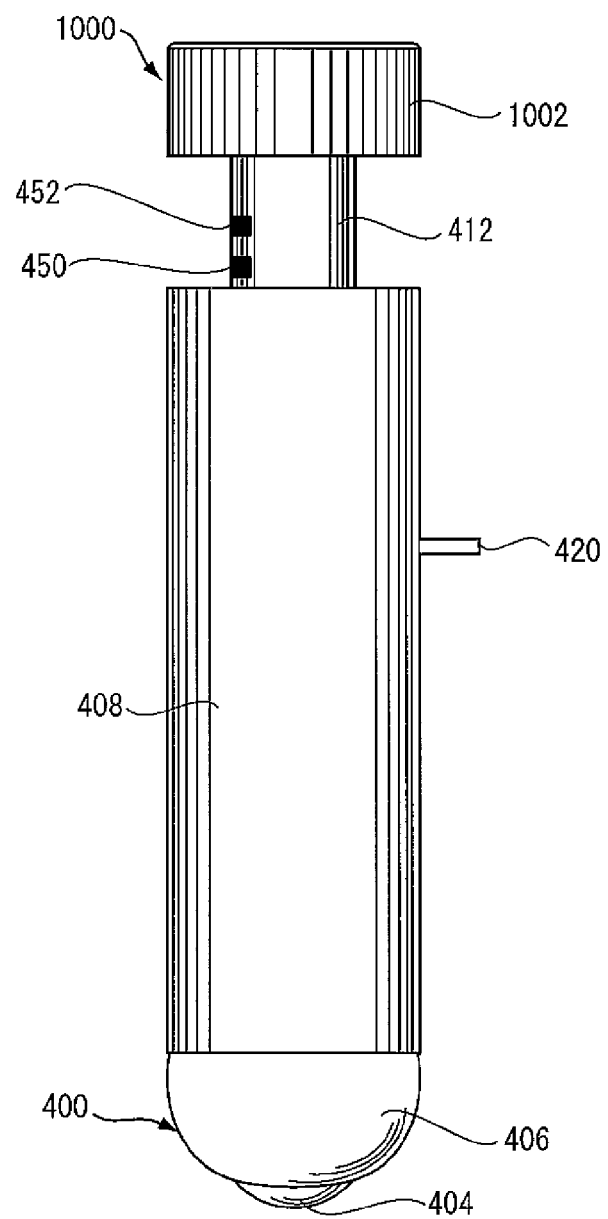
FIG. 28B is a front view of the touch pen shown in FIG. 28A.
Figure 29:
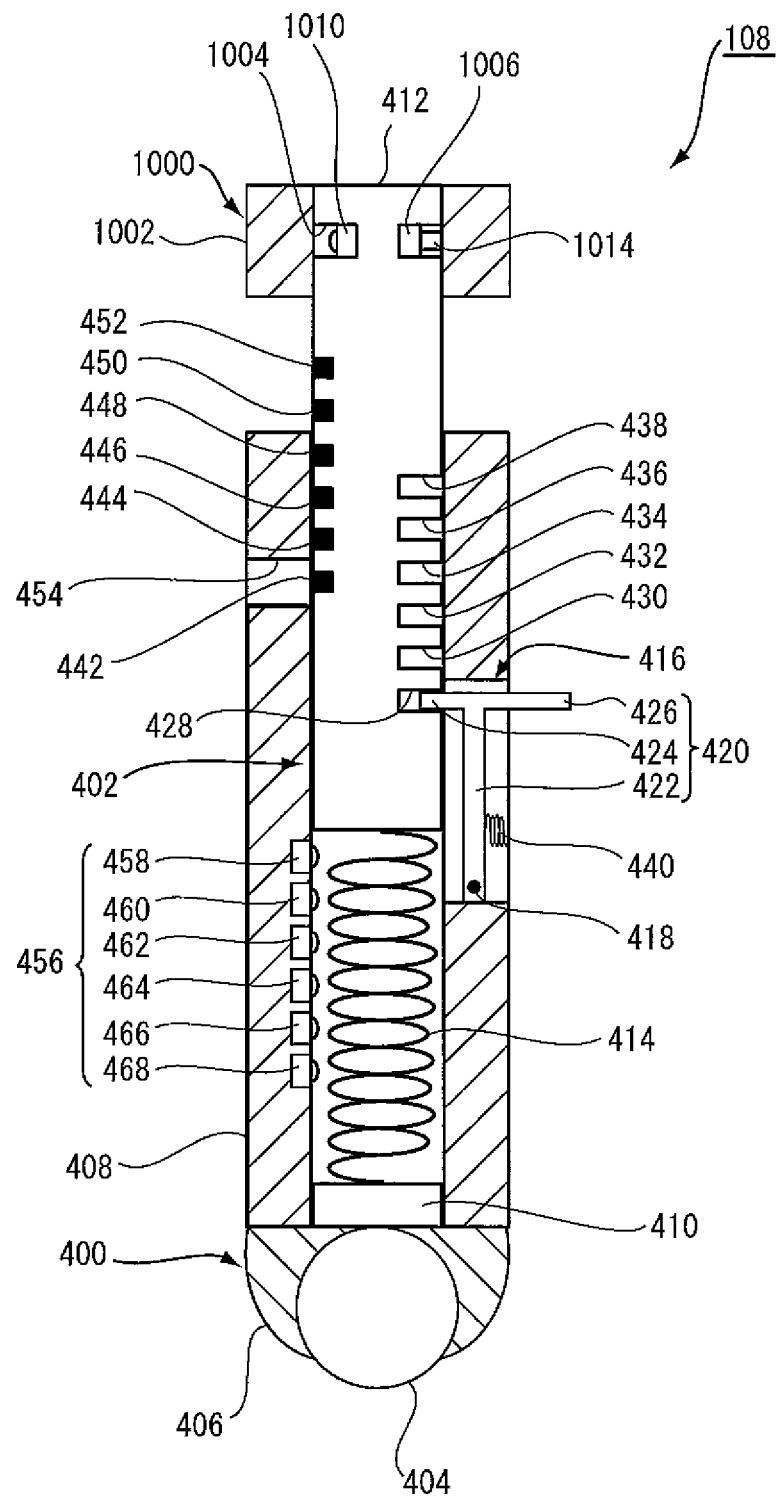
FIG. 29 is a cross-sectional view taken along the line Z1-Z1 of FIG. 28A.
Figure 30:
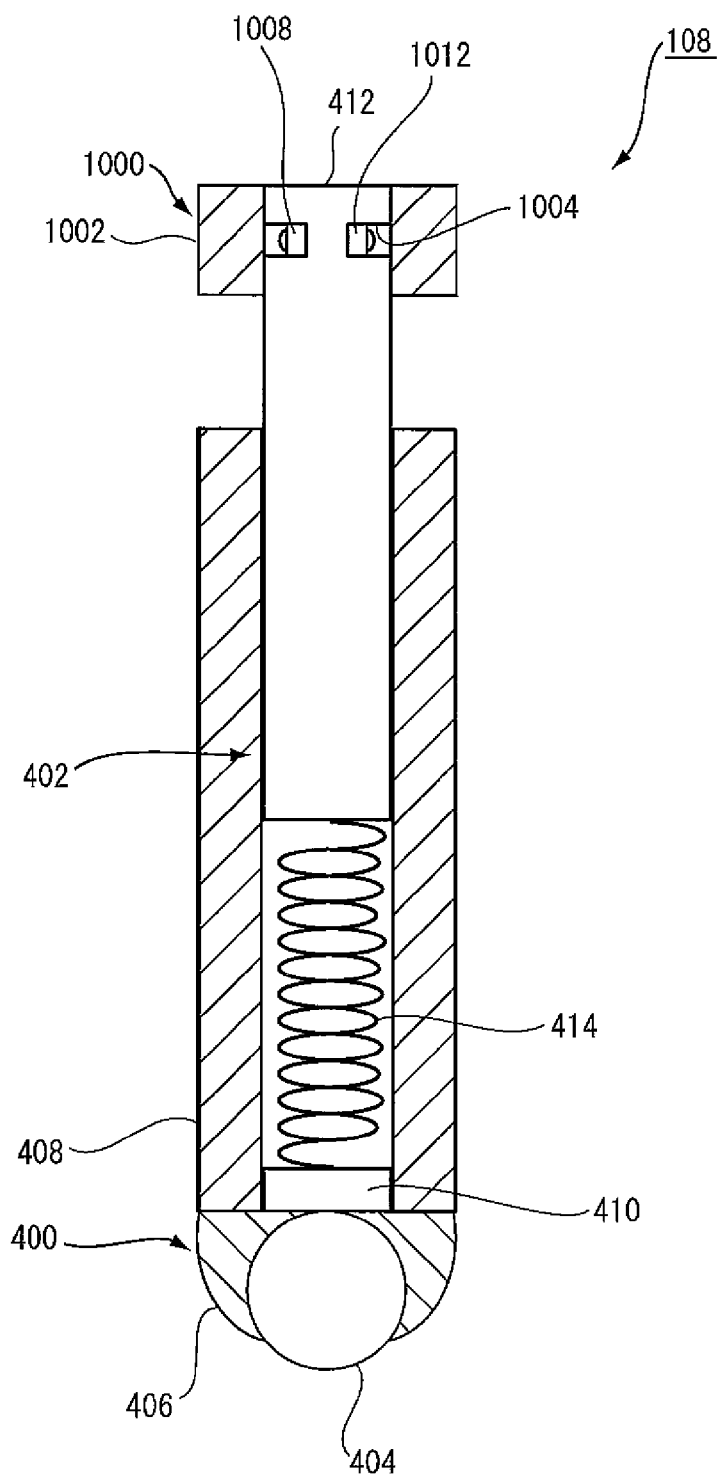
FIG. 30 is a cross-sectional view taken along the line Z2-Z2 of FIG. 28A.

At step P830, whether or not the received data of degree of smoothness is "6" is determined. If the received data of degree of smoothness is "6", PC 500 waits for the coordinate input operation by touch pen 108 to the operating surface of transparent touch panel 204 (step P832). If the coordinate input operation is done, PC 500 displays object image 600 at a position corresponding to the coordinates input by touch pen 108, on the display area of large LCD 202. At this time, PC 500 refers to the object image color changing data stored in object image color storage area 900 using the data of degree of smoothness "6" as a parameter, and obtains green as the sixth color. Based on the reference, PC 500 displays object image 600X of the sixth color as shown in FIG. 27F (step P834). Then, the object image display process ends. If the received data of degree of smoothness is not "6", the control proceeds to step P800 shown in FIG. 24.

<Operation>

In the present embodiment, as the coordinate input operation, the operator brings pen tip portion 400 of touch pen 108 into contact with the operating surface of transparent touch panel 204. In response to the operation, object image 600 is displayed at a position corresponding to the input coordinates in the display area of large LCD 202. As the level of pushing amount of pushing member 412 becomes deeper, the degree of smoothness of pen tip portion 400 of touch pen 108 decreases. The degree of smoothness of pen tip portion 400 is notified to PC 500 on the side of main body 104 of the apparatus. In response to the notification, PC 500 displays object image 600 with the display color changed, on the display area of LCD 202, in accordance with the notified degree of smoothness of pen tip portion 400 of touch pen 108.

<Functions/Effects>

In addition to the functions/effects (2) to (5) of the first embodiment, the present embodiment additionally attains the following functions/effects.

(1) When pen tip portion 400 of touch pen 108 is brought into contact with the operating surface of touch panel 204, object image 600 is displayed at the position corresponding to the position of input coordinates in the display area of large LCD 202. At this time, the degree of smoothness of pen tip portion 400 of touch pen 108 is notified to the main body 104 of the apparatus. In accordance with the notified degree of smoothness, main body 104 of the apparatus displays the object image 600 with the color changed. As the degree of smoothness of pen tip portion 400 is linked to the display color of object image 600 displayed using the coordinate input operation as a trigger, it becomes possible to realize the operation feeling of presenter 106 operating the touch pen 108 that matches the display color of the object. The operational feeling of presenter 106 at the time of coordinate input operation using touch pen 108 can be improved, without necessitating any processing of the operating surface of touch panel 204 or exchanging the pen tip portion 400 of touch pen 108.

(2) The display color of the object image 600 changed in accordance with the degree of smoothness of pen tip portion 400 includes the same color (white) as the background on which the object image 600 is displayed. When an object image changed to the same color as the background is inserted to the position of an object image input in a color different from the background, the previously input object image is overwritten and becomes invisible. As a result, this function can be utilized as an eraser function.

Fifth Embodiment

The present embodiment is characterized in that as the mode of changing the manner of displaying object image 600, four modes, that is, display size changing mode, display shape changing mode, display density changing mode and display color changing mode, can be switched and set. Further, the embodiment is characterized in that in accordance with the switched and set display manner changing mode and the degree of smoothness of pen tip portion 400 of touch pen 108, the manner of display of object image 600 is changed. Except for these points, the structure is the same as that of the first embodiment.

<Structure of Touch Pen 108>

Referring to FIGS. 28A, 28B, 29 and 30, at a rear end portion of pushing member 412 of touch pen 108, a dial switch 1000 is provided, allowing switching and setting the mode of changing the manner of displaying object image 600 to any one of display size changing mode, display shape changing mode, display density changing mode and display color changing mode.

Dial switch 1000 includes: a knob 1002 fit rotatably into the rear end portion of pushing member 412; four micro-switches 1006, 1008, 1010 and 1012 fit in a recess 1004 formed entirely over the circumferential surface of the rear end portion of pushing member 412; and a contact 1014 formed protruding from an inner wall of knob 1002 to the recess 1004, for turning ON each of the micro-switches 1006, 1008, 1010 and 1012. Each of the micro-switches 1006, 1008, 1010 and 1012 turns ON when it touches contact 1014, and turns OFF when it comes off from the contact.

Recess 1004 is a circumferential recess concentric with the center of pushing member 412. In recess 1004, micro-switches 1006, 1008, 1010 and 1012 are provided spaced apart by an equal distance from each other. With the position of operation lever 420 used as a reference, the micro-switch for setting the display size changing mode (hereinafter simply referred to as the "size changing mode setting switch") 1006, the micro-switch for setting the display shape changing mode (hereinafter simply referred to as the "shape changing mode setting switch") 1008, the micro-switch for setting the display density changing mode (hereinafter simply referred to as the "density changing mode setting switch") 1010 and the micro-switch for setting the display color changing mode (hereinafter simply referred to as the "color changing mode setting switch") 1012 are arranged clockwise in this order.

On an upper surface of knob 1002, a triangular index 1016 is attached, indicating the position of inner contact 1014. On the rear end surface of pushing member 412, four index strips 1018, 1020, 1022 and 1024 are attached, indicating the positions of micro-switches 1006, 1008, 1010 and 1012, respectively.

When knob 1002 of dial switch 1000 is turned and the index 1016 is aligned with the index 1018 for setting the display size changing mode, contact 1014 comes into contact with size changing mode setting switch 1006, and the switch 1006 is turned ON. At this time, micro-switches 1008, 1010 and 1012 are OFF. When knob 1002 is turned and the index 1016 is aligned with the index 1020 for setting the display shape changing mode, contact 1014 comes into contact with shape changing mode setting switch 1008, and the switch 1008 is turned ON. At this time, micro-switches 1006, 1010 and 1012 are OFF. When knob 1002 is turned and the index 1016 is aligned with the index 1022 for setting the display density changing mode, contact 1014 comes into contact with density changing mode setting switch 1010, and the switch 1010 is turned ON. At this time, micro-switches 1006, 1008 and 1012 are OFF. When knob 1002 is turned and the index 1016 is aligned with the index 1024 for setting the display color changing mode, contact 1014 comes into contact with color changing mode setting switch 1012, and the switch 1012 is turned ON. At this time, micro-switches 1006, 1008 and 1010 are OFF.

<Hardware Configuration>

Figure 31:
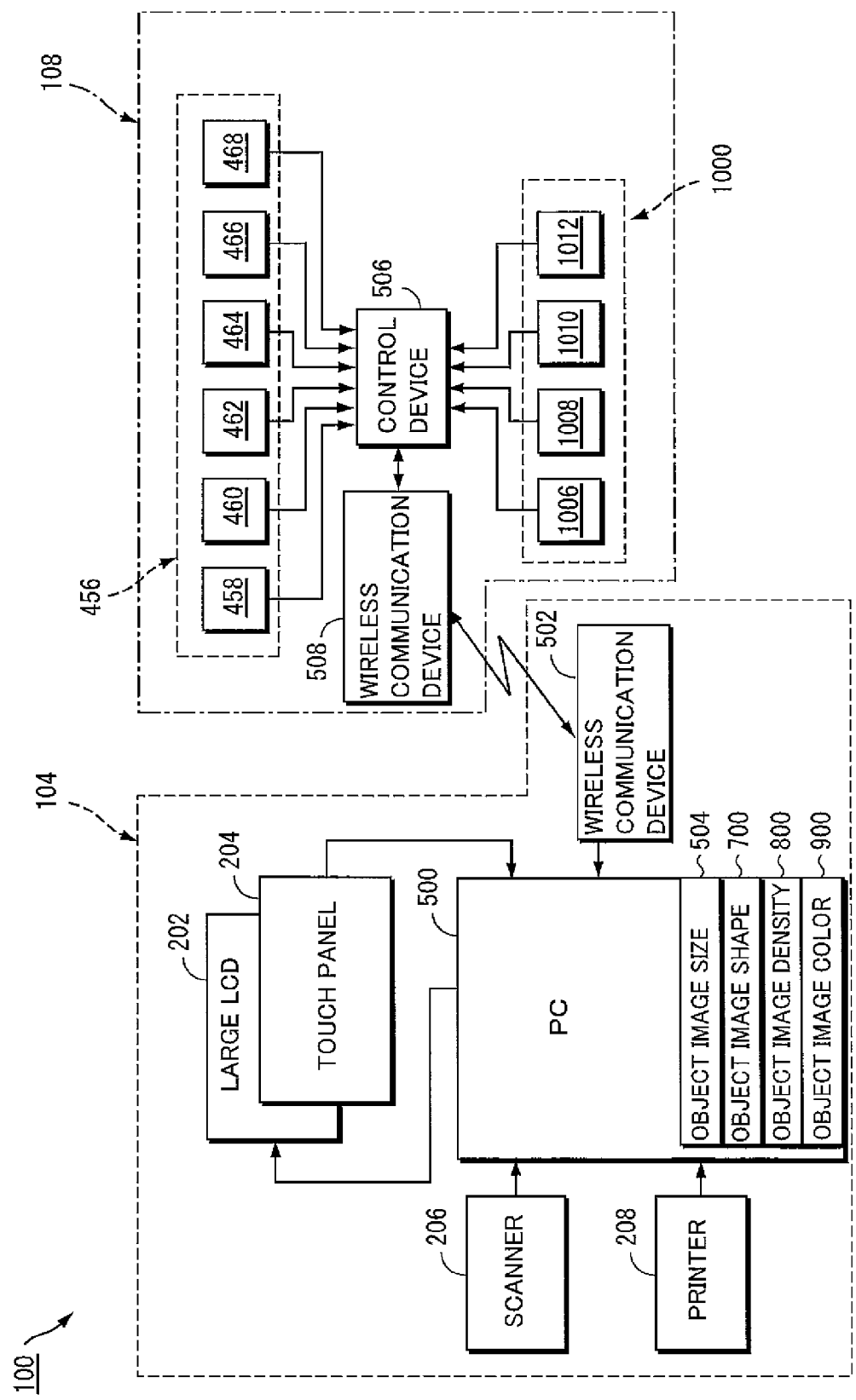
FIG. 31 is a block diagram showing a hardware configuration of the display apparatus in accordance with the fifth embodiment.

Referring to FIG. 31, overall control of display apparatus 100 in accordance with the present embodiment is done by PC 500 on the side of main body 104 of the apparatus. PC 500 has object image size storage area 504 storing the object image size changing data, object image shape storage area 700 storing the object image shape changing data, object image density storage area 800 storing the object image density changing data, and object image color storage area 900 storing the object image color changing data.

Touch pen 108 includes: micro-switches 458, 460, 462, 464, 466 and 468; wireless communication device 508; control device 506; and micro-switches 1006, 1008, 1010 and 1012 forming the dial switch 1000 described above. To control device 506, micro-switches 458, 460, 462, 464, 466 and 468 and 1006, 1008, 1010 and 1012, as well as wireless communication device 508 are connected.

<Software Configuration>

The present embodiment is programmed such that the manner of displaying the object image 600 is changed linked with the display manner changing mode that is switched and set, and with the degree of smoothness of pen tip portion 400 of touch pen 108. The program is a part of software resources for realizing various functions of display apparatus 100 as will be described in the following, and the program is partially stored in the ROM of PC 500 on the side of main body 104 of the apparatus and partially stored in the ROM of control device 506 on the side of touch pen 108. These functions are attained by PC 500 on the side of main body 104 and control device 506 on the side of touch pen 108 executing the program.

Figure 32:
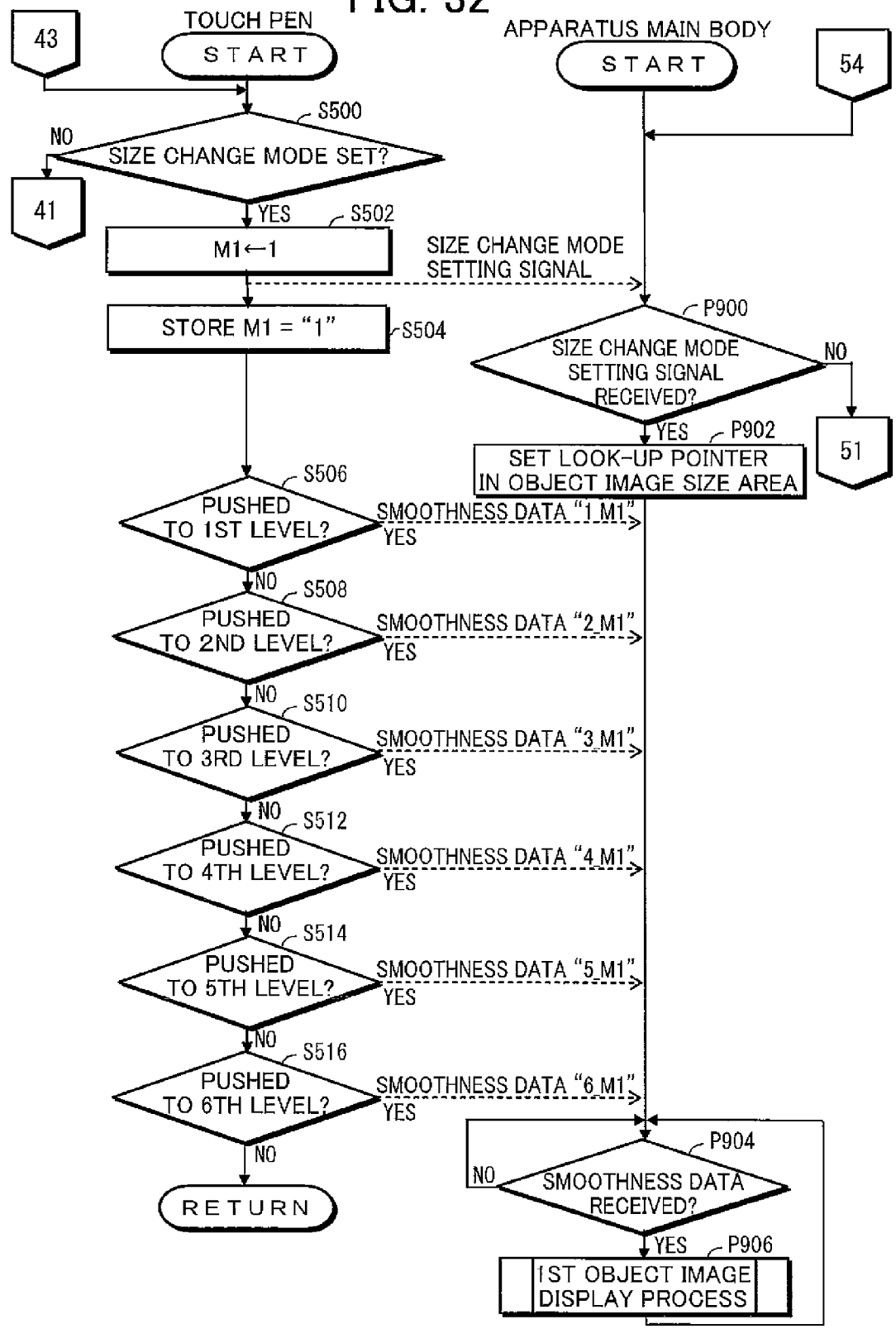
FIGS. 32 to 35 show, in flowcharts, a program structure of a main routine of the display apparatus in accordance with the fifth embodiment of the present invention.

Referring to FIG. 32, in the present display apparatus 100, first, control device 506 on the side of touch pen 108 determines whether the object image display manner changing mode is set to the object image display size changing mode or not (step S500). If the size changing mode setting switch 1006 is ON, that is, if it is determined that the size changing mode is set, the control proceeds to step S502. If it is determined that the size changing mode is not set, control proceeds to step S520 shown in FIG. 33.

When the control proceeds to step S502, control device 506 inputs "1" to a size changing mode setting variable M1, and stores the same (step S504). At this time, control device 506 transmits a size changing mode setting signal to PC 500 on the side of main body 104 of the apparatus through wireless communication between wireless communication devices 508 and 502. The variable M1 mentioned above is changed from "1" to "0" when the object image display manner changing mode is switched to a different mode. Thereafter, control proceeds to steps S506, S508, S510, S512, S514 and S516.

At steps S506, S508, S510, S512, S514 and S516, the level of pushing amount of pushing member 412 of touch pen 108 is determined by control device 506.

When the number of micro-switches that are OFF among micro-switches 458, 460, 462, 464, 466 and 468 is 6 (all), 5, 4, 3, 2 and 1, respectively, control device 506 determines that the amount of pushing of pushing member 412 is set to the first, second, third, fourth, fifth and sixth levels, respectively (YES at steps S506, S508, S510, S512, S514 and S516), and transmits data of degree of smoothness "1_M1", "2_M1", "3_M1", "4_M1", "5_M1" and "6_M1" to PC 500 on the side of main body 104 of the apparatus through wireless communication between wireless communication devices 508 and 502.

PC 500 on the side of main body 104 of the apparatus first determines whether the size changing mode setting signal has been received through wireless communication device 502 or not (step P900). If it is determined that the size changing mode setting signal has been received, PC 500 sets a look-up pointer to object image size storage area 504 (step P902). Thereafter, control proceeds to step P904. If the size changing mode setting signal is not received, the control proceeds to step P910 shown in FIG. 33.

When the control proceeds to step P904, PC 500 waits for reception of the data of degree of smoothness. Receiving the data of degree of smoothness, a first object image display process, in accordance with the level of pushing amount of pushing member 412 of touch pen 108 (degree of smoothness of pen tip portion 400) is executed (step S906). The first object image display process will be described later.

Figure 33:
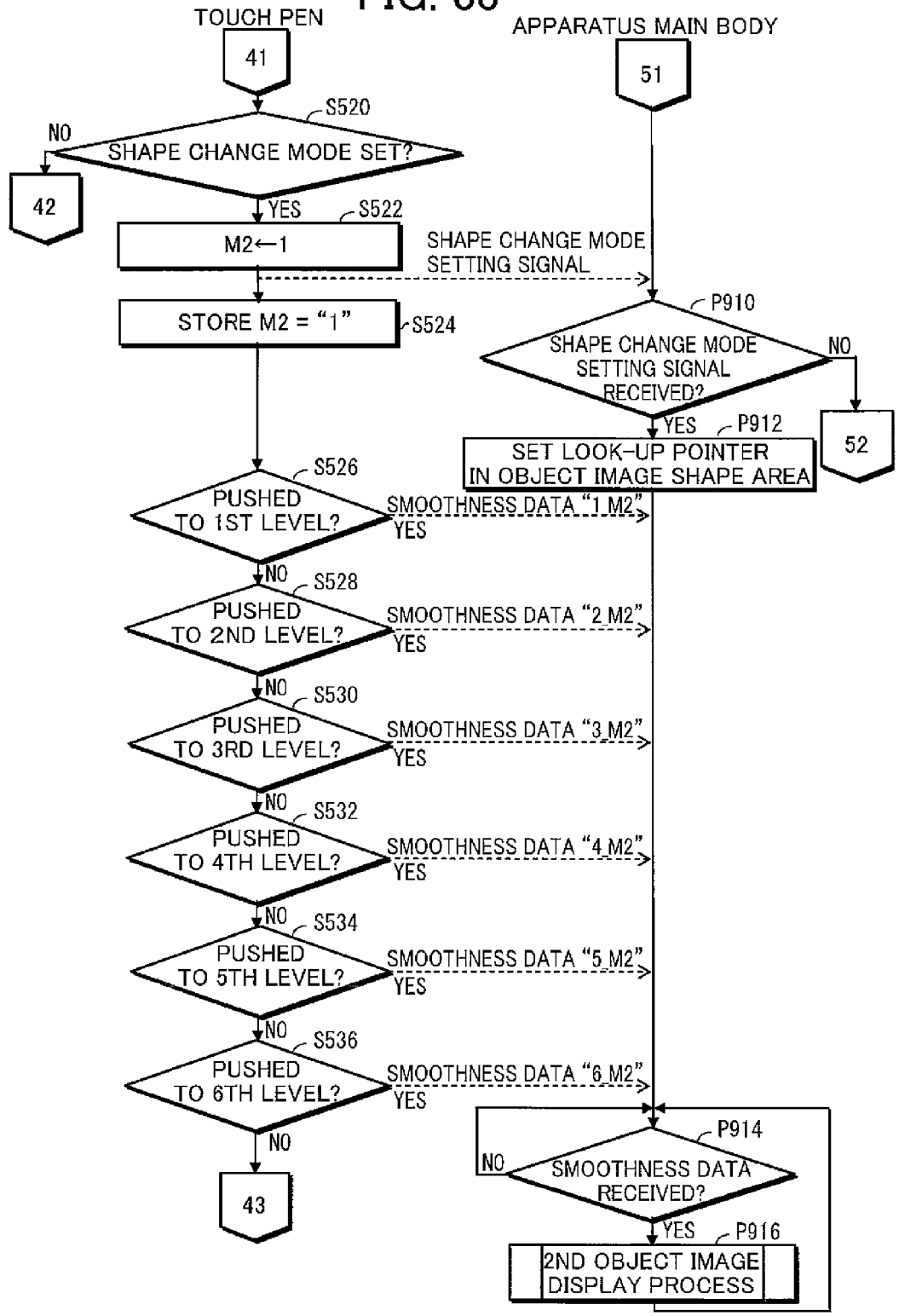

Referring to FIG. 33, when the control proceeds to step S520, control device 506 on the side of touch pen 108 determines whether the object image display manner changing mode is set to the object image display shape changing mode or not. If the shape changing mode setting switch 1008 is ON, that is, if it is determined that the shape changing mode is set, the control proceeds to step S522. If it is determined that the shape changing mode is not set, the control proceeds to step S540 shown in FIG. 34.

When the control proceeds to step S522, control device 506 inputs "1" to a shape changing mode setting variable M2, and stores the same (step S524). At this time, control device 506 transmits a shape changing mode setting signal to PC 500 on the side of main body 104 of the apparatus through wireless communication between wireless communication devices 508 and 502. The variable M2 mentioned above is changed from "1" to "0" when the object image display manner changing mode is switched to a different mode. Thereafter, control proceeds to steps S526, S528, S530, S532, S534 and S536.

At steps S526, S528, S530, S532, S534 and S536, the level of pushing amount of pushing member 412 of touch pen 108 is determined by control device 506.

When the number of micro-switches that are OFF among micro-switches 458, 460, 462, 464, 466 and 468 is 6 (all), 5, 4, 3, 2 and 1, respectively, control device 506 determines that the amount of pushing of pushing member 412 is set to the first, second, third, fourth, fifth and sixth levels, respectively (YES at steps S526, S528, S530, S532, S534 and S536), and transmits data of degree of smoothness "1_M2", "2_M2", "3_M2", "4_M2", "5_M2" and "6_M2" to PC 500 on the side of main body 104 of the apparatus through wireless communication between wireless communication devices 508 and 502.

PC 500 on the side of main body 104 of the apparatus first determines whether the shape changing mode setting signal has been received through wireless communication device 502 or not (step P910). If it is determined that the shape changing mode setting signal has been received, PC 500 sets the look-up pointer to object image shape storage area 700 (step P912). Thereafter, control proceeds to step P914. If the shape changing mode setting signal is not received, the control proceeds to step P920 shown in FIG. 34.

When the control proceeds to step P914, PC 500 waits for reception of the data of degree of smoothness. Receiving the data of degree of smoothness, a second object image display process, in accordance with the level of pushing amount of pushing member 412 of touch pen 108 (degree of smoothness of pen tip portion 400) is executed (step S916). The second object image display process will be described later.

Figure 34:
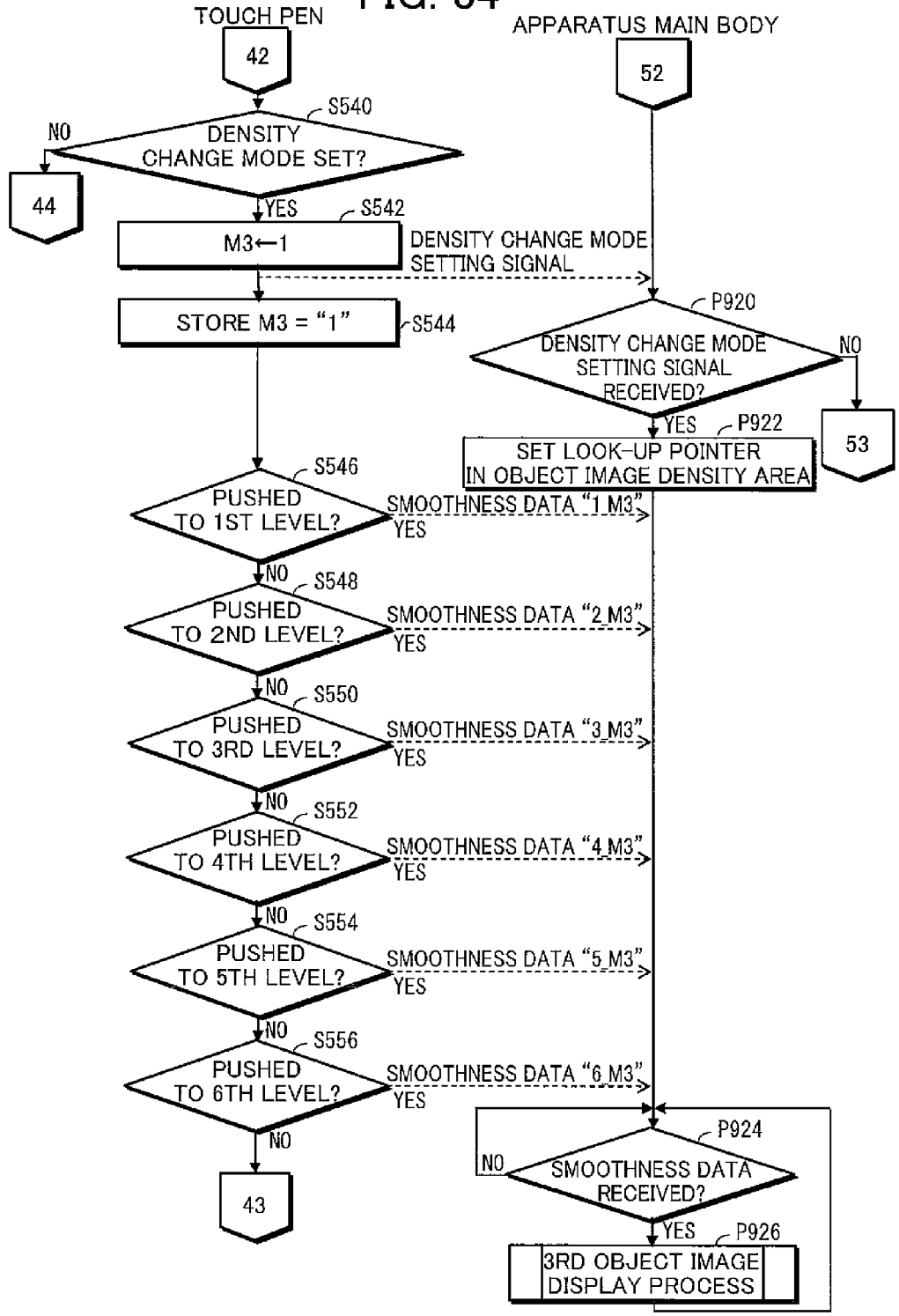

Referring to FIG. 34, when the control proceeds to step S540, control device 506 on the side of touch pen 108 determines whether the object image display manner changing mode is set to the object image display density changing mode or not. If the density changing mode setting switch 1010 is ON, that is, if it is determined that the density changing mode is set, the control proceeds to step S542. If it is determined that the density changing mode is not set, the control proceeds to step S560 shown in FIG. 35.

When the control proceeds to step S542, control device 506 inputs "1" to a density changing mode setting variable M3, and stores the same (step S544). At this time, control device 506 transmits a density changing mode setting signal to PC 600 on the side of main body 104 of the apparatus through wireless communication between wireless communication devices 508 and 502. The variable M3 mentioned above is changed from "1" to "0" when the object image display manner changing mode is switched to a different mode. Thereafter, control proceeds to steps S546, S548, S550, S552, S554 and S556.

At steps S546, S548, S550, S552, S554 and S556, the level of pushing amount of pushing member 412 of touch pen 108 is determined by control device 506.

When the number of micro-switches that are OFF among micro-switches 458, 460, 462, 464, 466 and 468 is 6 (all), 5, 4, 3, 2 and 1, respectively, control device 506 determines that the amount of pushing of pushing member 412 is set to the first, second, third, fourth, fifth and sixth levels, respectively (YES at steps S546, S548, S550, S552, S554 and S556), and transmits data of degree of smoothness "1_M3", "2_M3", "3_M3", "4_M3", "5_M3" and "6_M3" to PC 500 on the side of main body 104 of the apparatus through wireless communication between wireless communication devices 508 and 502.

PC 500 on the side of main body 104 of the apparatus first determines whether the density changing mode setting signal has been received through wireless communication device 502 or not (step P920). If it is determined that the density changing mode setting signal has been received, PC 500 sets a look-up pointer to object image density storage area 800 (step P922). Thereafter, control proceeds to step P924. If the density changing mode setting signal is not received, the control proceeds to step P930 shown in FIG. 35.

When the control proceeds to step P924, PC 500 waits for reception of the data of degree of smoothness. Receiving the data of degree of smoothness, a third object image display process, in accordance with the level of pushing amount of pushing member 412 of touch pen 108 is executed (step S926). The third object image display process will be described later.

Figure 35:
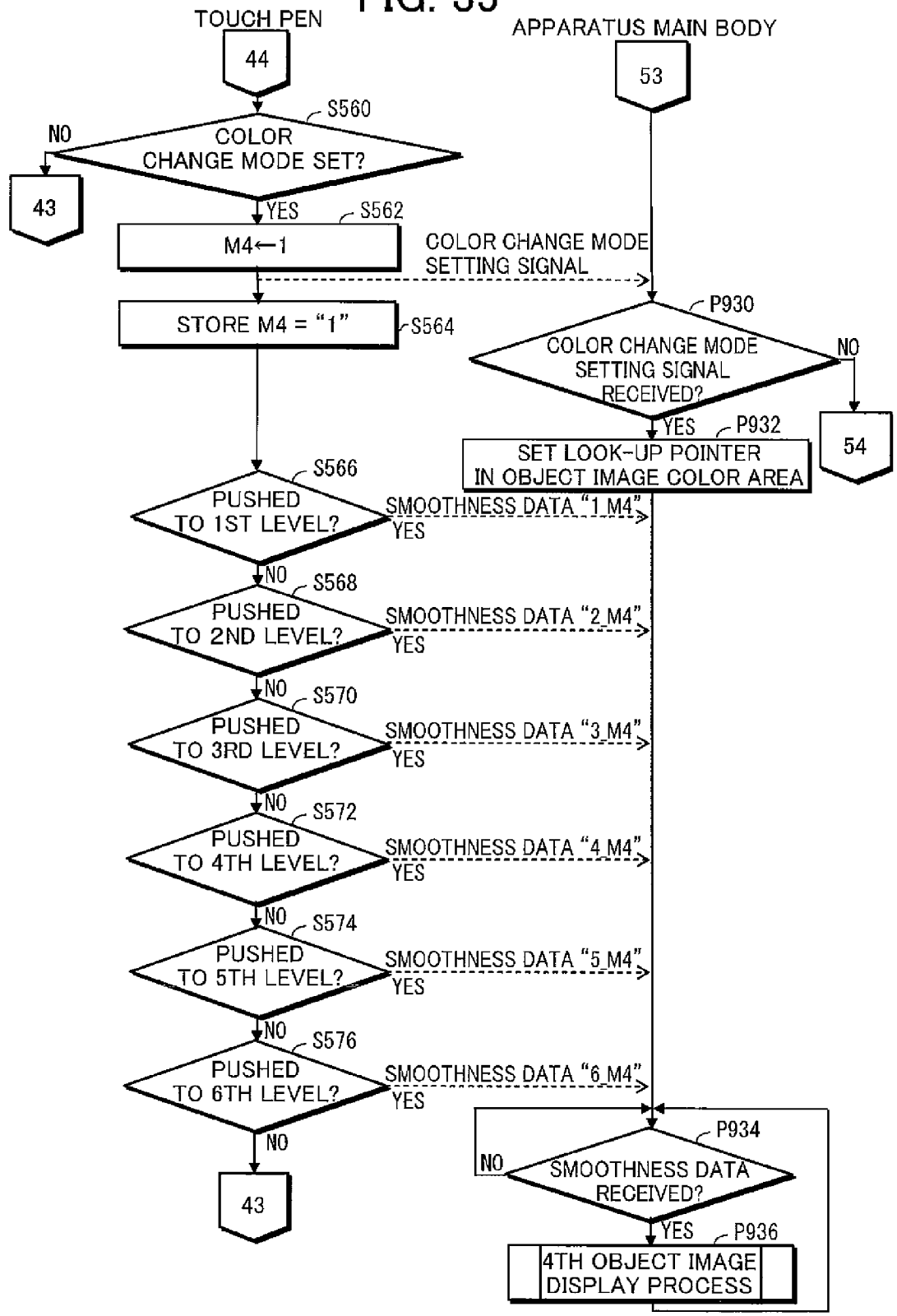

Referring to FIG. 35, when the control proceeds to step S560, control device 506 on the side of touch pen 108 determines whether the object image display manner changing mode is set to the object image display color changing mode or not. If the color changing mode setting switch 1012 is ON, that is, if it is determined that the color changing mode is set, the control proceeds to step S562. If it is determined that the color changing mode is not set, the control proceeds to step S500 shown in FIG. 32.

When the control proceeds to step S562, control device 506 inputs "1" to a color changing mode setting variable M4, and stores the same (step S564). At this time, control device 506 transmits a color changing mode setting signal to PC 500 on the side of main body 104 of the apparatus through wireless communication between wireless communication devices 508 and 502. The variable M4 mentioned above is changed from "1" to "0" when the object image display manner changing mode is switched to a different mode. Thereafter, control proceeds to steps S566, S568, S570, S572, S574 and S576.

At steps S566, S568, S570, S572, S574 and S576, the level of pushing amount of pushing member 412 of touch pen 108 is determined by control device 506.

When the number of micro-switches that are OFF among micro-switches 458, 460, 462, 464, 466 and 468 is 6 (all), 5, 4, 3, 2 and 1, respectively, control device 506 determines that the amount of pushing of pushing member 412 is set to the first, second, third, fourth, fifth and sixth levels, respectively (YES at steps S566, S568, S570, S572, S574 and S576), and transmits data of degree of smoothness "1_M4", "2_M4", "3_M4", "4_M4", "5_M4" and "6_M4" to PC 500 on the side of main body 104 of the apparatus through wireless communication between wireless communication devices 508 and 502.

PC 500 on the side of main body 104 of the apparatus first determines whether the color changing mode setting signal has been received through wireless communication device 502 or not (step P930). If it is determined that the color changing mode setting signal has been received, PC 500 sets the look-up pointer to object image color storage area 900 (step P932). Thereafter, control proceeds to step P934. If the color changing mode setting signal is not received, the control proceeds to step P900 shown in FIG. 32.

When the control proceeds to step P934, PC 500 waits for reception of the data of degree of smoothness. Receiving the data of degree of smoothness, a fourth object image display process, in accordance with the level of pushing amount of pushing member 412 of touch pen 108 (degree of smoothness of pen tip portion 400) is executed (step S936). The fourth object image display process will be described later.

In the present embodiment, no matter which of the four modes is set, the set level of smoothness of pen tip portion 400 of touch pen 108 is constantly monitored on the side of main body 104 of the apparatus. Until the degree of smoothness of pen tip portion 400 is switched, any of the first to fourth object image display process is continuously executed in accordance with the degree of smoothness. When the degree of smoothness of pen tip portion 400 is switched, the object image display process that has been executed by that time is reset, and execution of any of the first to fourth object image display processes in accordance with the switched degree of smoothness starts.

(First Object Image Display Process)

Figure 36:
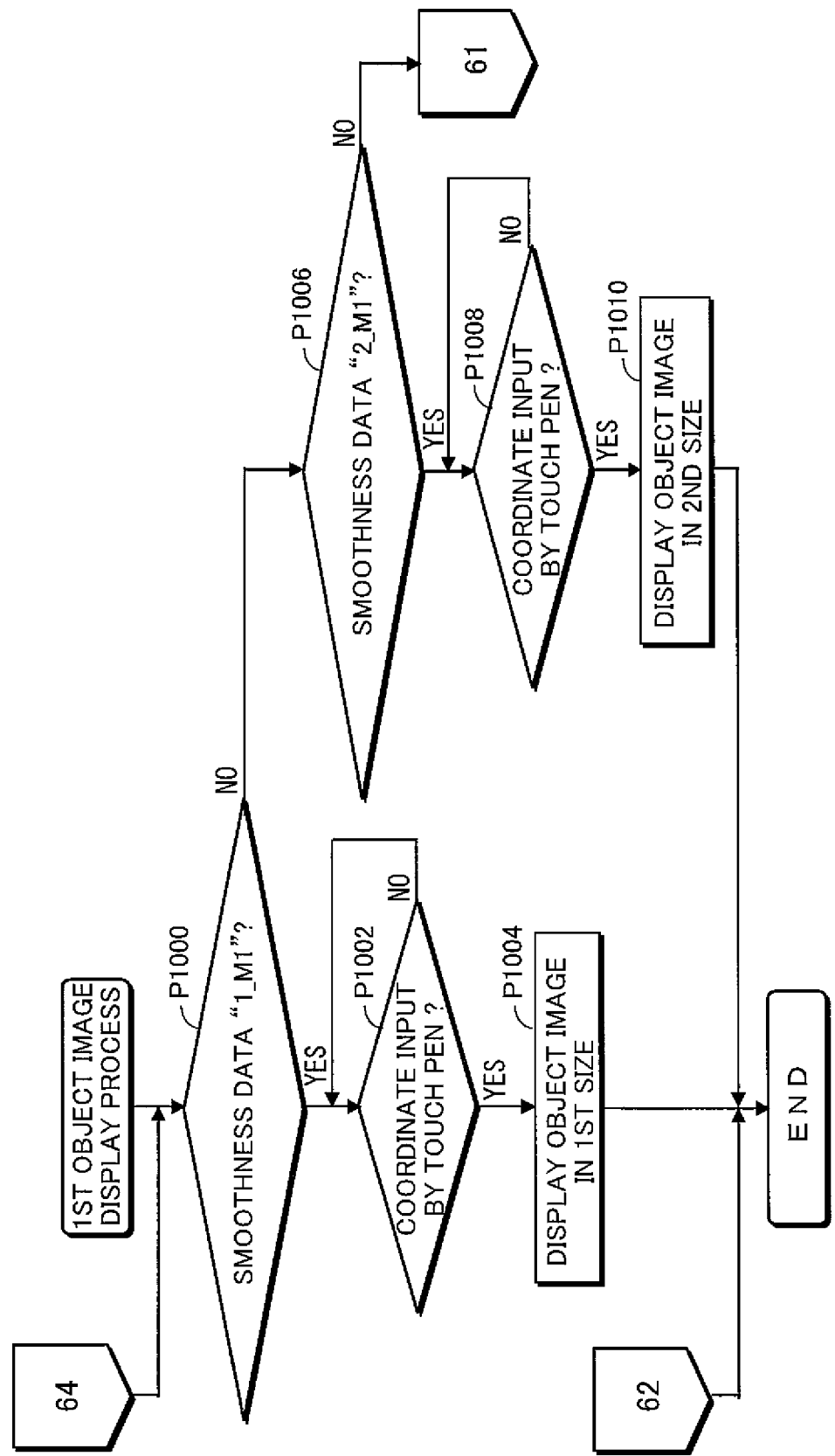
FIGS. 36 to 38 show, in flowcharts, a program structure for realizing the first object image display process by the display apparatus in accordance with the fifth embodiment.

Referring to FIG. 36, in the first object image display process executed by PC 500, first, whether the received data of degree of smoothness is "1_M1" or not is determined (step P1000). If the received data of degree of smoothness is "1_M1", PC 500 waits for the coordinate input operation by touch pen 108 to the operating surface of transparent touch panel 204 (step P1002). If the coordinate input operation is done, PC 500 displays object image 600 at a position corresponding to the coordinates input by touch pen 108, on the display area of large LCD 202. At this time, PC 500 refers to the object image size changing data stored in object image size storage area 504 using the data of degree of smoothness "1_M1" as a parameter, and obtains the first size as the thickness of drawing line. Based on the reference, PC 500 displays object image 600A of the first size shown in FIG. 12A (step P1004). Then, the first object image display process ends. If the received data of degree of smoothness is not "1_M1", the control proceeds to step P1006.

At step P1006, whether or not the received data of degree of smoothness is "2_M1" is determined. If the received data of degree of smoothness is "2_M1" PC 500 waits for the coordinate input operation by touch pen 108 to the operating surface of transparent touch panel 204 (step P1008). If the coordinate input operation is done, PC 500 refers to the object image size changing data stored in object image size storage area 504 using the data of degree of smoothness "2_M1" as a parameter, and obtains the second size as the thickness of drawing line. The second size is larger than the first size. Based on the reference, PC 500 displays object image 600B of the second size as shown in FIG. 12B, at a position corresponding to the coordinates input by touch pen 108, on the display area of large LCD 202 (step P1010). Then, the first object image display process ends. If the received data of degree of smoothness is not "2_M1", the control proceeds to step P1012 shown in FIG. 37.

Figure 37:
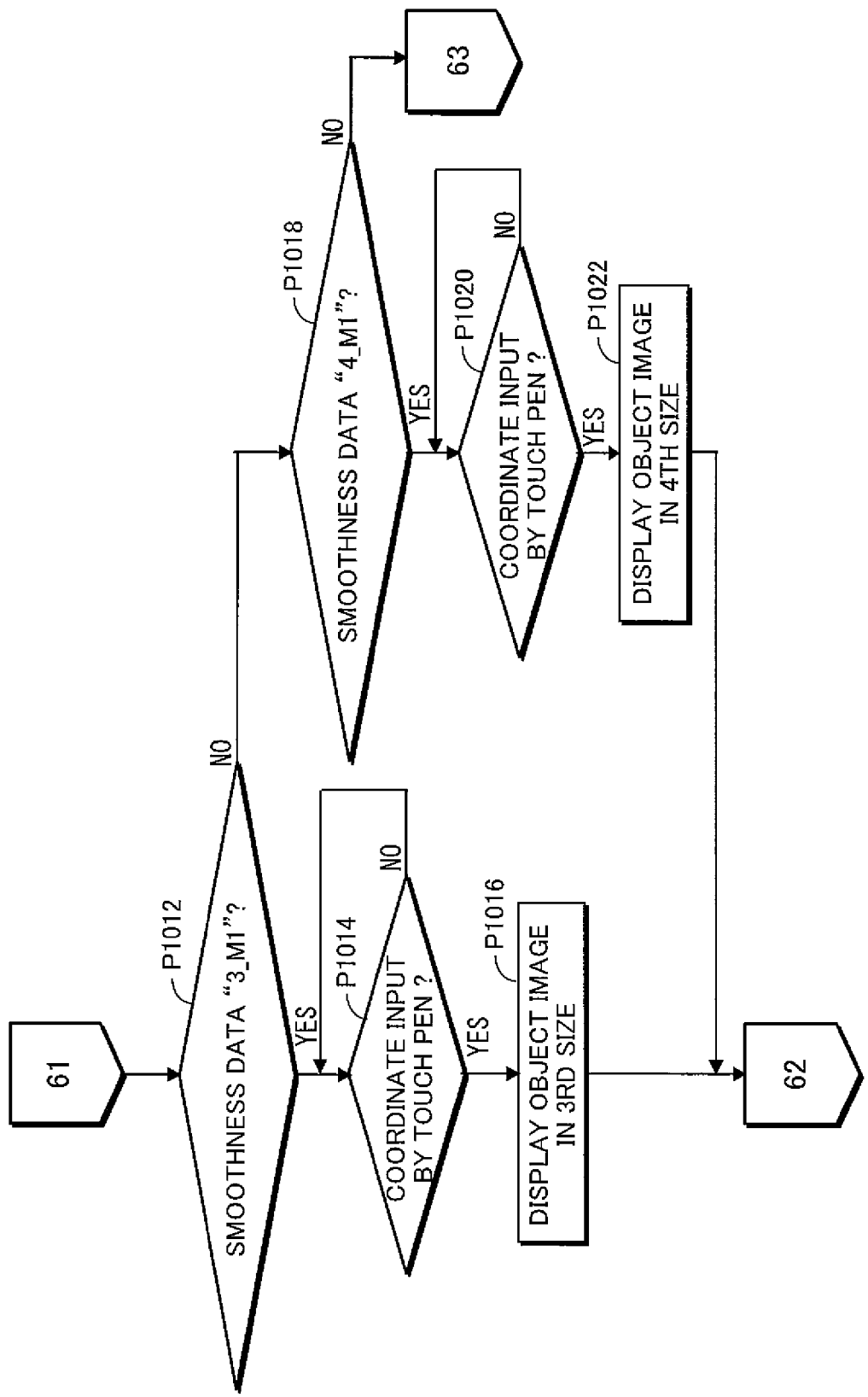

Referring to FIG. 37, at step P1012, whether or not the received data of degree of smoothness is "3_M1" is determined. If the received data of degree of smoothness is "3_M1", PC 500 waits for the coordinate input operation by touch pen 108 to the operating surface of transparent touch panel 204 (step P1014). If the coordinate input operation is done, PC 500 refers to the object image size changing data stored in object image size storage area 504 using the data of degree of smoothness "3_M1" as a parameter, and obtains the third size as the thickness of drawing line. The third size is larger than the second size. Based on the reference, PC 500 displays object image 600C of the third size as shown in FIG. 12C, at a position corresponding to the coordinates input by touch pen 108, on the display area of large LCD 202 (step P1016). Then, the first object image display process ends. If the received data of degree of smoothness is not "3_M1", the control proceeds to step P1018.

At step P1018, whether or not the received data of degree of smoothness is "4_M1" is determined. If the received data of degree of smoothness is "4_M1", PC 500 waits for the coordinate input operation by touch pen 108 to the operating surface of transparent touch panel 204 (step P1020). If the coordinate input operation is done, PC 500 refers to the object image size changing data stored in object image size storage area 504 using the data of degree of smoothness "4_M1" as a parameter, and obtains the fourth size as the thickness of drawing line. The fourth size is larger than the third size. Based on the reference, PC 500 displays object image 600D of the fourth size as shown in FIG. 12D, at a position corresponding to the coordinates input by touch pen 108, on the display area of large LCD 202 (step P1022). Then, the first object image display process ends. If the received data of degree of smoothness is not "4_M1", the control proceeds to step P1024 shown in FIG. 38.

Figure 38:
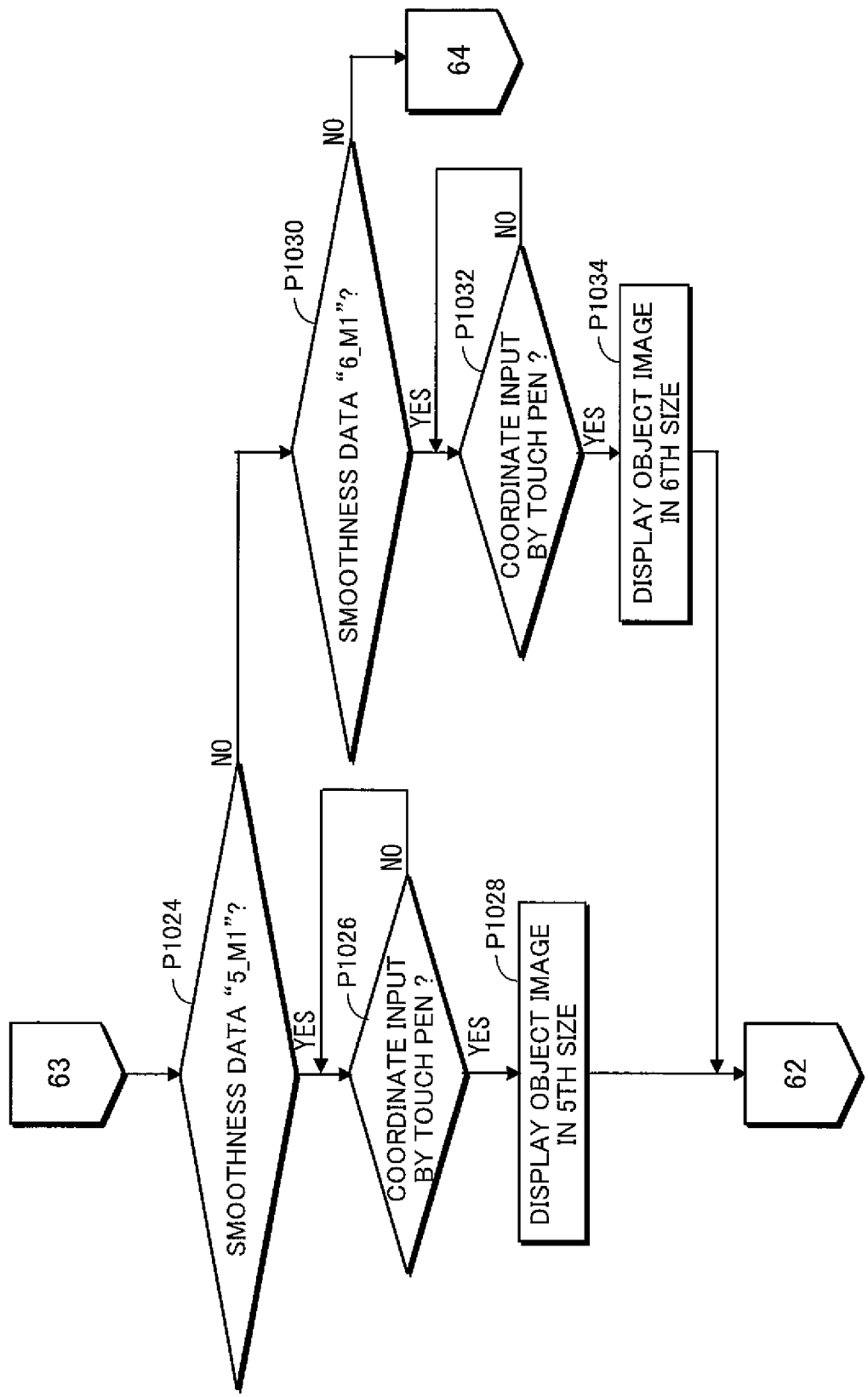

Referring to FIG. 38, at step P1024, whether or not the received data of degree of smoothness is "5_M1" is determined. If the received data of degree of smoothness is "5_M1", PC 500 waits for the coordinate input operation by touch pen 108 to the operating surface of transparent touch panel 204 (step P1026). If the coordinate input operation is done, PC 500 refers to the object image size changing data stored in object image size storage area 504 using the data of degree of smoothness "5_M1" as a parameter, and obtains the fifth size as the thickness of drawing line. The fifth size is larger than the fourth size. Based on the reference, PC 500 displays object image 600E of the fifth size as shown in FIG. 12E, at a position corresponding to the coordinates input by touch pen 108, on the display area of large LCD 202 (step P1028). Then, the first object image display process ends. If the received data of degree of smoothness is not "5_M1", the control proceeds to step P1030.

At step P1030, whether or not the received data of degree of smoothness is "6_M1" is determined. If the received data of degree of smoothness is "6_M1", PC 500 waits for the coordinate input operation by touch pen 108 to the operating surface of transparent touch panel 204 (step P1032). If the coordinate input operation is done, PC 500 refers to the object image size changing data stored in object image size storage area 504 using the data of degree of smoothness "6_M1" as a parameter, and obtains the sixth size as the thickness of drawing line. The sixth size is larger than the fifth size. Based on the reference, PC 500 displays object image 600F of the sixth size as shown in FIG. 12F, at a position corresponding to the coordinates input by touch pen 108, on the display area of large LCD 202 (step P1034). Then, the first object image display process ends. If the received data of degree of smoothness is not "6_M1", the control proceeds to step P1000 of FIG. 36.

(Second Object Image Display Process)

Figure 39:
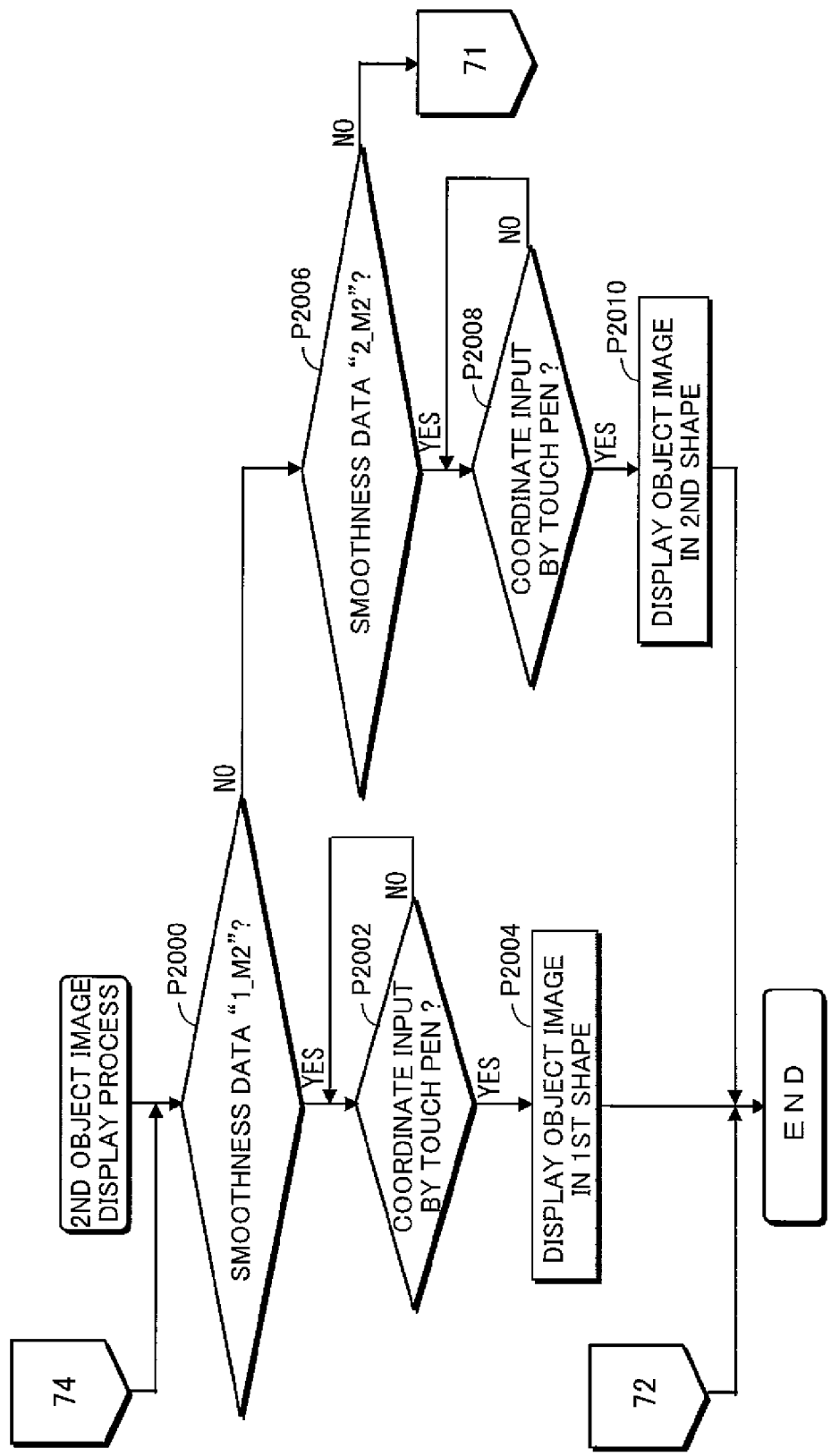
FIGS. 39 to 41 show, in flowcharts, a program structure for realizing the second object image display process by the display apparatus in accordance with the fifth embodiment.

Referring to FIG. 39, in the second object image display process executed by PC 500, whether or not the received data of degree of smoothness is "1_M2" is determined (step P2000). If the received data of degree of smoothness is "1_M2", PC 500 waits for the coordinate input operation by touch pen 108 to the operating surface of transparent touch panel 204 (step P2002). If the coordinate input operation is done, PC 500 refers to the object image shape changing data stored in object image shape storage area 700 using the data of degree of smoothness "1_M2" as a parameter, and obtains the first shape (circle) as the shape of object image. Based on the reference, PC 500 displays object image 600G of the first shape as shown in FIG. 17A at a position corresponding to the coordinates input by touch pen 108, on the display area of large LCD 202 (step P2004). Then, the second object image display process ends. If the received data of degree of smoothness is not "1_M2", the control proceeds to step P2006.

At step P2006, whether or not the received data of degree of smoothness is "2_M2" is determined. If the received data of degree of smoothness is "2_M2", PC 500 waits for the coordinate input operation by touch pen 108 to the operating surface of transparent touch panel 204 (step P2008). If the coordinate input operation is done, PC 500 refers to the object image shape changing data stored in object image shape storage area 700 using the data of degree of smoothness "2_M2" as a parameter, and obtains the second shape (rectangle) as the shape of object image. Based on the reference, PC 500 displays object image 600H of the second shape as shown in FIG. 17B at a position corresponding to the coordinates input by touch pen 108, on the display area of large LCD 202 (step P2010). Then, the second object image display process ends. If the received data of degree of smoothness is not "2_M2", the control proceeds to step P2012 shown in FIG. 40.

Figure 40:
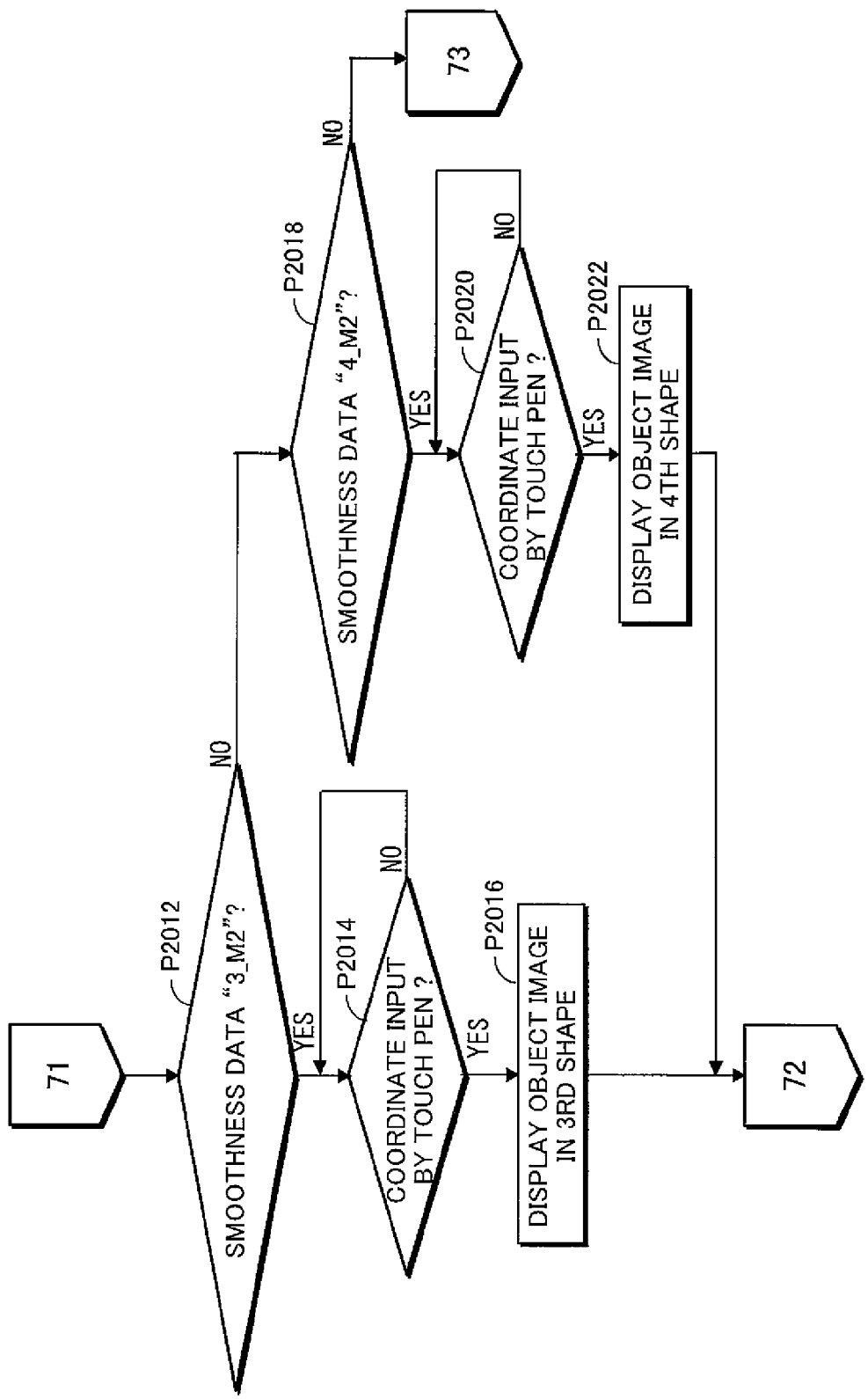

Referring to FIG. 40, at step P2012, whether or not the received data of degree of smoothness is "3_M2" is determined. If the received data of degree of smoothness is "3_M2", PC 500 waits for the coordinate input operation by touch pen 108 to the operating surface of transparent touch panel 204 (step P2014). If the coordinate input operation is done, PC 500 refers to the object image shape changing data stored in object image shape storage area 700 using the data of degree of smoothness "3_M2" as a parameter, and obtains the third shape (star) as the shape of object image. Based on the reference, PC 500 displays object image 600I of the third shape as shown in FIG. 17C, at a position corresponding to the coordinates input by touch pen 108, on the display area of large LCD 202 (step P2016). Then, the second object image display process ends. If the received data of degree of smoothness is not "3_M2", the control proceeds to step P2018.

At step P2018, whether or not the received data of degree of smoothness is "4_M2" is determined. If the received data of degree of smoothness is "4_M2", PC 500 waits for the coordinate input operation by touch pen 108 to the operating surface of transparent touch panel 204 (step P2020). If the coordinate input operation is done, PC 500 refers to the object image shape changing data stored in object image shape storage area 700 using the data of degree of smoothness "4_M2" as a parameter, and obtains the fourth shape (square) as the shape of object image. Based on the reference, PC 500 displays object image 600J of the fourth shape as shown in FIG. 17D, at a position corresponding to the coordinates input by touch pen 108, on the display area of large LCD 202 (step P2022). Then, the second object image display process ends. If the received data of degree of smoothness is not "4_M2", the control proceeds to step P2024 shown in FIG. 41.

Figure 41:
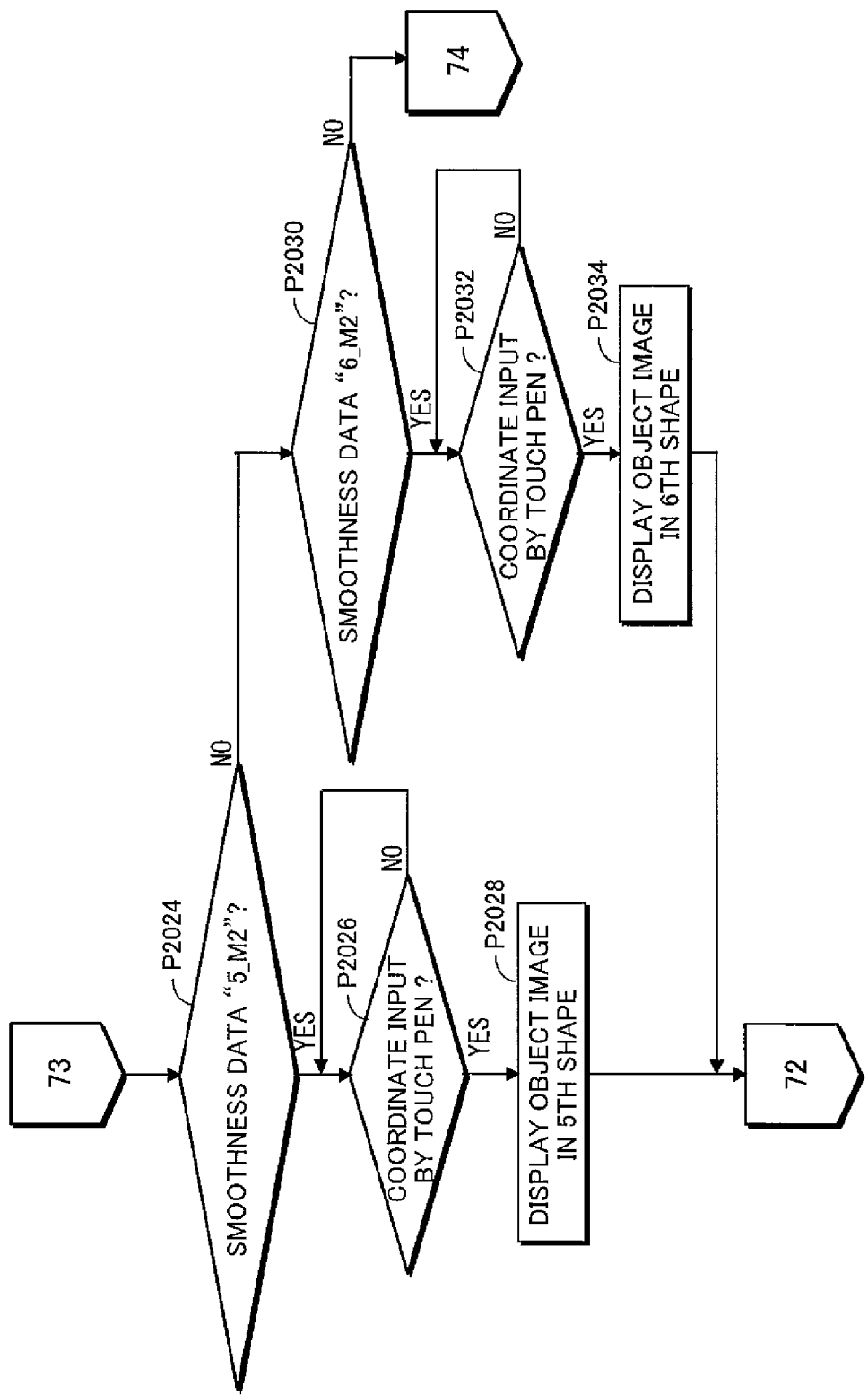

Referring to FIG. 41, at step P2024, whether or not the received data of degree of smoothness is "5_M2" is determined. If the received data of degree of smoothness is "5_M2", PC 500 waits for the coordinate input operation by touch pen 108 to the operating surface of transparent touch panel 204 (step P2026). If the coordinate input operation is done, PC 500 refers to the object image shape changing data stored in object image shape storage area 700 using the data of degree of smoothness "5_M2" as a parameter, and obtains the fifth shape (triangle) as the shape of object image. Based on the reference, PC 500 displays object image 600K of the fifth shape as shown in FIG. 17E, at a position corresponding to the coordinates input by touch pen 108, on the display area of large LCD 202 (step P2028). Then, the second object image display process ends. If the received data of degree of smoothness is not "5_M2", the control proceeds to step P2030.

At step P2030, whether or not the received data of degree of smoothness is "6_M2" is determined. If the received data of degree of smoothness is "6_M2", PC 500 waits for the coordinate input operation by touch pen 108 to the operating surface of transparent touch panel 204 (step P2032). If the coordinate input operation is done, PC 500 refers to the object image shape changing data stored in object image shape storage area 700 using the data of degree of smoothness "6_M2" as a parameter, and obtains the sixth shape (rhomboid) as the shape of object image. Based on the reference, PC 500 displays object image 600L of the sixth shape as shown in FIG. 17F, at a position corresponding to the coordinates input by touch pen 108, on the display area of large LCD 202 (step P2034). Then, the second object image display process ends. If the received data of degree of smoothness is not "6_M2", the control proceeds to step P2000 shown in FIG. 39.

(Third Object Image Display Process)

Figure 42:
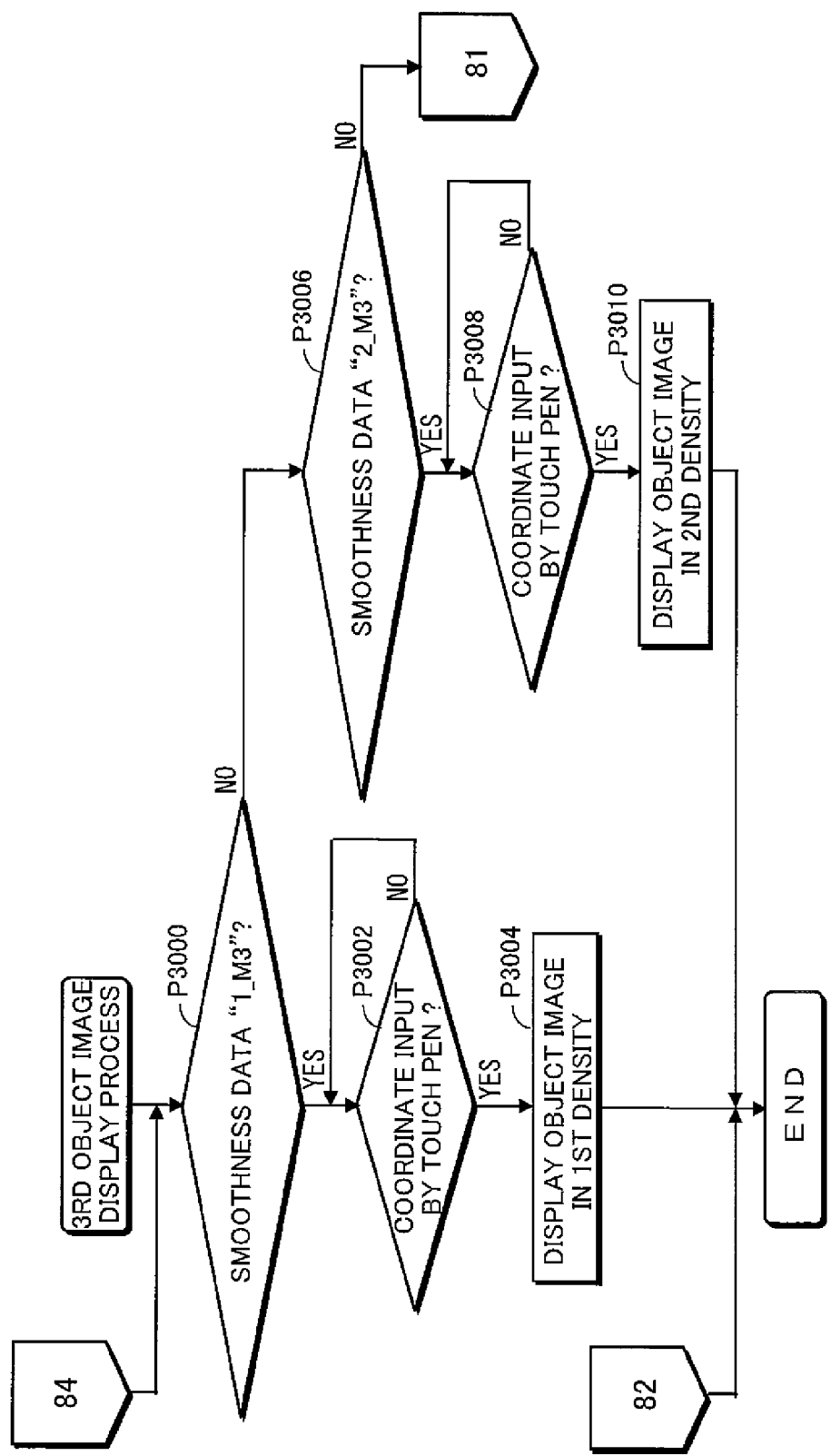
FIGS. 42 to 44 show, in flowcharts, a program structure for realizing the third object image display process by the display apparatus in accordance with the fifth embodiment.

Referring to FIG. 42, in the third object image display process executed by PC 500, whether or not the received data of degree of smoothness is "1_M3" is determined (step P3000). If the received data of degree of smoothness is "1_M3", PC 500 waits for the coordinate input operation by touch pen 108 to the operating surface of transparent touch panel 204 (step P3002). If the coordinate input operation is done, PC 500 refers to the object image density changing data stored in object image density storage area 800 using the data of degree of smoothness "1_M3" as a parameter, and obtains the first density D0 as the density for displaying object image. The first density is the brightest density. Based on the reference, PC 500 displays object image 600M of the first density as shown in FIG. 22A at a position corresponding to the coordinates input by touch pen 108, on the display area of large LCD 202 (step P3004). Then, the third object image display process ends. If the received data of degree of smoothness is not "1_M3", the control proceeds to step P3006.

At step P3006, whether or not the received data of degree of smoothness is "2_M3" is determined. If the received data of degree of smoothness is "2_M3", PC 500 waits for the coordinate input operation by touch pen 108 to the operating surface of transparent touch panel 204 (step P3008). If the coordinate input operation is done, PC 500 refers to the object image density changing data stored in object image density storage area 800 using the data of degree of smoothness "2_M3" as a parameter, and obtains the second density D1 as the density for displaying object image. The second density D1 is darker than the first density D0. Based on the reference, PC 500 displays object image 600N of the second density as shown in FIG. 22B at a position corresponding to the coordinates input by touch pen 108, on the display area of large LCD 202 (step P3010). Then, the third object image display process ends. If the received data of degree of smoothness is not "2_M3", the control proceeds to step P3012 shown in FIG. 43.

Figure 43:
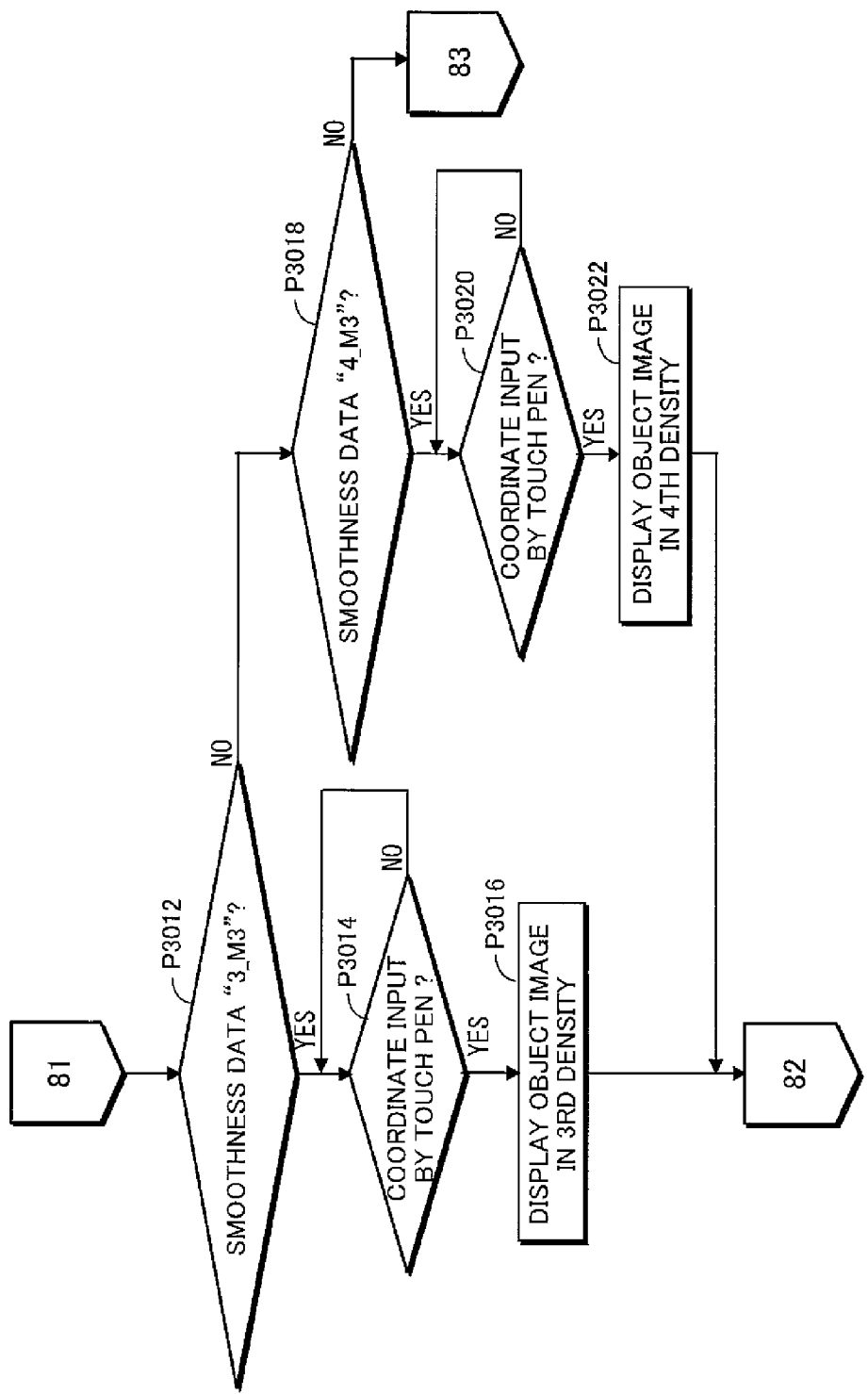

Referring to FIG. 43, at step P3012, whether or not the received data of degree of smoothness is "3_M3" is determined. If the received data of degree of smoothness is "3_M3", PC 500 waits for the coordinate input operation by touch pen 108 to the operating surface of transparent touch panel 204 (step P3014). If the coordinate input operation is done, PC 500 refers to the object image density changing data stored in object image density storage area 800 using the data of degree of smoothness "3_M3" as a parameter, and obtains the third density D2 as the density for displaying object image. The third density D2 is darker than the second density D1. Based on the reference, PC 500 displays object image 600O of the third density as shown in FIG. 22C, at a position corresponding to the coordinates input by touch pen 108, on the display area of large LCD 202 (step P3016). Then, the third object image display process ends. If the received data of degree of smoothness is not "3_M3", the control proceeds to step P3018.

At step P3018, whether or not the received data of degree of smoothness is "4_M3" is determined. If the received data of degree of smoothness is "4_M3", PC 500 waits for the coordinate input operation by touch pen 108 to the operating surface of transparent touch panel 204 (step P3020). If the coordinate input operation is done, PC 500 refers to the object image density changing data stored in object image density storage area 800 using the data of degree of smoothness "4_M3" as a parameter, and obtains the fourth density D3 as the density for displaying object image. The fourth density D3 is darker than the third density D2. Based on the reference, PC 500 displays object image 600P of the fourth density as shown in FIG. 22D at a position corresponding to the coordinates input by touch pen 108, on the display area of large LCD 202 (step P3022). Then, the third object image display process ends. If the received data of degree of smoothness is not "4_M3", the control proceeds to step P3024 shown in FIG. 44.

Figure 44:
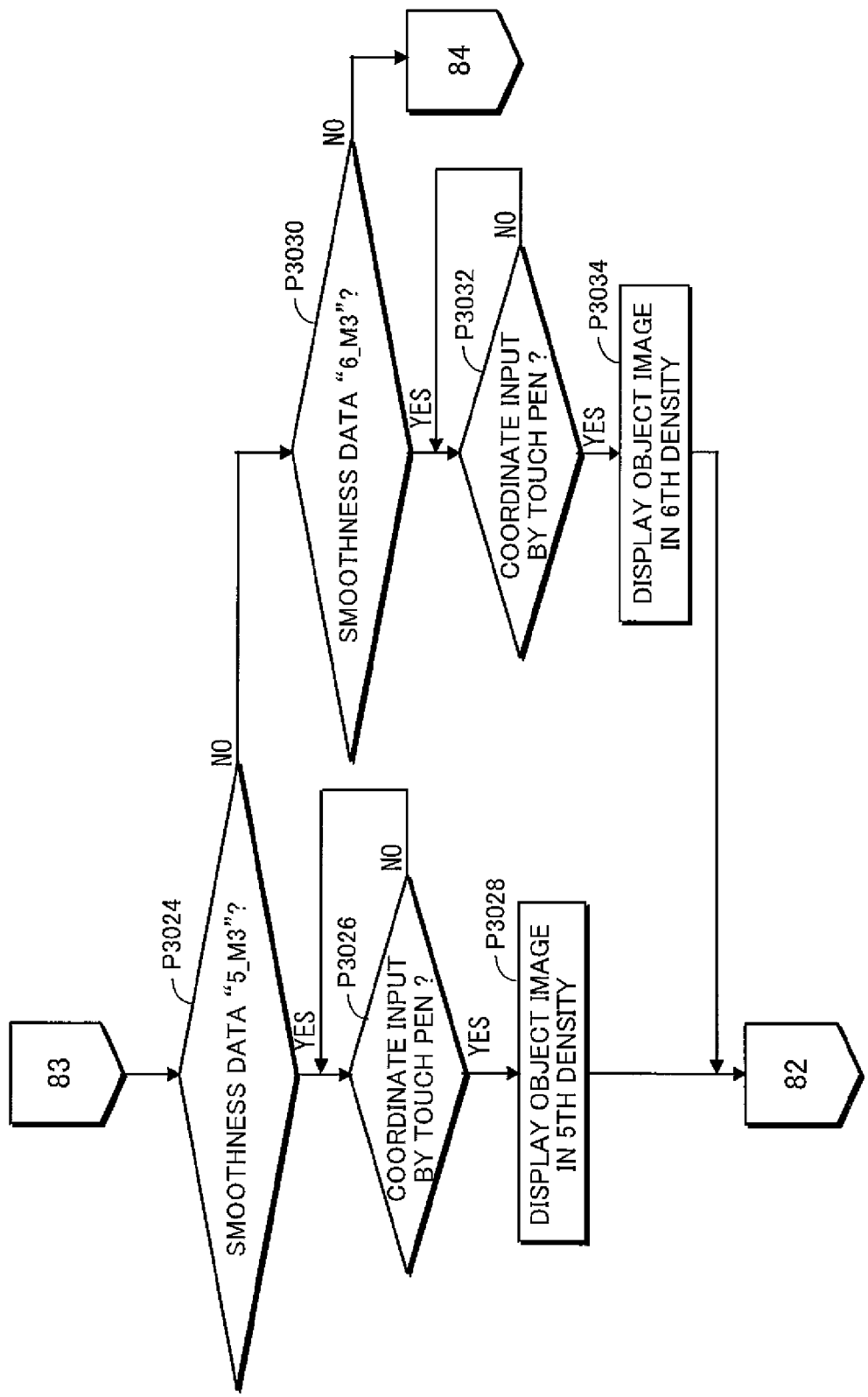

Referring to FIG. 44, at step P3024, whether or not the received data of degree of smoothness is "5_M3" is determined. If the received data of degree of smoothness is "5_M3", PC 500 waits for the coordinate input operation by touch pen 108 to the operating surface of transparent touch panel 204 (step P3026). If the coordinate input operation is done, PC 500 refers to the object image density changing data stored in object image density storage area 800 using the data of degree of smoothness "5_M3" as a parameter, and obtains the fifth density D4 as the density for displaying object image. The fifth density D4 is darker than the fourth density D3. Based on the reference, PC 500 displays object image 600Q of the fifth density as shown in FIG. 22E, at a position corresponding to the coordinates input by touch pen 108, on the display area of large LCD 202 (step P3028). Then, the third object image display process ends. If the received data of degree of smoothness is not "5_M3", the control proceeds to step P3030.

At step P3030, whether or not the received data of degree of smoothness is "6_M3" is determined. If the received data of degree of smoothness is "6_M3", PC 500 waits for the coordinate input operation by touch pen 108 to the operating surface of transparent touch panel 204 (step P3032). If the coordinate input operation is done, PC 500 refers to the object image density changing data stored in object image density storage area 800 using the data of degree of smoothness "6_M3" as a parameter, and obtains the sixth density D5 as the density for displaying object image. The sixth density D5 is darker than the fifth density D4. Based on the reference, PC 500 displays object image 600R of the sixth density as shown in FIG. 22F, at a position corresponding to the coordinates input by touch pen 108, on the display area of large LCD 202 (step P3034). Then, the third object image display process ends. If the received data of degree of smoothness is not "6_M3", the control proceeds to step P3000 shown in FIG. 42.

(Fourth Object Image Display Process)

Figure 45:
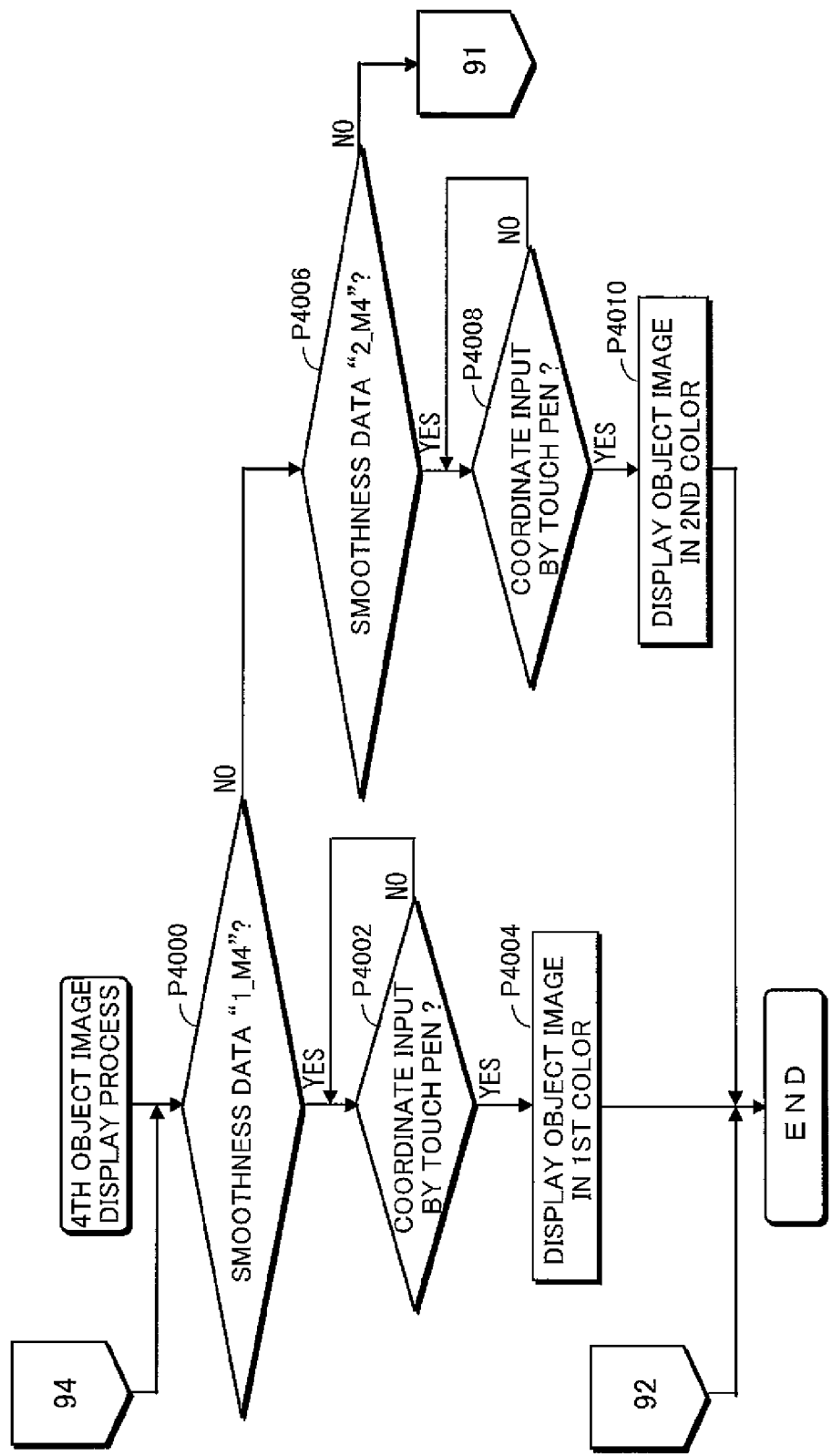
FIGS. 45 to 47 show, in flowcharts, a program structure for realizing the fourth object image display process by the display apparatus in accordance with the fifth embodiment.

Referring to FIG. 45, in the fourth object image display process executed by PC 500, whether or not the received data of degree of smoothness is "1 M4" is determined (step P4000). If the received data of degree of smoothness is "1_M4", PC 500 waits for the coordinate input operation by touch pen 108 to the operating surface of transparent touch panel 204 (step P4002). If the coordinate input operation is done, PC 500 refers to the object image color changing data stored in object image color storage area 900 using the data of degree of smoothness "1_M4" as a parameter, and obtains the first color (black) as the display color of object image. Based on the reference, PC 500 displays object image 600S of the first color as shown in FIG. 27A, at a position corresponding to the coordinates input by touch pen 108, on the display area of large LCD 202 (step P4004). Then, the fourth object image display process ends. If the received data of degree of smoothness is not "1_M4", the control proceeds to step P4006.

At step P4006, whether or not the received data of degree of smoothness is "2_M4" is determined. If the received data of degree of smoothness is "2_M4", PC 500 waits for the coordinate input operation by touch pen 108 to the operating surface of transparent touch panel 204 (step P4008). If the coordinate input operation is done, PC 500 refers to the object image color changing data stored in object image color storage area 900 using the data of degree of smoothness "2_M4" as a parameter, and obtains the second color (red) as the display color of object image. Based on the reference, PC 500 displays object image 600T of the second color as shown in FIG. 27B, at a position corresponding to the coordinates input by touch pen 108, on the display area of large LCD 202 (step P4010). Then, the fourth object image display process ends. If the received data of degree of smoothness is not "2_M4", the control proceeds to step P4012 of FIG. 46.

Figure 46:
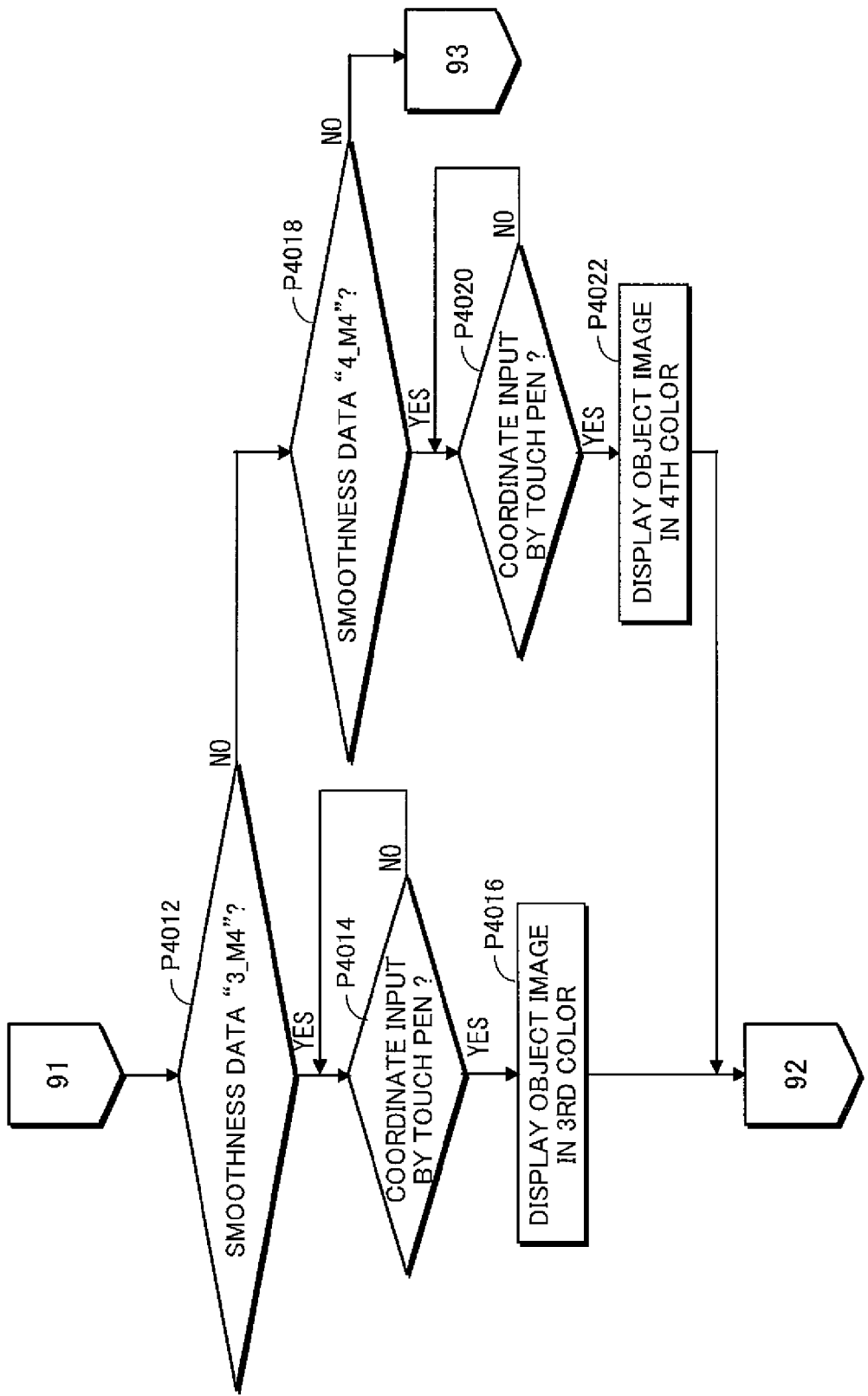

Referring to FIG. 46, at step P4012, whether or not the received data of degree of smoothness is "3_M4" is determined. If the received data of degree of smoothness is "3_M4", PC 500 waits for the coordinate input operation by touch pen 108 to the operating surface of transparent touch panel 204 (step P4014). If the coordinate input operation is done, PC 500 refers to the object image color changing data stored in object image color storage area 900 using the data of degree of smoothness "3_M4" as a parameter, and obtains the third color (blue) as the display color of object image. Based on the reference, PC 500 displays object image 600U of the third color as shown in FIG. 27C, at a position corresponding to the coordinates input by touch pen 108, on the display area of large LCD 202 (step P4016). Then, the fourth object image display process ends. If the received data of degree of smoothness is not "3_M4", the control proceeds to step P4018.

At step P4018, whether or not the received data of degree of smoothness is "4_M4" is determined. If the received data of degree of smoothness is "4_M4", PC 500 waits for the coordinate input operation by touch pen 108 to the operating surface of transparent touch panel 204 (step P4020). If the coordinate input operation is done, PC 500 refers to the object image color changing data stored in object image color storage area 900 using the data of degree of smoothness "4_M4" as a parameter, and obtains the fourth color (white) as the display color of object image. Based on the reference, PC 500 displays object image 600V of the fourth color as shown in FIG. 27D, at a position corresponding to the coordinates input by touch pen 108, on the display area of large LCD 202 (step P4022). Then, the fourth object image display process ends. If the received data of degree of smoothness is not "4_M4", the control proceeds to step P4024 of FIG. 47.

Figure 47:
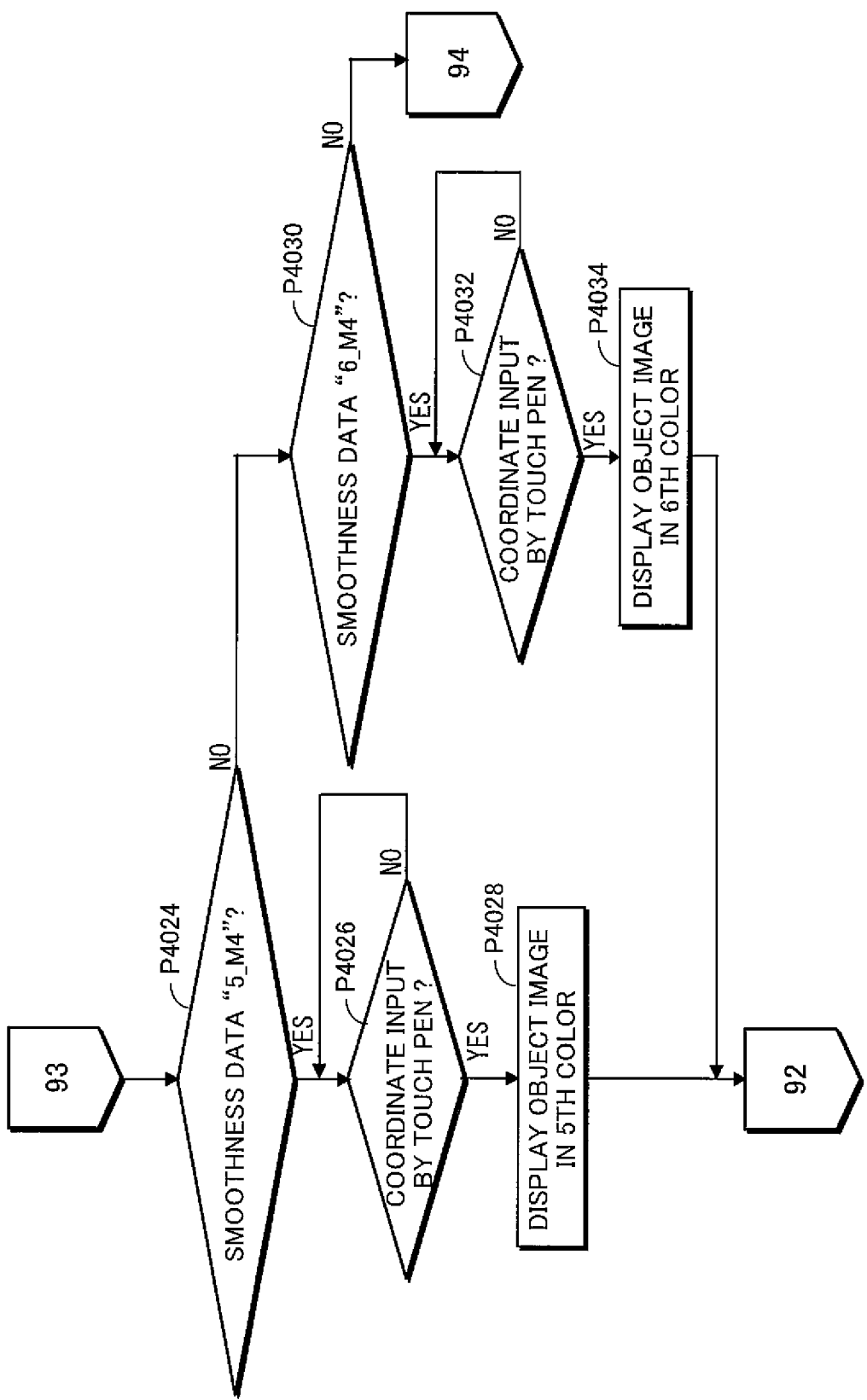

Referring to FIG. 47, at step P4024, whether or not the received data of degree of smoothness is "5_M4" is determined. If the received data of degree of smoothness is "5_M4", PC 500 waits for the coordinate input operation by touch pen 108 to the operating surface of transparent touch panel 204 (step P4026). If the coordinate input operation is done, PC 500 refers to the object image color changing data stored in object image color storage area 900 using the data of degree of smoothness "5_M4" as a parameter, and obtains the fifth color (yellow) as the display color of object image. Based on the reference, PC 500 displays object image 600W of the fifth color as shown in FIG. 27E, at a position corresponding to the coordinates input by touch pen 108, on the display area of large LCD 202 (step P4028). Then, the fourth object image display process ends. If the received data of degree of smoothness is not "5_M4", the control proceeds to step P4030.

At step P4030, whether or not the received data of degree of smoothness is "6_M4" is determined. If the received data of degree of smoothness is "6_M4", PC 500 waits for the coordinate input operation by touch pen 108 to the operating surface of transparent touch panel 204 (step P4032). If the coordinate input operation is done, PC 500 refers to the object image color changing data stored in object image color storage area 900 using the data of degree of smoothness "6_M4" as a parameter, and obtains the sixth color (green) as the display color of object image. Based on the reference, PC 500 displays object image 600X of the sixth color as shown in FIG. 27F, at a position corresponding to the coordinates input by touch pen 108, on the display area of large LCD 202 (step P4034). Then, the fourth object image display process ends. If the received data of degree of smoothness is not "6_M4", the control proceeds to step P4000 of FIG. 45.

<Operation>

In the present embodiment, as the coordinate input operation, the operator brings pen tip portion 400 of touch pen 108 into contact with the operating surface of transparent touch panel 204. In response to the operation, object image 600 is displayed at a position corresponding to the input coordinate position in the display area of large LCD 202. As the level of pushing amount of pushing member 412 becomes deeper, the degree of smoothness of pen tip portion 400 of touch pen 108 decreases. The degree of smoothness of pen tip portion 400 of touch pen 108 is notified to PC 500 on the side of main body 104 of the apparatus.

When the object image display manner changing mode is set to the size changing mode in touch pen 108, PC 500 displays the object image 600 with the size (thickness) of object image 600 displayed on the display area of LCD 202 changed in accordance with the notified degree of smoothness of pen tip portion 400 of touch pen 108.

When the object image display manner changing mode is set to the shape changing mode in touch pen 108, PC 500 displays the object image 600 with the shape of object image 600 displayed on the display area of LCD 202 changed in accordance with the notified degree of smoothness of pen tip portion 400 of touch pen 108.

When the object image display manner changing mode is set to the density changing mode in touch pen 108, PC 500 displays the object image 600 with the density of object image 600 displayed on the display area of LCD 202 changed in accordance with the notified degree of smoothness of pen tip portion 400 of touch pen 108.

When the object image display manner changing mode is set to the color changing mode in touch pen 108, PC 500 displays the object image 600 with the color of object image 600 displayed on the display area of LCD 202 changed in accordance with the notified degree of smoothness of pen tip portion 400 of touch pen 108.

<Functions/Effects>

In addition to the functions/effects (2) to (5) of the first embodiment, the present embodiment additionally attains the following functions/effects.

When an operator performs the coordinate input operation by bringing the pen tip portion 400 of touch pen 108 into contact with the operating surface of touch panel 204, object image 600 is displayed at a position corresponding to the input coordinates on the display area of large LCD 202. At this time, setting of the display manner changing mode and the degree of smoothness of pen tip portion 400 of touch pen 108 are notified to the main body 104 of the apparatus. In accordance with the notified setting of the display manner changing mode and degree of smoothness, main body 104 of the apparatus displays the object image 600 with the display manner (display size, display shape, display density or display color) changed. As the setting of the display manner changing mode and degree of smoothness of pen tip portion 400 are linked to the display manner of object image 600 displayed using the coordinate input operation as a trigger, it becomes possible to realize the operation feeling of presenter 106 operating the touch pen 108 that matches the change in the display manner of the object. The operational feeling of presenter 106 at the time of coordinate input operation using touch pen 108 can be improved, without necessitating any processing of the operating surface of touch panel 204 or exchanging the pen tip portion 400 of touch pen 108.

Sixth Embodiment

<Structure of Touch Pen 108>

Figure 48:
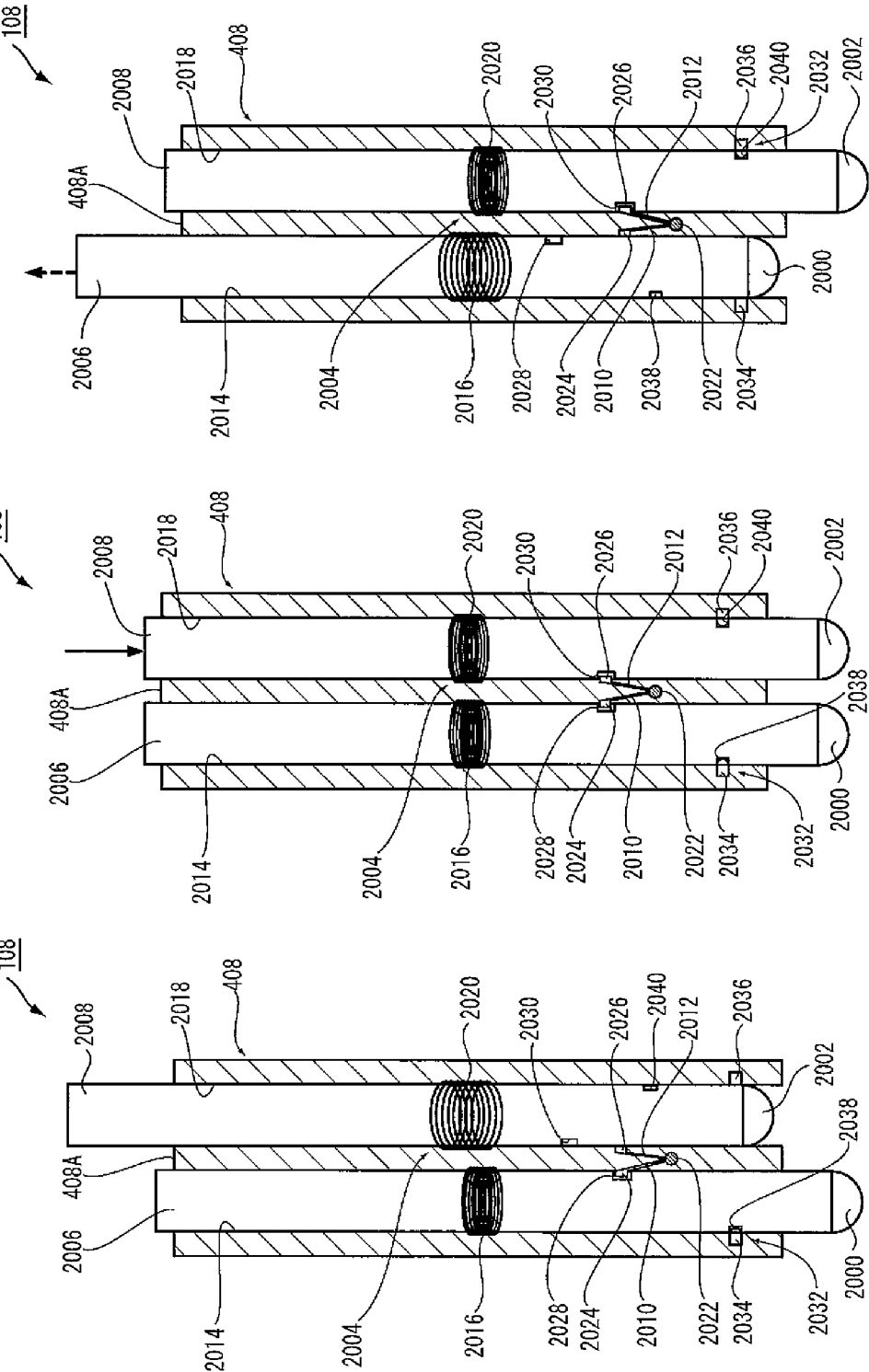
FIGS. 48A to 48C are cross-sectional views of the touch pen used for the display apparatus in accordance with the sixth embodiment.

Referring to FIGS. 48A to 48C, touch pen 108 in accordance with the present embodiment includes pen tip portions 2000 and 2002 having different degrees of smoothness on the operating surface of transparent touch panel 204.

The first pen tip portion 2000 has the degree of smoothness set relatively high. The first pen tip portion 2000 has coefficient of friction and elasticity set such that the presenter enjoys hard and smooth feeling of operation like a ball-point pen. The second pen tip portion 2002 has the degree of smoothness set relatively low. The second pen tip portion 2002 has coefficient of friction and elasticity set such that the presenter enjoys slightly softer and less smooth feeling of operation like a felt pen. Tip end surfaces of the first and second pen tip portions 2000 and 2002 have approximately semi-spherical, round shape.

Touch pen 108 further includes a switching mechanism 2004 for selectively switching the pen tip portion for coordinate input, alternately between the first and second pen tip portions 2000 and 2002.

Switching mechanism 2004 includes: a first operating member 2006 for switching the first pen tip portion 2000 to an attitude protruding from the tip end of pen holder 408 to allow coordinate input to transparent touch panel 204, as shown in FIG. 48A; a second operating member 2008 for switching the second pen tip portion 2002 to an attitude protruding from the tip end of pen holder 408 to allow coordinate input to transparent touch panel 204, as shown in FIG. 48C; a first stopper 2010 for locking the protruded attitude of first pen tip portion 2000; and a second stopper 2012 for locking the protruded attitude of second pen tip portion 2002.

The first and second operating members 2006 and 2008 are round bar members of a dimension longer than the lengthwise dimension of pen holder 408. A rear surface, serving as the operating surface, of each of the operating members is always protruded from the rear end of pen holder 408. At a front end surface of first operating member 2006, the first pen tip portion 2000 is attached. The first operating member 2006 is fit from the rear end side of pen holder 408 movable upward/downward, to a first through hole 2014 formed in the axial direction on one side region (in FIGS. 48A to 48C, left region) of pen holder 408. The first operating member 2006 is urged upward by a first spring 2016 in the first through hole 2014. At a front end surface of second operating member 2008, the second pen tip portion 2002 is attached. The second operating member 2008 is fit from the rear end side of pen holder 408 movable upward/downward, to a second through hole 2018 formed in the axial direction on the other side region (in FIGS. 48A to 48C, right region) of pen holder 408. The second operating member 2008 is urged upward by a second spring 2020 in the second through hole 2018.

The first spring 2016 is attached to the outside of first operating member 2006. The first spring 2016 has an upper end attached to an outer circumferential surface of first operating member 2006, and a lower end attached to a wall surface of the first through hole 2014. The second spring 2020 is attached to the outside of second operating member 2008. The second spring 2020 has an upper end attached to an outer circumferential surface of second operating member 2008, and a lower end attached to a wall surface of the second through hole 2018.

The first and second stoppers 2010 and 2012 are formed of elastic material such as resin. The first and second stoppers 2010 and 2012 are rotatably supported about a lateral axis 2022, at a partition wall portion 408A formed between the first and second through holes 2014 and 2018. First and second stoppers 2010 and 2012 are arm-shaped, having engaging pawls 2024 and 2026 at end portions. At that region of the circumferential surface of first operating member 2006 which faces partition wall portion 408A, a receiving slot 2028 is formed, to be engaged with the engaging pawl of first stopper 2010. Receiving slot 2028 is positioned approximately at a midpoint between the first pen tip portion 2000 and the region where the first spring 2016 is externally attached, of the first operating member 2006. At that region of the circumferential surface of second operating member 2008 which faces partition wall portion 408A, a receiving slot 2030 is formed, to be engaged with the engaging pawl of second stopper 2012. Receiving slot 2030 is positioned approximately at a midpoint between the second pen tip portion 2002 and the region where the second spring 2020 is externally attached, of the second operating member 2008.

The present touch pen 108 further includes a detecting mechanism 2032 for detecting which of the first and second pen tip portions 2000 and 2002 is selected as the pen tip portion for coordinate input.

Detecting mechanism 2032 includes a first detecting switch 2034 embedded in a wall surface opposite to the wall surface defining the partition wall portion 408A of first through hole 2014, and a second detecting switch 2036 embedded in a wall surface opposite to the wall surface defining the partition wall portion 408A of the second through hole 2018. For detection, a first recess 2038 is formed at that region of the outer circumferential surface of first operating member 2006 which is opposite to the region facing the partition wall portion 408A. When the first pen tip portion 2000 is set to the protruded attitude as shown in FIG. 48A, the first recess 2038 faces the first detecting switch 2034. As a result, the first switch 2034 is switched from ON to OFF. Further, for detection, a second recess 2040 is formed at that region of the outer circumferential surface of second operating member 2008 which is opposite to the region facing the partition wall portion 408A. When the second pen tip portion 2002 is set to the protruded attitude as shown in FIG. 48C, the second recess 2040 faces the second detecting switch 2036. As a result, the second switch 2036 is switched from ON to OFF. A combination of ON and OFF of the first and second detecting switches 2034 and 2036 is determined by control device 506 shown in FIG. 49. Based on the result of determination, which of the first and second pen tip portions 2000 and 2002 has been selected for coordinate input is detected.

The first and second detecting switches 2034 and 2036 are micro-switches and arranged close to the front end of pen holder 408.

The first recess 2038 is positioned approximately at a midpoint between the first pen tip portion 2000 and receiving slot 2028. The second recess 2040 is arranged approximately at a midpoint between the second pen tip portion 2002 and receiving slot 2030.

In the structure as described above, assume that the first operating member 2006 is pushed against the urging force of the first spring 2016, so that the first pen tip portion 2000 is set to the attitude protruding from the front end of pen holder 408 to allow input of coordinates, as shown in FIG. 48A. At this time, engaging pawl 2024 of the first stopper 2010 comes to be engaged with receiving slot 2028 of the first operating member 2006. Consequently, the protruded attitude of the first pen tip portion 2000 is locked. At this time, the first detecting switch 2034 faces the first recess 2038 and, therefore, it is switched from ON to OFF. The second detecting switch 2036 is kept in contact with the outer circumferential surface of the second operating member 2008 and, hence, it is kept ON.

Assume that from the state of FIG. 48A, the second operating member 2008 is pushed against the urging force of the second spring 2020, so that the second pen tip portion 2002 is set to the attitude protruding from the front end of pen holder 408 to allow input of coordinates, as shown in FIG. 48B. At this time, engaging pawl 2026 of the second stopper 2012 comes to be engaged with receiving slot 2030 of the second operating member 2008. Consequently, the protruded attitude of the second pen tip portion 2002 is locked. At this time, the first stopper 2010 turns clockwise about lateral axis 2022, and the engaging force between the engaging pawl 2024 of the first stopper 2010 and the receiving slot 2028 of the first operating member 2006 becomes weaker. The urging force of first spring 2016 becomes stronger than the engaging force between engaging pawl 2024 and receiving slot 2028. As a result, the first operating member 2006 moves upward because of the urging force of first spring 2016, and the first pen tip portion 2000 is retracted into pen holder 408, in place of the second pen tip portion 2002, as shown in FIG. 48C.

In this state, the first detecting switch 2034 comes to be in contact with the outer circumferential surface of first operating member 2006 and, therefore, it is turned from OFF to ON. The second detecting switch 2036 faces the second recess 2040 and, therefore, it is switched from ON to OFF.

<Hardware Configuration>

Figure 49:
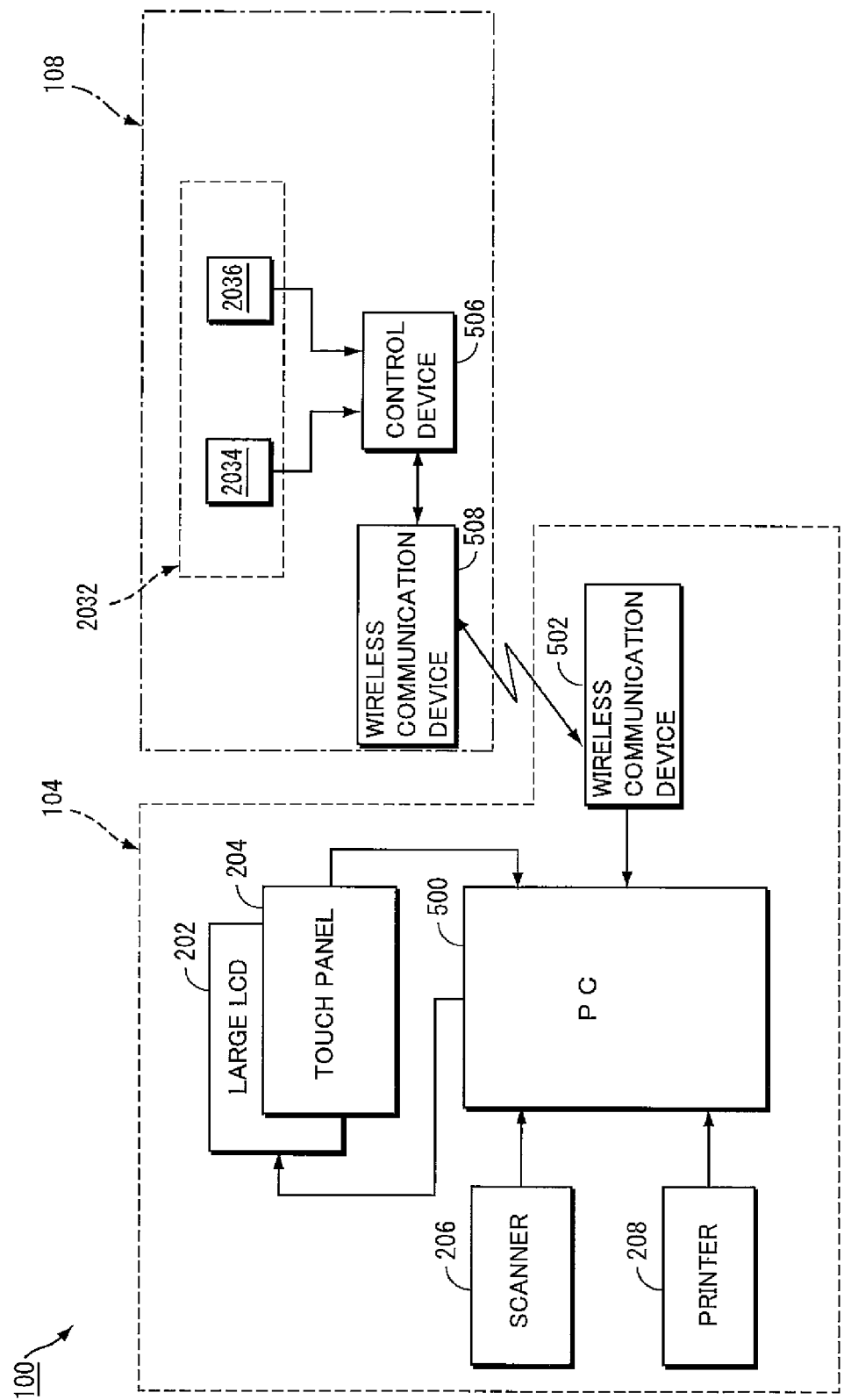
FIG. 49 is a block diagram showing a hardware configuration of the display apparatus in accordance with the sixth embodiment.

Referring to FIG. 49, the present touch pen 108 includes detecting mechanism 2032, control device 506, and wireless communication device 508. Detecting mechanism 2032 includes first and second detecting switches 2034 and 2036. To control device 506, first and second detecting switches 2034 and 2036 and wireless communication device 508 are connected.

<Software Configuration>

The present embodiment is programmed such that when the first pen tip portion 2000 having high degree of smoothness is selected as the pen tip portion for coordinate input, the object image is displayed thin, and that when the second pen tip portion 2002 of low degree of smoothness is selected, the object image is displayed thick. The program is a part of software resources for realizing various functions of display apparatus 100 as will be described in the following, and the program is partially stored in the ROM of PC 500 on the side of main body 104 of the apparatus and partially stored in the ROM of control device 506 on the side of touch pen 108. These functions are carried out by PC 500 on the side of main body 104 and control device 506 on the side of touch pen 108 executing the program.

Figure 50:
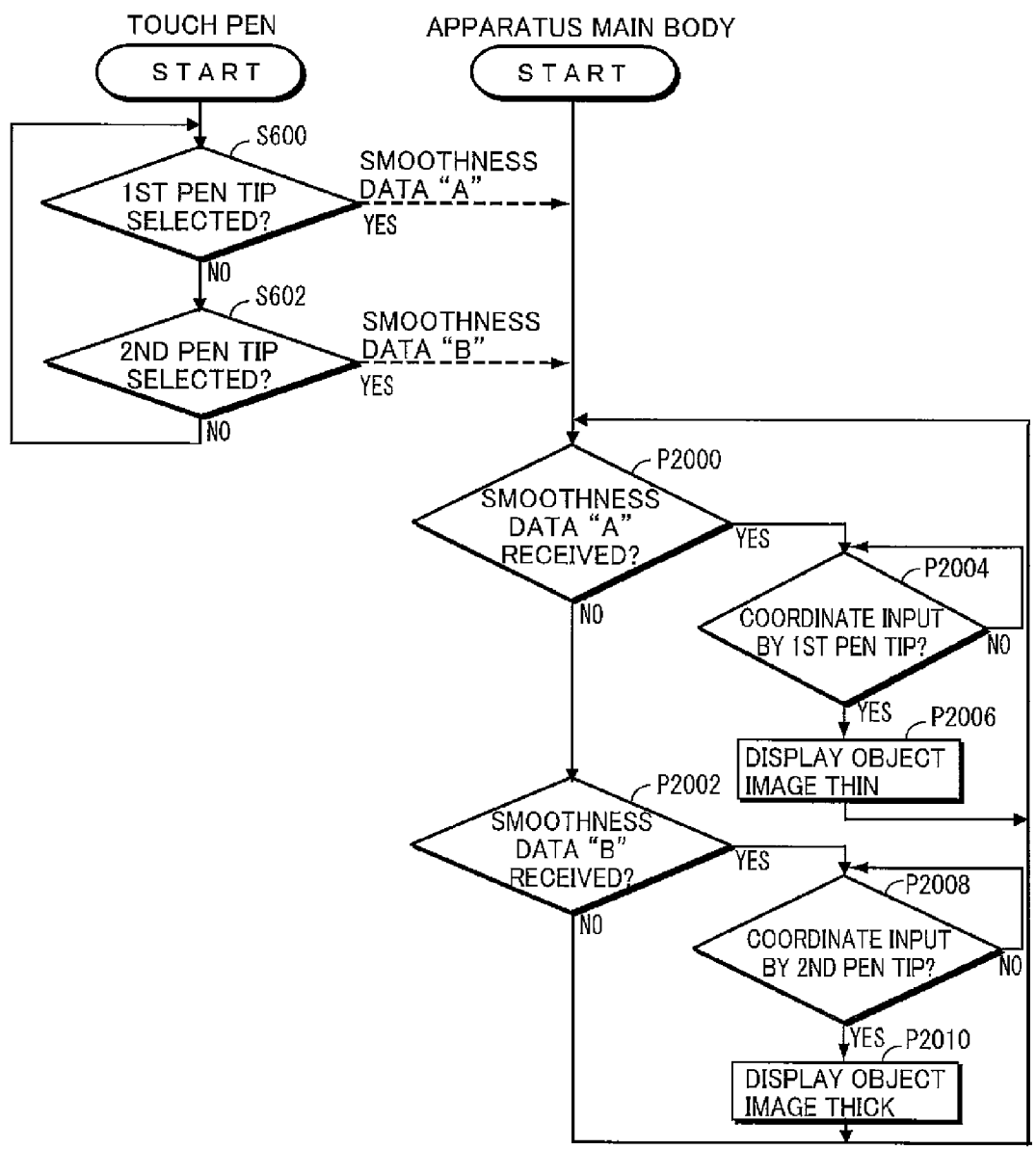
FIG. 50 shows, in a flowchart, a program structure of the display apparatus in accordance with the sixth embodiment.

Referring to FIG. 50, in the present display apparatus 100, first, control device 508 on the side of touch pen 108 determines which of the first and second pen tip portions 2000 and 2002 has been selected as the pen tip portion for coordinate input (steps S600 and S602). If the first detecting switch 2034 is OFF and the second detecting switch 2036 is ON, control device 506 determines that the first pen tip portion 2000 of high degree of smoothness has been selected as the pen tip portion for coordinate input (YES at step S600). At this time, control device 506 transmits data of degree of smoothness "A" through wireless communication device 508 to the main body 104 of the apparatus. If the first detecting switch 2034 is ON and the second detecting switch 2036 is OFF, control device 506 determines that the second pen tip portion 2002 of low degree of smoothness has been selected (YES at step S602). At this time, control device 506 transmits data of degree of smoothness "B" through wireless communication device 508 to the main body 104 of the apparatus.

PC 500 on the side of main body 104 of the apparatus determines which of the data of degree of smoothness "A" and "B" has been received (step P2000 and P2002). If the received data of degree of smoothness is "A" (YES at step S2000), PC 500 waits for detection of the coordinate input operation by the first pen tip portion 2000 (step P2004). If the coordinate input is done, PC 500 displays the object image thin at the position corresponding to the input coordinates, in the display area of large LCD 202 (step P2006). If the received data of degree of smoothness is "B" (YES at step S2002), PC 500 waits for detection of the coordinate input operation by the second pen tip portion 2002 (step P2008). If the coordinate input is done, PC 500 displays the object image thick at the position corresponding to the input coordinates, in the display area of large LCD 202 (step P2010).

<Operation>

In the present display apparatus 100, when the first pen tip portion 2000 having high degree of smoothness is selected on the side of touch pen 108 and the coordinates are input to the operating surface of transparent touch panel 204 by the first pen tip portion 2000, the object image is displayed thin at the position corresponding to the input coordinates in the display area of large LCD 202. When the second pen tip portion 2002 having low degree of smoothness is selected on the side of touch pen 108 and the coordinates are input to the operating surface of transparent touch panel 204 by the second pen tip portion 2002, the object image is displayed thick at the position corresponding to the input coordinates in the display area of large LCD 202.

<Functions/Effects>

The present embodiment particularly attains the following functions/effects.

It is possible to switch to the first pen tip portion 2000 that is hard and smooth like a ball point pen if one wishes to draw a thin object image, and to switch to the second pen tip portion 2002 that is slightly softer and less smooth like a felt pen if one wishes to draw a thick object. By such switching, the displayed object image and the operational feeling of touch pen 108 can be better matched.

Seventh Embodiment

The present embodiment is characterized in that when the first pen tip portion 2000 of high degree of smoothness is selected as the pen tip portion for coordinate input, the object image is displayed in a prescribed thickness, and when the second pen tip portion 2002 having low degree of smoothness is selected, the object image is displayed in the same color as the background. Except for this point, the structure is the same as that of the sixth embodiment.

<Software Configuration>

In the present embodiment, display apparatus 100 is programmed to attain the above-described characteristic. The program is a part of software resources for realizing various functions of display apparatus 100 as will be described in the following, and the program is partially stored in the ROM of PC 500 on the side of main body 104 of the apparatus and partially stored in the ROM of control device 506 on the side of touch pen 108. These functions are attained by PC 500 on the side of main body 104 and control device 506 on the side of touch pen 108 executing the program.

Figure 51:
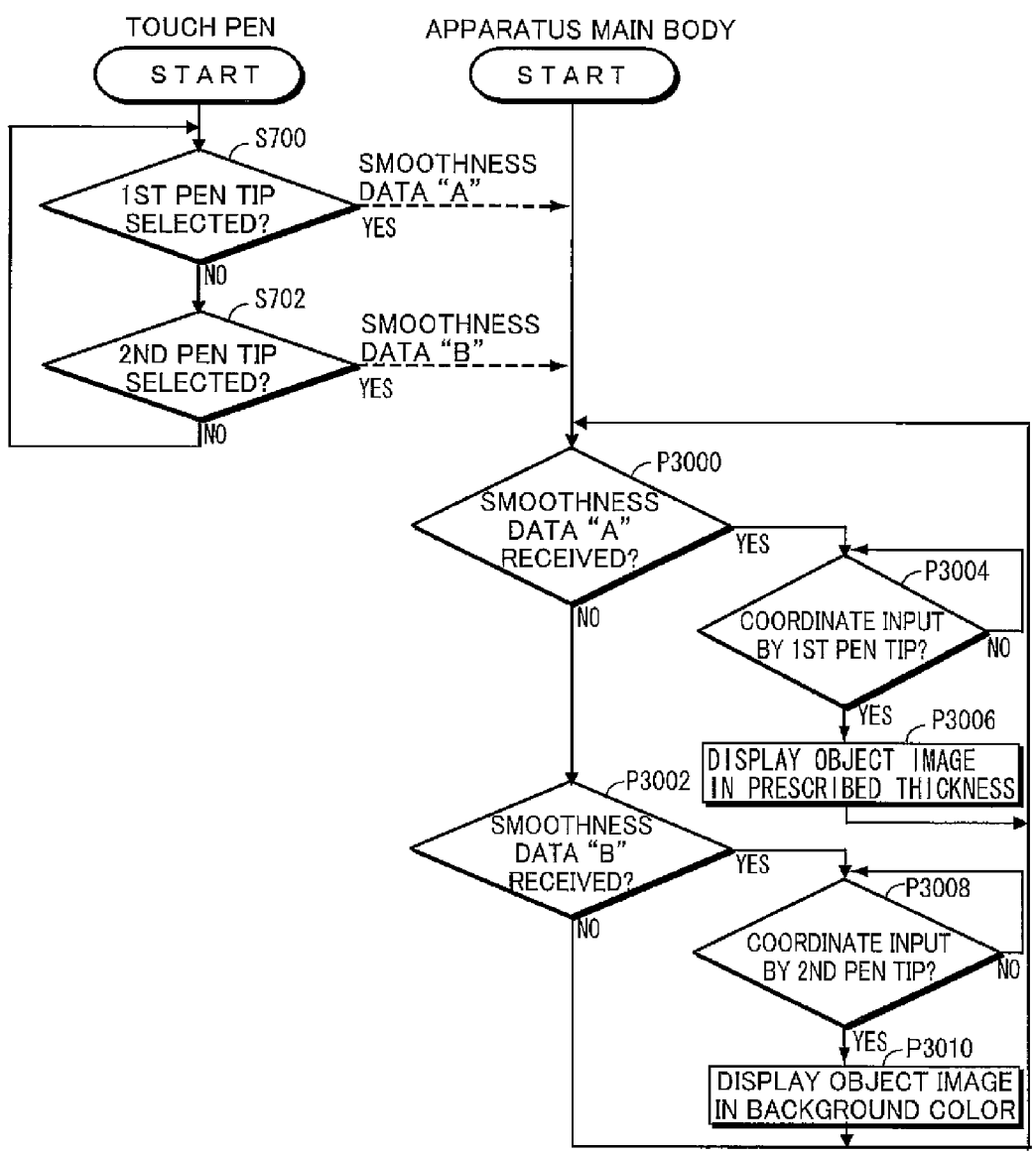
FIG. 51 shows, in a flowchart, a program structure of the display apparatus in accordance with the seventh embodiment.

Referring to FIG. 51, in the present display apparatus 100, first, control device 508 on the side of touch pen 108 determines which of the first and second pen tip portions 2000 and 2002 has been selected as the pen tip portion for coordinate input (steps S700 and S702). If it is determined at step S700 that the first pen tip portion 2000 of high degree of smoothness has been selected as the pen tip portion for coordinate input (YES), control device 506 transmits data of degree of smoothness "A" through wireless communication device 508 to the main body 104 of the apparatus. If it is determined at step S702 that the second pen tip portion 2002 of low degree of smoothness has been selected as the pen tip portion for coordinate input (YES), control device 506 transmits data of degree of smoothness "B" through wireless communication device 508 to the main body 104 of the apparatus.

PC 500 on the side of main body 104 of the apparatus determines which of the data of degree of smoothness "A" and "B" has been received (step P3000 and P3002). If it is determined at step S3000 that the received date of degree of smoothness is "A" (YES), PC 500 waits for detection of the coordinate input operation by the first pen tip portion 2000 (step P3004). If the coordinate input is done, PC 500 displays the object image in a prescribed thickness at the position corresponding to the input coordinates, in the display area of large LCD 202 (step P3006). If it is determined at step S3002 that the received date of degree of smoothness is "B" (YES), PC 500 waits for detection of the coordinate input operation by the second pen tip portion 2002 (step P3008). If the coordinate input is done, PC 500 displays the object image in the same color as the background at the position corresponding to the input coordinates, in the display area of large LCD 202 (step P3010).

<Operation>

In the present embodiment, when the first pen tip portion 2000 having high degree of smoothness is selected on the side of touch pen 108 and the coordinates are input to the operating surface of transparent touch panel 204 by the first pen tip portion 2000, the object image is displayed in a prescribed thickness. When the second pen tip portion 2002 having low degree of smoothness is selected on the side of touch pen 108 and the coordinates are input to the operating surface of transparent touch panel 204 by the second pen tip portion 2002, the object image is displayed in the same color as the background color.

<Functions/Effects>

The present embodiment particularly attains the following functions/effects.

When an object image is to be erased, the pen tip portion is switched from the first pen tip portion 2000 to the second pen tip portion 2002. Then, the object image is displayed in the same color as the background color. When the image that has been drawn is overwritten by the second pen tip portion 2002 of the background color, the object image becomes invisible, and the eraser function is attained. In this point, the displayed object image and the operational feeling of touch pen 108 can be better matched.

Eighth Embodiment

<Structure of Touch Pen 108>

Referring to FIG. 52B, according to the present embodiment, touch pen 108 includes a pen holder 408 having a U-shaped cross section with an open front end, and a wheel-shaped pen tip portion 3000 supported by a rotation shaft 3008 at the front end opening. Rotation shaft 3008 is rotatably supported at opposite side walls of pen holder 408 at the front end of pen holder 408.

Pen tip portion 3000 has three sections 3002, 3004 and 3006 formed of materials such as rubber, resin or the like having different coefficients of friction or different elasticity, and hence having different degrees of smoothness on the operating surface of transparent touch panel 204. Pen tip portion 3000 is equally divided into these three pen tip sections 3002, 3004 and 3006, with rotation shaft being the center. The degree of smoothness of pen tip portion is set to decrease stepwise in the order of the first pen tip section 3002, the second pen tip section 3004 and the third pen tip section 3006.

The present touch pen 108 further includes a switching mechanism 3010 for selecting and switching which of the first to third pen tip sections 3002, 3004 and 3006 is to be exposed at the front end of pen holder.

Switching mechanism 3010 includes: a knob 3012 coupled to one end (in the present embodiment, right end) of rotation shaft 3008 protruded outward through one side wall (in the present embodiment, right wall) of pen holder 408 for rotating pen tip portion 3000; three micro-switches 3014, 3016 and 3018 embedded in a line in the vertical direction on the other side wall (in the present embodiment, left wall) of pen holder 408 at the front end opening of pen holder 408; and recesses 3020, 3022 and 3024 formed in pen tip sections 3002, 3004 and 3006 and engaged with contacts of corresponding micro-switches 3014, 3016 and 3018 when faced to these micro-switches 3014, 3016 and 3018.

Recess 3020 on the side of the first pen tip section 3002 is arranged at a central portion of first pen tip section 3002 such that it engages with the contact of micro-switch 3016 when it faces the second micro-switch 3016 at the middle level. Recess 3022 on the side of second pen tip section 3004 is arranged at an inner edge portion of second pen tip section 3004 such that it engages with the contact of micro-switch 3014 when it faces the first micro-switch 3014 at the lower level. Recess 3024 on the side of third pen tip section 3006 is arranged at an outer edge portion of third pen tip section 3006 such that it engages with the contact of micro-switch 3018 when it faces the third micro-switch 3018 at the upper level. Recesses 3020, 3022 and 3024 have such a positional relation that these are phase-shifted by 120° from each other with rotation shaft 3008 being the center.

In the structure described above, when the first pen tip section 3002 is to be used as a face for coordinate input, pen tip portion 3000 is rotated by knob 3012 such that the recess 3022 of the second pen tip section 3004 faces the first micro-switch 3014. Then, the contact of first micro-switch 3014 is released from the pushing force of pen tip portion 3000, protrudes to recess 3022 on the side of second pen tip section 3004, and the contact of micro-switch 3014 engages with the recess 3022. As a result, the first pen tip section 3002 is exposed from the front end of pen holder 408, and this attitude is locked. At this time, the first micro-switch 3014 is turned from ON to OFF.

When the second pen tip section 3004 is to be used as a face for coordinate input, pen tip portion 3000 is rotated by knob 3012 such that the recess 3024 of the third pen tip section 3006 faces the third micro-switch 3018. Then, the contact of third micro-switch 3018 is released from the pushing force of pen tip portion 3000 and protrudes to recess 3024 on the side of third pen tip section 3006, and the contact of micro-switch 3018 engages with the recess 3024. As a result, the second pen tip section 3004 is exposed from the front end of pen holder 408, and this attitude is locked. At this time, the third micro-switch 3018 is turned from ON to OFF.

When the third pen tip section 3006 is to be used as a face for coordinate input, pen tip portion 3000 is rotated by knob 3012 such that the recess 3020 of the first pen tip section 3002 faces the second micro-switch 3016. Then, the contact of second micro-switch 3016 is released from the pushing force of pen tip portion 3000 and protrudes to recess 3020 on the side of first pen tip section 3002, and the contact of micro-switch 3016 engages with the recess 3020. As a result, the second micro-switch 3016 is turned from ON to OFF.

<Hardware Configuration>

Referring to FIG. 53, touch pen 108 includes micro-switches 3014, 3016 and 3018, control device 506, and wireless communication device 508. To control device 506, micro-switches 3014, 3016 and 3018 and wireless communication device 508 are connected.

<Software Configuration>

The display apparatus 100 in accordance with the present embodiment is programmed such that the manner of displaying object image is changed in accordance with which of the first to third pen tip sections 3002, 3004, and 3006 of different degrees of smoothness is selected as the face for coordinate input of touch pen 108. The program is a part of software resources for realizing various functions of display apparatus 100 as will be described in the following, and the program is partially stored in the ROM of PC 500 on the side of main body 104 of the apparatus and partially stored in the ROM of control device 506 on the side of touch pen 108. These functions are carried out by PC 500 on the side of main body 104 and control device 506 on the side of touch pen 108 executing the program.

Figure 54:
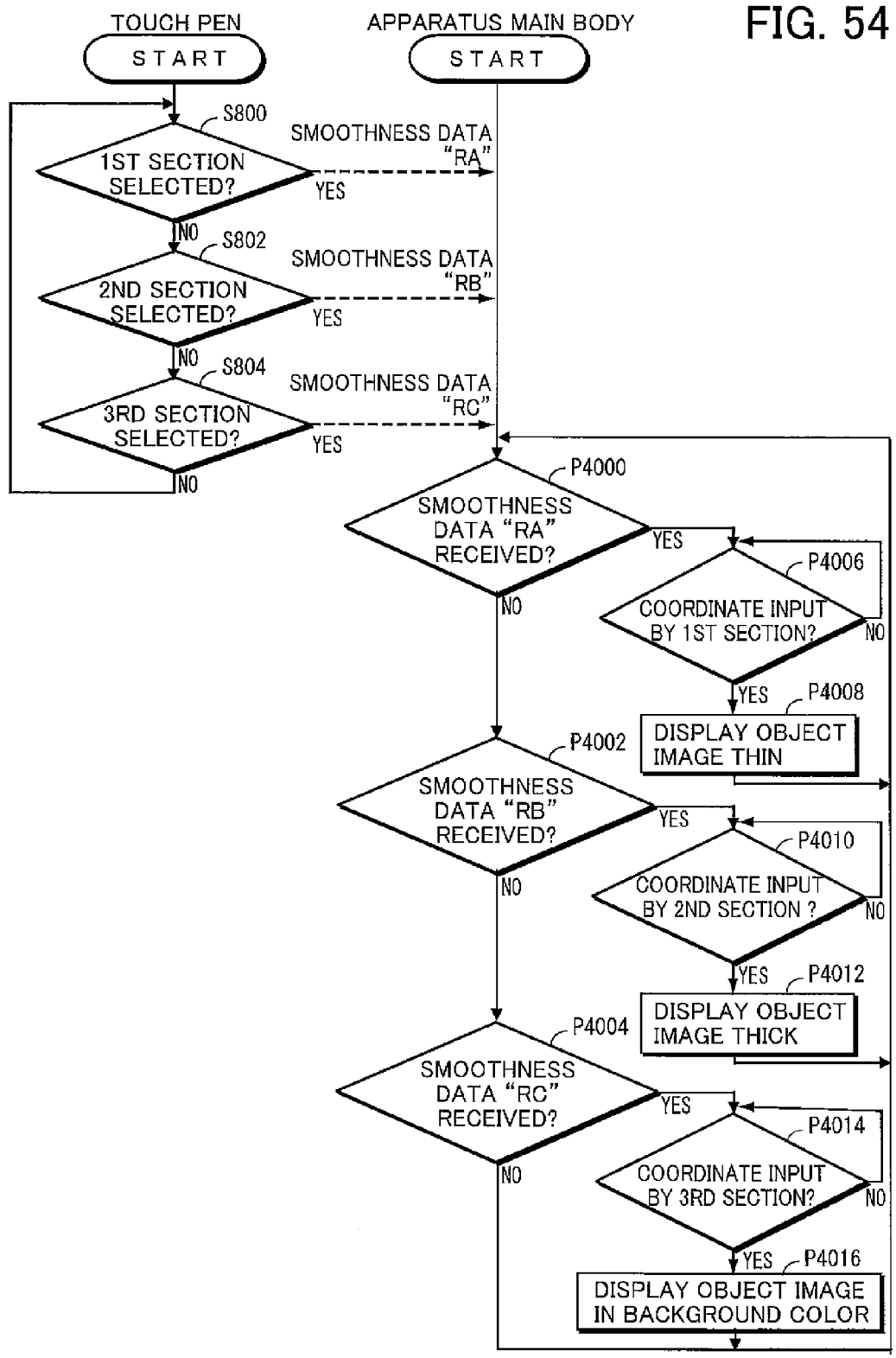
FIG. 54 shows, in a flowchart, a program structure of the display apparatus in accordance with the eighth embodiment.

Referring to FIG. 54, in the present display apparatus 100, first, control device 506 on the side of touch pen 108 determines which of the first to third pen tip sections 3002, 3004, and 3006 is selected as the face for coordinate input (steps S800, S802 and S804). If the first micro-switch 3014 is OFF and other micro-switches 3016 and 3018 are ON, control device 506 determines that the first pen tip section 3002 having the highest degree of smoothness is selected as the face for coordinate input (YES at step S800). At this time, control device 506 transmits the data of degree of smoothness "RA" through wireless communication device 508 to the main body 104 of the apparatus. If the third micro-switch 3018 is OFF and other micro-switches 3014 and 3016 are ON, control device 506 determines that the second pen tip section 3004 having the middle degree of smoothness is selected as the face for coordinate input (YES at step S802). At this time, control device 506 transmits the data of degree of smoothness "RB" through wireless communication device 508 to the main body 104 of the apparatus. If the second micro-switch 3016 is OFF and other micro-switches 3014 and 3018 are ON, control device 506 determines that the third pen tip section 3006 having the lowest degree of smoothness is selected as the face for coordinate input (YES at step S804). At this time, control device 506 transmits the data of degree of smoothness "RC" through wireless communication device 508 to the main body 104 of the apparatus.

PC 500 on the main body 104 of the apparatus determines which of the data of degree of smoothness "RA", "RB" and "RC" is received (steps P4000, P4002, P4004). If the received data of degree of smoothness is "RA" (YES at step P4000), PC 500 waits for detection of the coordinate input operation by the first pen tip section 3002 (step P4006). If the coordinate input operation is done, PC 500 displays the object image thin at a position corresponding to the input coordinates in the display area of large LCD 202 (step P4008). If the received data of degree of smoothness is "RB" (YES at step P4002), PC 500 waits for detection of the coordinate input operation by the second pen tip section 3004 (step P4010). If the coordinate input operation is done, PC 500 displays the object image thick at a position corresponding to the input coordinates in the display area of large LCD 202 (step P4012). If the received data of degree of smoothness is "RC" (YES at step P4004), PC 500 waits for detection of the coordinate input operation by the third pen tip section 3006 (step P4014). If the coordinate input operation is done, PC 500 displays the object image in the same color as the background at a position corresponding to the input coordinates in the display area of large LCD 202 (step P4016).

<Operation>

In the present display apparatus 100, when the first pen tip section having the highest degree of smoothness is selected and the coordinates are input to the operation surface of transparent touch panel 204 by the first pen tip section 3002, the object image is displayed thin at the position corresponding to the input coordinates in the display area of large LCD 202. When the second pen tip section 3004 having the middle degree of smoothness is selected and the coordinates are input to the operation surface of transparent touch panel 204 by the second pen tip section 3004, the object image is displayed thick at the position corresponding to the input coordinates in the display area of large LCD 202. When the third pen tip section 3006 having the lowest degree of smoothness is selected and the coordinates are input to the operation surface of transparent touch panel 204 by the third pen tip section 3006, the object image is displayed in the same color as the background at the position corresponding to the input coordinates in the display area of large LCD 202.

<Functions/Effects>

The present embodiment particularly attains the following functions/effects.

(1) When a thin object image is to be drawn, the pen tip is switched to the first pen tip section 3002 that is hard and smooth like a ball-point pen. When a thick object image is to be drawn, the pen tip is switched to the second pen tip section 3004 that is slightly softer and less smooth like a felt pen. When the object image is to be erased, the tip is switched to the third pen tip section 3006 that is softest and least smooth like an eraser. By such switching, the displayed object image and the operational feeling of touch pen 108 can be better matched.

(2) Three pen tip sections 3002, 3004 and 3006 of different degrees of smoothness are formed at the single pen tip portion 3000, and the pen tip section to be used for coordinate input can arbitrarily be selected from these pen tip sections 3002, 3004 and 3006. Therefore, it becomes unnecessary to provide a plurality of pen tip members for the touch pen. As a result, the switching mechanism 3010 for switching the degree of smoothness of pen tip portion 3000 can be made smaller.

The present invention is not limited to the above-described embodiments. For example, in the embodiments described above, an optical method is used for detecting the coordinate position of the transparent touch panel. The present invention, however, is not limited to such an approach. The object of the present invention can sufficiently be attained even by a touch panel using an electronic, electrostatic or ultrasonic type method for detecting the coordinate position. Further, in the embodiments above, an example of data communication related to the degree of smoothness of pen tip portion of the touch pen realized by Bluetooth (registered trademark) has been described. The present invention, however, is not limited to such an approach. By way of example, the wireless communication of the data of degree of smoothness may be realized by other wireless communication method such as infrared communication. Other design change and modifications may naturally be made to the present invention within the scope of the claims as appended to the present specification.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A display apparatus, comprising:
a display screen;
a coordinate input unit having an operating surface, through which information displayed on said display screen can be seen through, provided overlapped on the display screen;
an adjustable touch pen for performing coordinate input to said operating surface, allowing adjustment of a degree of smoothness of an adjustable pen tip portion on the operating surface among a plurality of levels; and
a controller causing, when the adjustable pen tip portion of said touch pen touches the operating surface of said coordinate input unit, a prescribed object image to be displayed at a position corresponding to said touched position; wherein
said controller includes:
a display manner selecting unit selecting a manner of displaying said object image on said display screen in accordance with the degree of smoothness of said adjustable pen tip portion of said touch pen, and
a display controller displaying said object image, when the adjustable pen tip portion of said touch pen touches the operating surface of said coordinate input unit, in a display manner selected by said display manner selecting unit, at a position corresponding to said touched position on said display screen, wherein
said touch pen further comprises:
a pen holder,
a pushing mechanism;
wherein said adjustable pen tip portion further comprises:
a rolling tip having a spherical shape, and
a tip holding member provided at one end of said pen holder, forming a spherical pair with said rolling tip, and receiving and allowing rolling of the rolling tip, and
said pushing mechanism pushes, from inside of said tip holding member, said rolling tip with switchable pushing force, wherein
a through hole is formed from one end to the other end in the axial direction in the pen holder; and
said pushing mechanism includes:
a pushing member fit to the through hole of said pen holder on the side of said one end, and pushing said rolling tip with said tip holding member interposed,
a sliding member inserted slidably along the axial direction of said pen holder, from the side of said the other end of said pen holder into said through hole of said pen holder,
a first urging unit inserted between said pushing member and said sliding member, for urging said sliding member to the side of said the other end, and
a locking unit for holding said sliding member to be locked at any of a plurality of arbitrary positions inside said pen holder, wherein
said pen holder has an opening reaching said through hole, formed at a portion of an outer circumference;
a plurality of slots are formed at positions that can face said opening, on an outer circumference of said sliding member; and
said locking unit includes:
an operation lever having a proximal portion supported on said pen holder, allowing turning about a tangential axial line of the outer circumference of said pen holder, and a distal portion having an engaging piece to be received and engaged with any one of said plurality of slots of said sliding member, and
a second urging unit provided on said pen holder, urging said operation lever such that said engaging piece is urged toward said sliding member.

2. The display apparatus according to claim 1, wherein said touch pen further includes a releasing unit attached to said locking unit for releasing locking of said sliding member by said locking unit.

3. The display apparatus according to claim 2, wherein said releasing unit includes:
an operating piece formed at the distal portion of said operation lever, opposite to said engaging piece, and
when said operating piece is operated to turn said operation lever about said axial line against urging force of said second urging member, said engaging piece is separated from said receiving slot, so that said sliding member is unlocked from said locking member.

4. The display apparatus according to claim 3, wherein on a region not overlapped with the region where said receiving slots are formed on the circumferential surface of said sliding member, indexes indicating amount of pushing of said sliding member, same in number as said receiving slots, are formed spaced from each other by a distance corresponding to the distance between said receiving slots; and a viewing window is formed on said pen holder at a position allowing, when said engaging piece is inserted to any of said plurality of slots on said sliding member and said sliding member is locked by said locking unit, visual confirmation of the index corresponding to the slot engaged with the engaging piece.

5. The display apparatus according to claim 1, wherein said display manner selecting unit selects display size of said object image, in a manner linked with switching of the degree of smoothness of the adjustable pen tip portion of said touch pen.

6. The display apparatus according to claim 1, wherein said display manner selecting unit selects display shape of said object image, in a manner linked with switching of the degree of smoothness of the adjustable pen tip portion of said touch pen.

7. The display apparatus according to claim 1, wherein said display manner selecting unit selects display density of said object image, in a manner linked with switching of the degree of smoothness of the adjustable pen tip portion of said touch pen.

8. The display apparatus according to claim 1, wherein said display manner selecting unit selects display color of said object image, in a manner linked with switching of the degree of smoothness of the adjustable pen tip portion of said touch pen.

9. The display apparatus according to claim 8, wherein the display color of said object image selected by said display manner selecting unit includes the same color as a background color of display of said display screen.

10. The display apparatus according to claim 1, wherein said touch pen includes a plurality of pen tip portions having mutually different degrees of smoothness; and said switching mechanism includes a selecting unit for selecting any one of said plurality of pen tip portions for performing coordinate input to the operating surface of said coordinate input unit.

11. The display apparatus according to claim 1, wherein said pen tip portion has a wheel shape having a plurality of pen tip sections of mutually different degrees of smoothness; and said switching mechanism includes a selecting unit for selecting any one of said plurality of pen tip sections for performing coordinate input to the operating surface of said coordinate input unit.

12. The display apparatus according to claim 1, wherein said touch pen further includes a transmitter provided in said pen holder, for transmitting, by wireless communication, pushing force of said pushing mechanism to said controller; and said controller further includes a receiver receiving the pushing force of said pushing mechanism from said transmitter, and notifying it to said display manner selecting unit.

* * * * *